(12) United States Patent
Yonehara et al.

(10) Patent No.: US 12,092,840 B2
(45) Date of Patent: Sep. 17, 2024

(54) DIFFRACTIVE OPTICAL ELEMENT, PROJECTION DEVICE, AND MEASURING DEVICE

(71) Applicant: AGC Inc., Tokyo (JP)

(72) Inventors: Toshiya Yonehara, Fukushima (JP); Ryota Murakami, Fukushima (JP); Koichi Tashima, Fukushima (JP); Kensuke Ono, Tokyo (JP)

(73) Assignee: AGC Inc., Tokyo (JP)

( * ) Notice: Subject to any disclaimer, the term of this patent is extended or adjusted under 35 U.S.C. 154(b) by 568 days.

(21) Appl. No.: 17/443,997

(22) Filed: Jul. 29, 2021

(65) Prior Publication Data

US 2021/0356755 A1   Nov. 18, 2021

Related U.S. Application Data

(63) Continuation of application No. PCT/JP2020/001300, filed on Jan. 16, 2020.

(30) Foreign Application Priority Data

Jan. 31, 2019   (JP) .................... 2019-016124

(51) Int. Cl.
    *G02B 27/42*   (2006.01)
    *G03B 21/20*   (2006.01)
(52) U.S. Cl.
    CPC ..... *G02B 27/4205* (2013.01); *G03B 21/2033* (2013.01); *G03B 21/2053* (2013.01)

(58) Field of Classification Search
    CPC .......... G02B 27/4205; G02B 27/0927; G02B 27/0916; G02B 5/18; G02B 27/0944; G03B 21/2033; G03B 21/2053; G01S 7/481
    See application file for complete search history.

(56) References Cited

U.S. PATENT DOCUMENTS

| | | | |
|---|---|---|---|
| 2008/0074746 A1 | 3/2008 | Cumme | |
| 2010/0284082 A1* | 11/2010 | Shpunt | H04N 13/271 359/558 |
| 2014/0043846 A1 | 2/2014 | Yang et al. | |
| 2016/0178358 A1 | 6/2016 | Miyasaka | |

FOREIGN PATENT DOCUMENTS

| | | | |
|---|---|---|---|
| JP | 2008-506995 A | | 3/2008 |
| JP | 2014035920 A | * | 2/2014 |
| JP | 2015-526863 A | | 9/2015 |
| JP | 6387964 B2 | | 9/2018 |

* cited by examiner

*Primary Examiner* — Mustak Choudhury
(74) *Attorney, Agent, or Firm* — Oblon, McClelland, Maier & Neustadt, L.L.P.

(57) ABSTRACT

A diffractive optical element includes a unit structure periodically arranged in a first direction and configured to diffract incident light in the first direction. The diffractive optical element has a phase pattern designed such that an angular separation between an outermost diffracted light beam and a second-outermost diffracted light beam along the first direction is smaller than the divergence angle of the incident light.

23 Claims, 38 Drawing Sheets

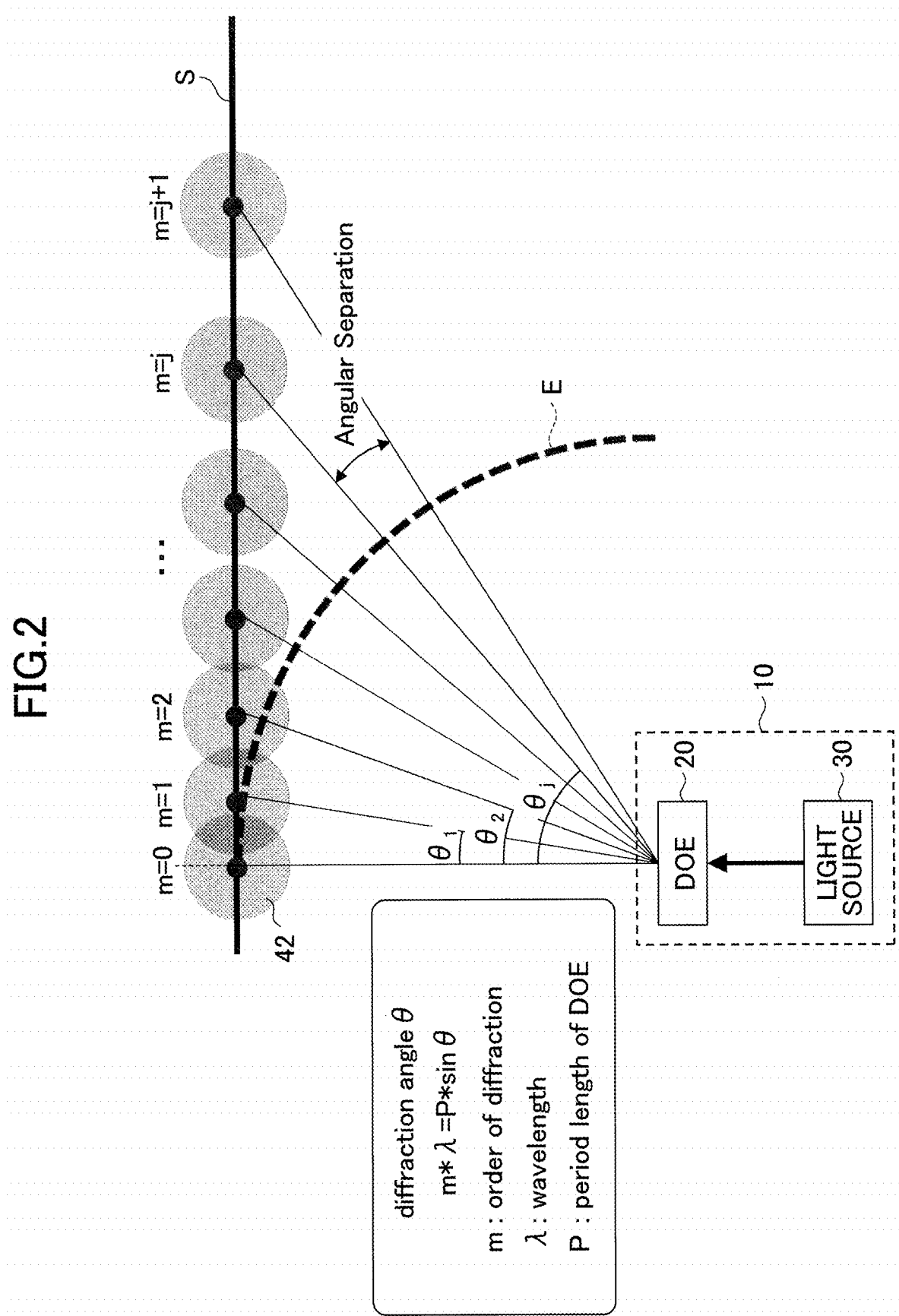

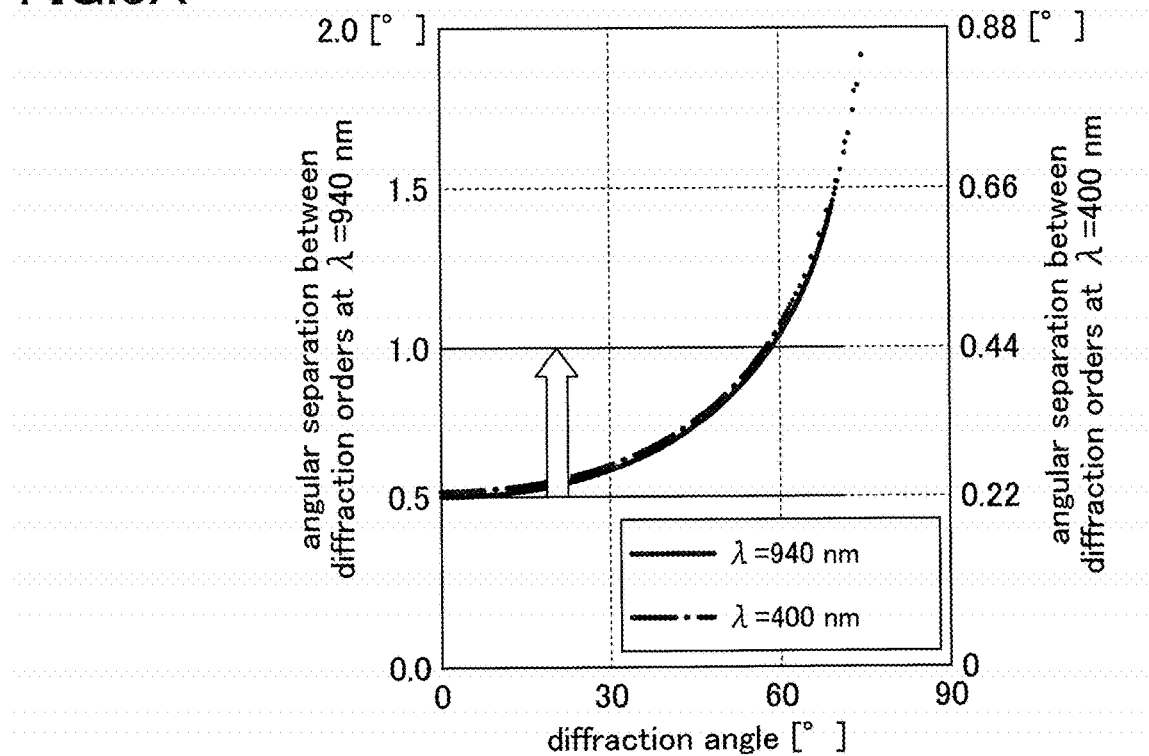
FIG.3A  PERIOD LENGTH OF DOE: P=100 μm
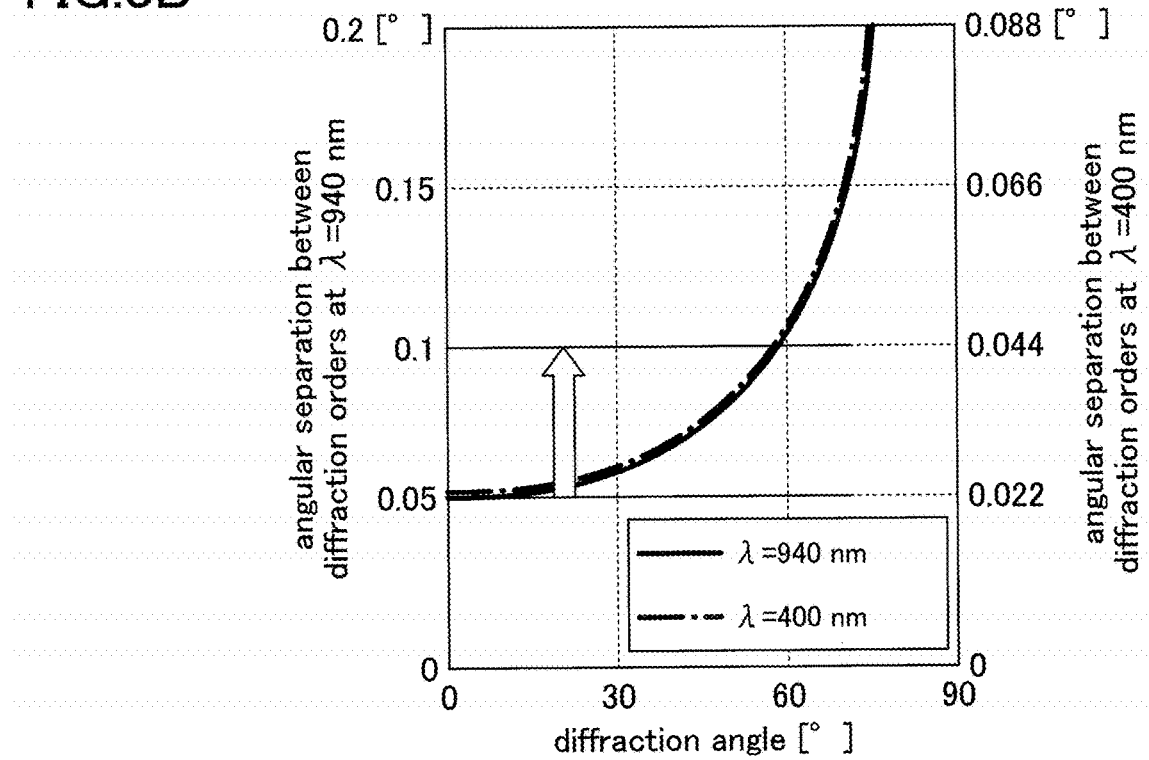
FIG.3B  PERIOD LENGTH OF DOE: P=1000 μm

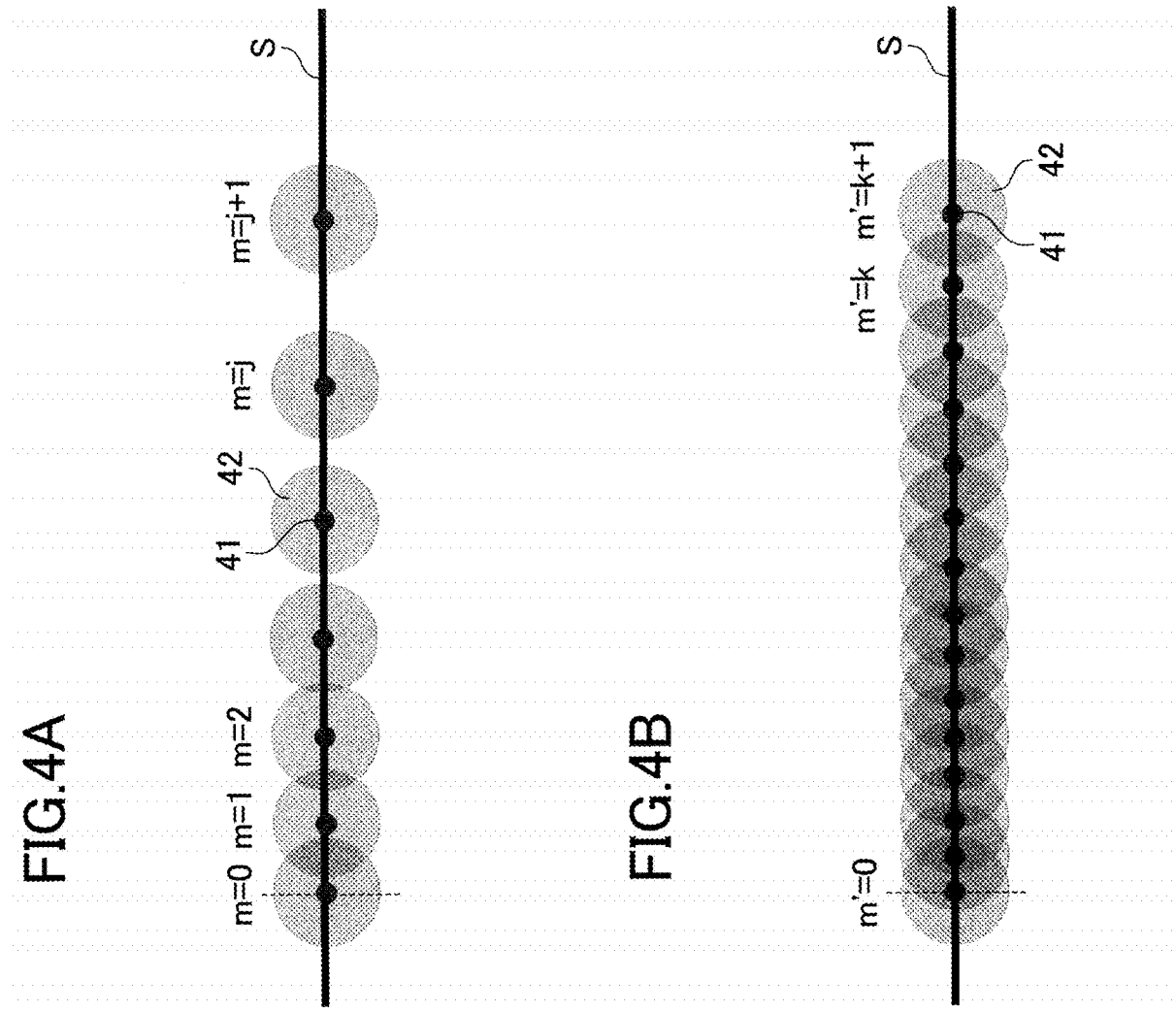
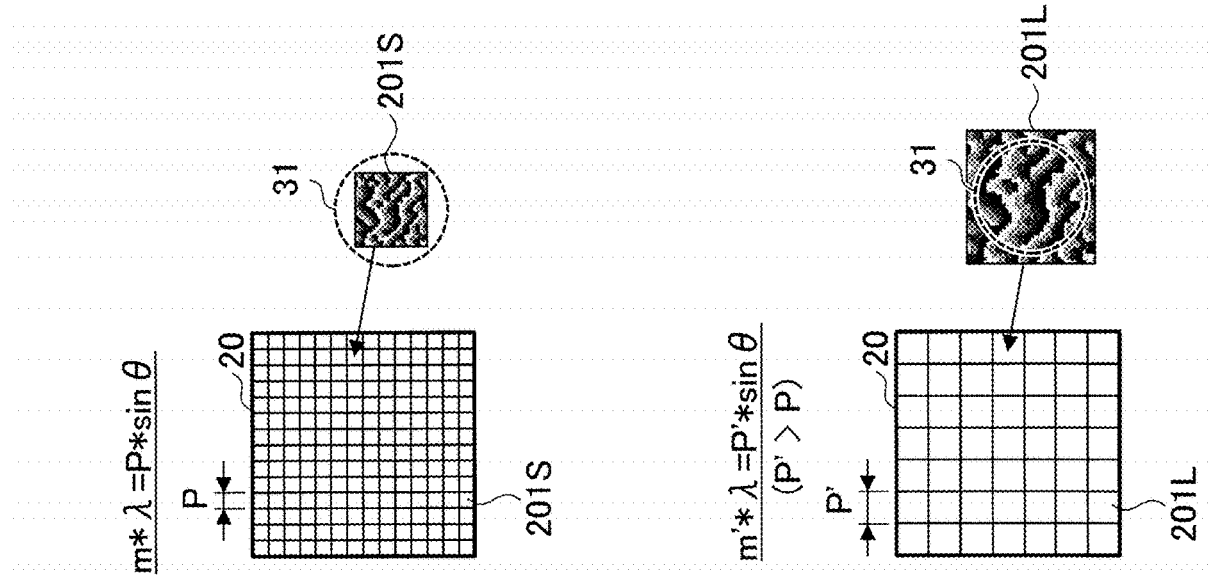

- Overlapping Condition
  (projection onto equidistant surface; one-dimensional)

$$\theta(M_H) - \theta(M_H - 1) < \delta$$

$$\delta = \underline{\theta_{div.}} \text{ or } 2 \cdot \arctan\frac{FWHM}{2Z_{SC}}$$

$\theta$ div.: beam divergence angle

- Overlapping Condition (projection onto Screen; one-dimensional)

$$\tan\theta(M_H) - \tan\theta(M_H - 1) < \frac{FWHM}{2Z_{SC}}\left(\frac{1}{\cos\theta(M_H)} + \frac{1}{\cos\theta(M_H - 1)}\right)$$

$$\theta(m) = \arcsin\frac{m\lambda}{P}$$

$$M_H = \underline{\left[\frac{P}{\lambda}\sin\frac{FOV}{2}\right]} + 1$$

Maximum order of diffraction

FIG.10

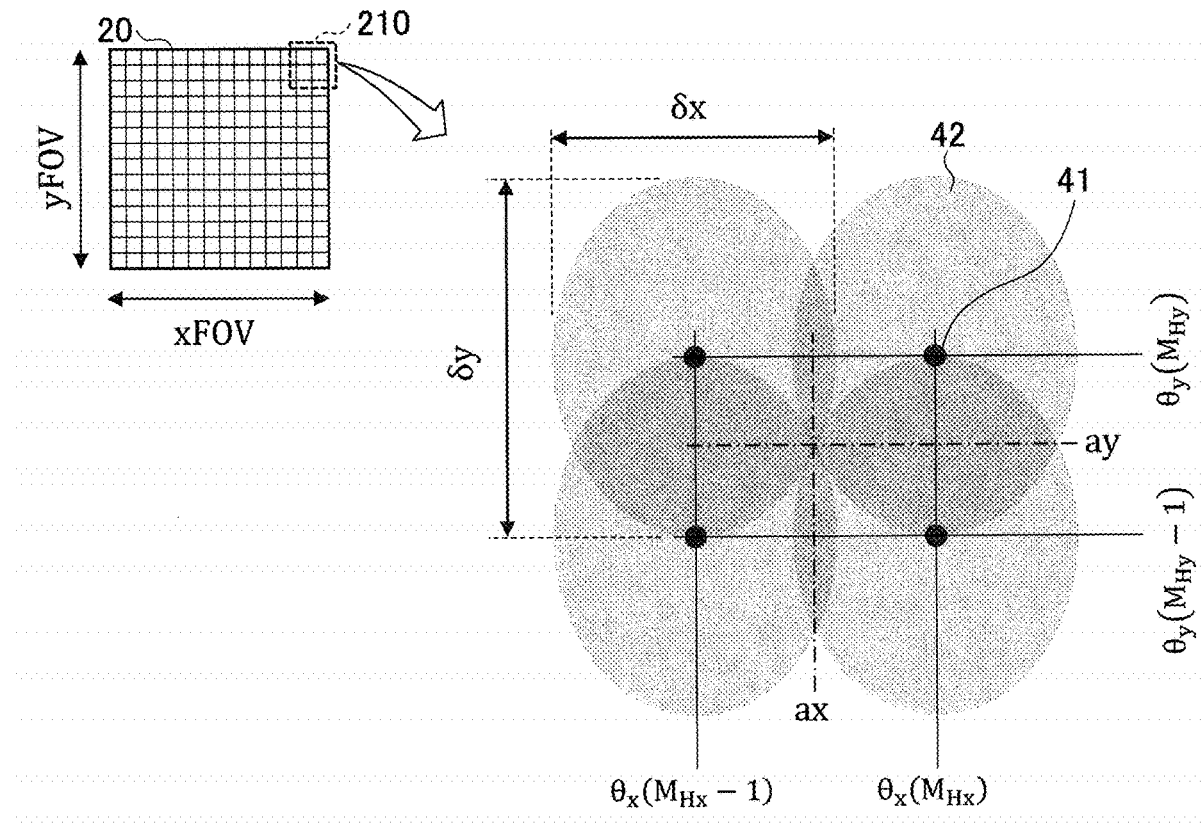

- Overlapping Condition
  (projection onto equidistant surface; two-dimensional)

$$\left(\frac{ax - \theta_x(M_{Hx})}{\delta x}\right)^2 + \left(\frac{ay - \theta_y(M_{Hy})}{\delta y}\right)^2 < 1$$

beam diameter in X direction $= 2 \cdot \arctan\dfrac{FWHM_y}{2Z_{SC}}$  $\qquad$ beam diameter in Y direction $= 2 \cdot \arctan\dfrac{FWHM_x}{2ZSC}$ $ax = \dfrac{\theta_x(M_{Hx}) + \theta_x(M_{Hx} - 1)}{2}$  $\qquad$ $ay = \dfrac{\theta_y(M_{Hy}) + \theta_y(M_{Hy} - 1)}{2}$ $\theta_x(m) = \arcsin\dfrac{m\lambda}{P_x}$  $\qquad$ $\theta_y(m) = \arcsin\dfrac{m\lambda}{P_y}$ $M_{Hx} = \left[\dfrac{P_x}{\lambda}\sin\dfrac{xFOV}{2}\right] + 1$  $\qquad$ $M_{Hy} = \left[\dfrac{P_y}{\lambda}\sin\dfrac{yFOV}{2}\right] + 1$ When FOV < 30 deg:
  $\alpha(\text{FOV}) = 0.424$ When FOV ≥ 30 deg:
  $\alpha(\text{FOV}) = 0.507 - 2.56 \cdot 10^{-3} \cdot \text{FOV} - 6.34 \cdot 10^{-6} \cdot (\text{FOV})^2$
  where FOV = max[xFOV, yFOV]

FIG.15A
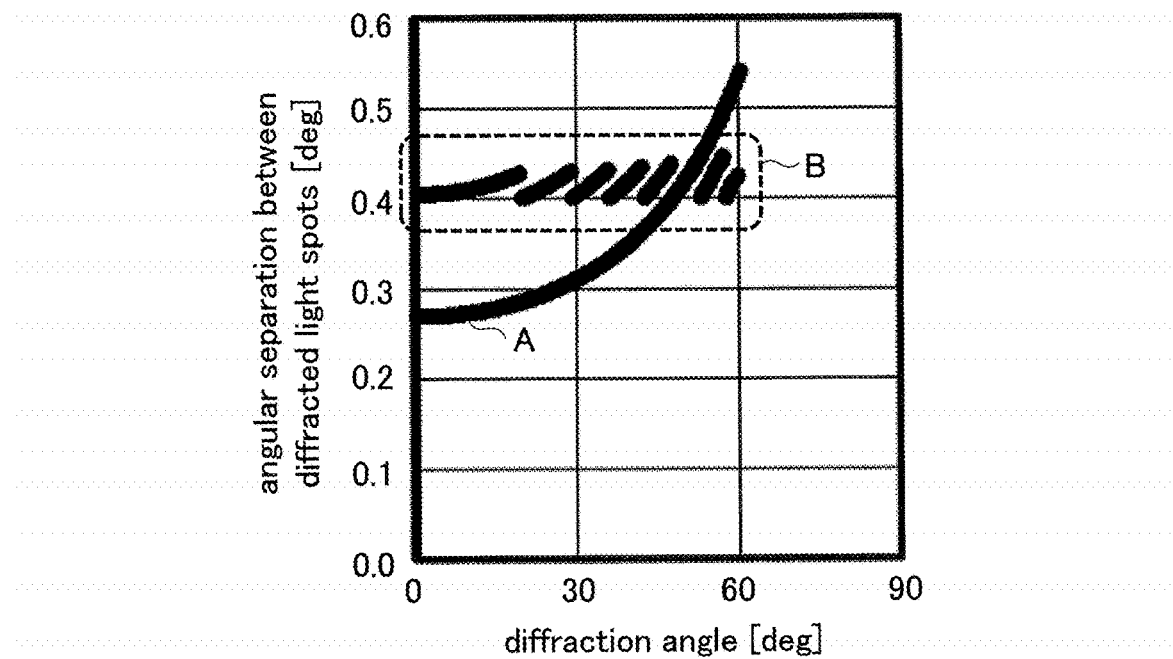
A: uniform distribution of orders of diffraction
m=0  m=N
B: thinned-out orders of diffraction
m=0  m=N
FIG.15B
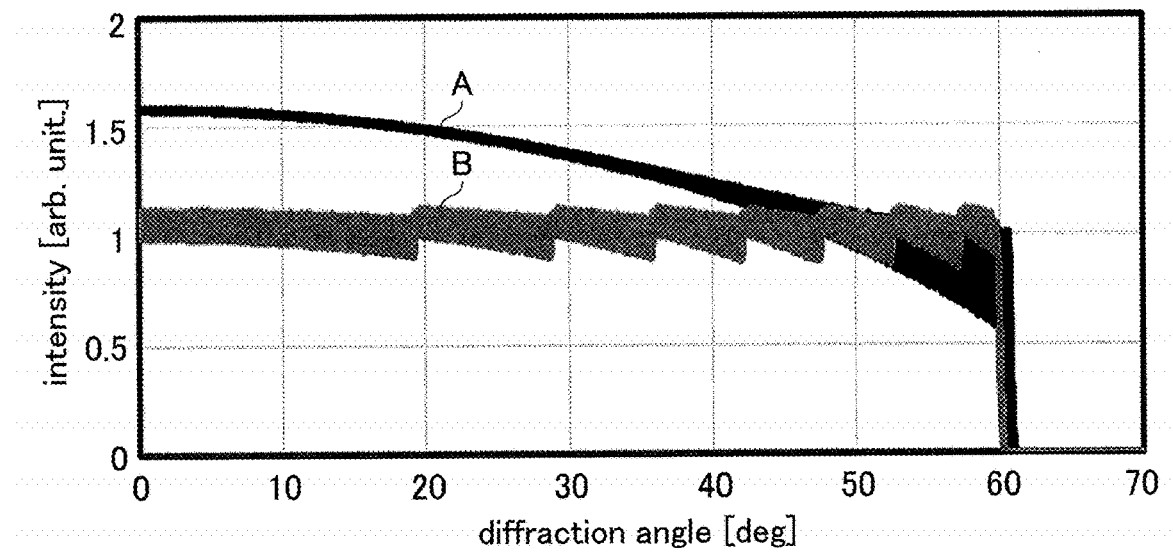

λ=1000 nm
Px=Py=100 μm

λ=1000 nm
Px=Py=500 μm

λ=1000 nm
Px=Py=100 μm

λ =1000 nm
Px=500 μm
Py=100 μm

DOE phase pattern (design solution)

projected image of only the diffraction orders (design solution)

yFOV=52.6 deg
xFOV=52.6 deg $0.4 \times H(\theta) < I(\theta) < 1.6 \times H(\theta)$

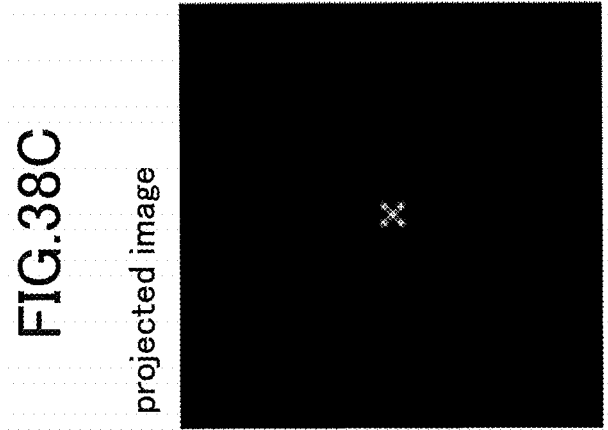
FIG.38C projected image
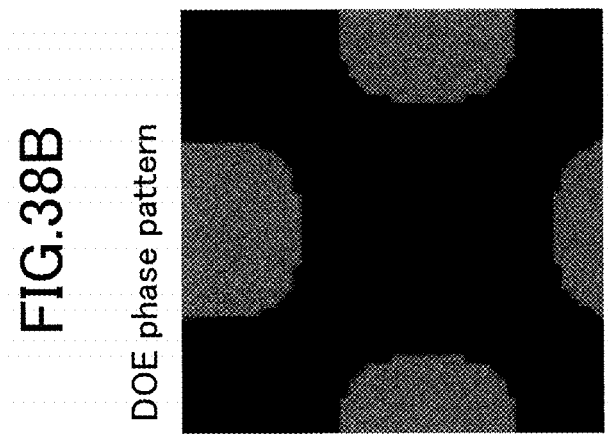
FIG.38B DOE phase pattern
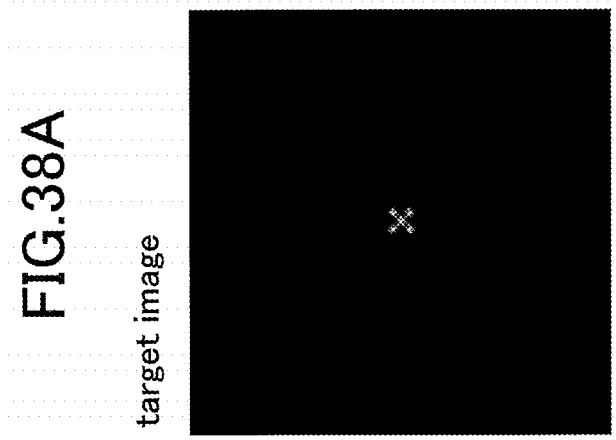
FIG.38A target image

DIFFRACTIVE OPTICAL ELEMENT, PROJECTION DEVICE, AND MEASURING DEVICE

CROSS REFERENCE TO RELATED APPLICATIONS

This application is a continuation application filed under 35 U.S.C. 111(a), and claims benefit under 35 U.S.C. 120 and 365(c) of PCT International Application No. PCT/JP2020/001300 filed Jan. 16, 2020 and designating the United States. This PCT International Application claims priority to earlier Japanese Patent Application No. 2019-016124 filed Jan. 31, 2019, both applications being incorporated herein by reference in its entirety.

TECHNICAL FIELD

The present disclosure relates to a diffractive optical element, a projection device, and a measuring device.

BACKGROUND ART

Diffractive optical elements disperse incident light in various directions, with various distribution patterns, by making use of the phenomenon of light diffraction. Although a diffractive optical element is small and lightweight, it can realize the same degree of optical functions as a refractive optical element such as a lens or a prism, and can be used in various fields including lighting, non-contact inspection, and optical measurement.

A configuration for filling a projection area with plurality of diffracted light beams, without gaps, by overlapping adjacent diffracted light beams has been proposed (for example, Patent Document 1). A configuration, in which two optical elements are used to suppress the influence of zero-order light in an optical system for converting the main intensity distribution into another intensity distribution having a predetermined solid angle dependence, is also proposed (for example, Patent Document 2).

Patent Document 1 merely mentions overlap of diffracted light, and there is no teaching about a specific configuration of the diffractive optical element for actually overlapping diffracted light beams. In Patent Document 2, no particular conditions are disclosed for actual diffracting structures.

Meanwhile, it is required for a sensing system such as a light detection and ranging (LiDAR) system using a light beam, or for a projecting and magnifying optical system such as a projector, to diffuse light over a wide field of view. To achieve a wide field of view using a diffractive optical element, it is important to make the intensity distribution of diffracted light uniform at a focal plane of projection.

PRIOR ART DOCUMENTS

Patent Document 1: JP patent No. 6387964
Patent Document 2: JP 2008-506995A

SUMMARY

According to an embodiment, a diffractive optical element having a unit structure periodically arranged in a first direction and configured to diffract incident light in the first direction is provided. The diffractive optical element has a phase pattern designed such that angular separation between an outermost diffracted light beam and a second-outermost diffracted light beam along the first direction is smaller than a divergence angle of the incident light.

According to another embodiment, a diffractive optical element having a unit structure periodically arranged in two dimensions and configured to diffract incident light in two dimensions is provided. The diffractive optical element has a phase pattern that satisfies $$[(ax-\theta x(MHx))/\delta x]^2 + [(ay-\theta y(MHy))/\delta y]^2 < 1,$$

where (ax, ay) denotes the angular coordinates of a center of four diffracted light beams adjacent one another at a corner farthest from a center area of diffracted light beams diffracted and projected in two dimensions, $\theta x(MHx)$ denotes the diffraction angle of a first-direction outermost diffracted light beam, $\theta y(MHy)$ denotes the diffraction angle of a second-direction outermost diffracted light beam, the first direction and the second direction being orthogonal to each other, $\delta x$ denotes the first-direction divergence angle of the light beams diffracted in two dimensions, and $\delta y$ denotes the second-direction divergence angle of the light beams diffracted in two dimensions.

According to another embodiment, a diffractive optical element having a unit structure periodically arranged in a first direction and configured to diffract incident light in a first direction is provided. The diffractive optical element has a phase pattern that satisfies $$\tan \theta(MH) - \tan \theta(MH-1) < (FWHM/2Z)[1/\cos \theta(MH) + 1/\cos \theta(MH-1)],$$

where FWHM denotes the beam diameter of the incident light, Z denotes the distance from the diffractive optical element to a projection plane, $\theta(MH)$ denotes the diffraction angle of an outermost light beam among light beams diffracted in the first direction, and $\theta(MH-1)$ denotes the second-outermost light beam diffracted in the first direction.

According to another embodiment, a diffractive optical element having a unit structure periodically arranged in two dimensions and configured to diffract incident light in two dimensions is provided. The diffractive optical element has a period P with a length that satisfies $$\lambda \times Z/(\alpha \times FWHM) < P < FWHM,$$

where $\lambda$ denotes the wavelength of the incident light, FWHM denotes the beam diameter of the incident light, and Z denotes the distance from the diffractive optical element to a projection plane. The diffractive optical element has a phase pattern designed such that the value of $\alpha$ is constant if a field of view produced by the diffractive optical element is smaller than 30°, and that the value of a monotonically decreases as a function the field of view if the field of view is 30° or greater.

With any one of the above-described configurations, uniformity of the intensity distribution of diffracted light beams is improved over a wide field of view.

BRIEF DESCRIPTION OF DRAWINGS

FIG. 2 is a diagram explaining angular separation which changes depending on the diffraction angle;

FIG. 3A shows a relation between diffraction angle and angular separation between consecutive orders of diffraction with a period length P of 100 μm;

FIG. 3B shows a relation between diffraction angle and angular separation between consecutive orders of diffraction with a period lengths P of 1000 μm;

FIG. 4A reconfigures the relation of FIG. 3A into positions of the diffracted light beams projected onto a screen;

FIG. 4B reconfigures the relation of FIG. 3B into positions of the diffracted light beams projected onto a screen;

FIG. 10 shows a condition for making the light beams diffracted in two dimensions overlap on an equidistant surface;

FIG. 15A shows a first configuration for maintaining a uniform intensity distribution at a wide FOV, showing angular separation as a function of diffraction angle;

FIG. 15B shows the first configuration, showing intensity on the equidistant surface as a function of diffraction angle;

FIG. 38A shows a target image using IFTA;

FIG. 38B shows a DOE phase pattern; and

FIG. 38C shows a projected image.

DESCRIPTION OF EMBODIMENTS

Figure 1A:
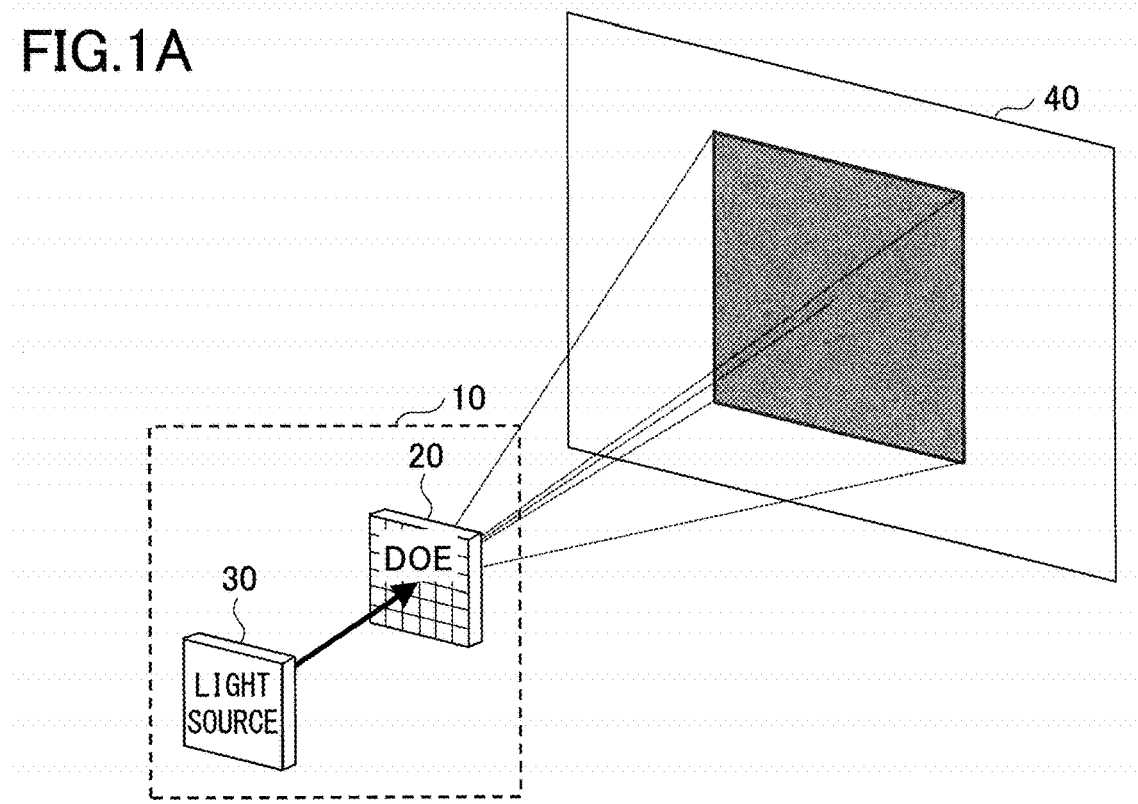
FIG. 1A is a diagram illustrating the basic concept of an embodiment of the present invention, showing the basic configuration of a projection device.
Figure 1B:
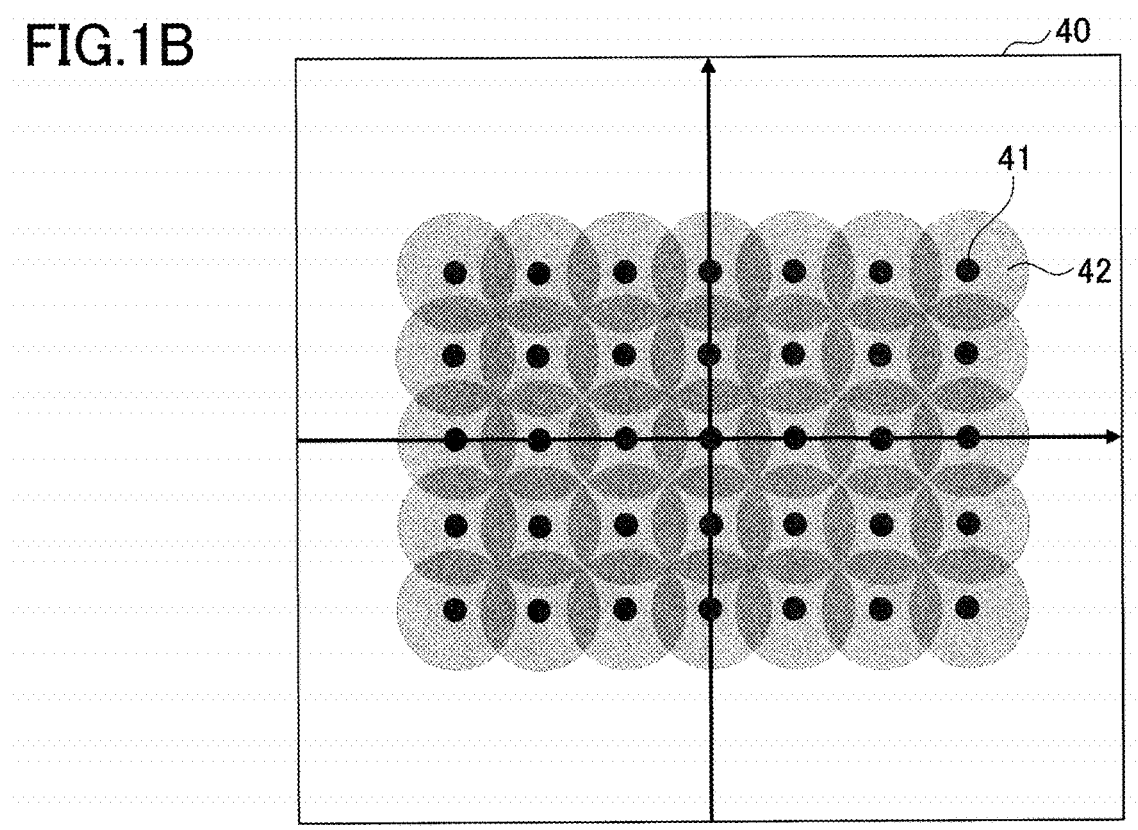
FIG. 1B is a diagram illustrating the basic concept of an embodiment of the present invention, showing diffracted light beams overlapping one another without gaps.

FIG. 1A and FIG. 1B are diagrams illustrating a basic concept of an embodiment of the present invention. To achieve wide-angle diffusion using a diffractive optical element, the positions of diffraction spots 41 are designed such that the diffracted light beams 42 overlap one another without gaps on the projection plane 40, as illustrated in FIG. 1B.

For example, when the projection plane 40 is irradiated by a projection device 10 having a light source 30 and a diffractive optical element 20 (hereinafter, abbreviated as "DOE 20"), as illustrated in FIG. 1A, a light beam output from the light source 30 is dispersed into a large number of diffracted light beams 42 through the DOE 20, and diffused over a predetermined angular range. The basic idea of the embodiment of the present invention is to control the positions of the diffraction spots 41 so that adjacent diffracted light beams of consecutive orders of diffraction overlap each other on the projection plane 40.

A "diffraction spot" is a point at which a center of intensity (i.e., peak intensity) of the light beam diffracted by the DOE 20 in the associated direction is located. A "diffracted light beam" refers to a light beam that has a certain range of intensity distribution around the diffraction spot, for example, a range in which the light intensity is maintained at or above $1/e^2$ of the peak intensity, or at or above the half maximum of the intensity distribution.

Because angular separation between diffracted light beams of adjacent orders of diffraction varies depending on the diffraction angle, it is not easy to design the positions of the diffraction spots 41 such that all the diffracted light beams 42 overlap one another on the projection plane 40.

Although a projection plane 40 is illustrated as a flat screen in FIG. 1, angular separation between adjacent diffracted light beams also varies on a curved projection plane with a certain radius of curvature, or on an equidistant surface used for a measuring device such as a LiDAR device, depending on the diffraction orders. Again, it is not easy to design the positions of the diffraction spots so as to bring the diffracted light beams to overlap one another without gaps on the projection plane.

FIG. 2 is a diagram explaining changes in the angular separation depending on the diffraction angle. The diffraction angle θ is an angle between the zero-order diffraction light, which passes straight through the DOE 20, and the optical axis of the individual diffracted light beam. The angular separation is the angle between two diffracted light beams of consecutive orders of diffraction.

When light of wavelength λ is perpendicularly incident on the DOE 20 having a period P with a specified length (hereinafter, referred to as "period length P"), the m-th order diffracted light beam is expressed by formula (1).

$$M \times \lambda = P \times \sin \theta. \tag{1}$$

The period length P of the DOE 20 refers to the size or the repetition period of unit patterns (or unit structures) which comprises the DOE 20.

When the light beams diffracted by the DOE 20 are projected onto a flat screen surface S, the diffracted light beams 42 located near the zero-order diffraction light overlap one another on the screen surface S. However, the angular separation increases as the order of diffraction increases, namely, as the light beam is diffracted closer to the screen edge. At a certain degree of angular separation, diffracted light beams 42 of adjacent diffraction orders do not overlap any longer. The dashed line in the figure indicates the equidistant surface E and its separation from the screen surface S, as a reference.

FIG. 3A and FIG. 3B show relationships between diffraction angle and angular separation between orders of diffraction. FIG. 3A shows angular separation between orders as a function of diffraction angle when the period length P of the DOE 20 is 100 μm. FIG. 3B shows the angular separation between orders as a function of the diffraction angle when the period length P of the DOE 20 is 1000 μm. The vertical axis on the left-hand side represents the diffraction angle dependence of the angular separation when light having a wavelength of 940 nm is projected. The vertical axis on the right-hand side represents the diffraction angle dependence of the angular separation when light having a wavelength of 400 nm is projected.

As is clearly shown in FIG. 3A and FIG. 3B, angular separation between orders of diffraction exponentially increases as the diffraction angle increases, regardless of the period length P or the wavelength λ of the DOE 20. However, when the period length P of the DOE 20 becomes 10 times greater, the diffraction angle becomes very small and the angular separation decreases to about $1/10$.

In order to achieve a FOV of 120°, that is, a diffraction angle of −60° or 60°, the angular separation between the zero-order light and the light beam diffracted at a diffraction angle of 60° is doubled, as indicated by the white arrow in the figure. To achieve a FOV of 90°, the angular separation increases to 1.5 times or more, which is understood from the comparison between a light beam diffracted near the zero-order diffraction light and a light beam diffracted at 45°.

FIG. 4A and FIG. 4B reconfigure the relationships of FIG. 3A and FIG. 3B into the projected positions of the diffracted light beams on the screen surface S. FIG. 4A shows diffraction when the period length P of the DOE 20 is small, and FIG. 4B shows diffraction when the period length P' of the DOE 20 is greater than the period length P (P'>P).

When the size of the unit structure 201S of the DOE 20 is small with a small period length P as shown in FIG. 4A, the diffraction angle is large, and the space between adjacent diffraction spots 41 on the screen surface S or the equidistant surface E is wide. In particular at a wider angle side, diffracted light beams 42 are completely separated from each other. When the size of the unit structure 201L of the DOE 20 is large with a large period length P' as shown in FIG. 4B, the diffraction angle becomes smaller, and diffraction spots 41 are densely produced on the screen surface S or the equidistant surface E by the overlapping diffracted light beams 42.

Each of the unit structures 201S and 201L has a phase pattern, such as a grid pattern, a binary pattern, a multi-level step pattern, etc. The light incident onto the DOE 20 is subjected to a phase shift corresponding to the pattern or the spatial distribution of the unit structures 201, and diffraction occurs.

In order to secure the overlap of the diffracted light beams 42 on the screen surface S, the period length P of the DOE 20 may be increased to reduce the diffraction angle. However, reducing the diffraction angle makes it difficult to provide a sufficiently wide FOV. Another criterion is that the incident beam 31 onto the DOE 20 has to cover the entire pattern of each unit structure 201. Even if the period length P is increased, the condition for covering the entirety of the unit structure with the incident beam 31 has to be maintained.

Efficient light projection with uniform distribution should be achieved by specifying the appropriate range of the period length P, which allows the diffracted light beams to overlap one another on the projection plane over a target FOV, and which allows the entire unit structure 201 of the DOE 20 to be irradiated by the incident light. In studying these criteria, consideration has to be made to the fact that the diffraction orders do not always result in a simple grid pattern, depending on the condition of the projection plane.

Figure 5:
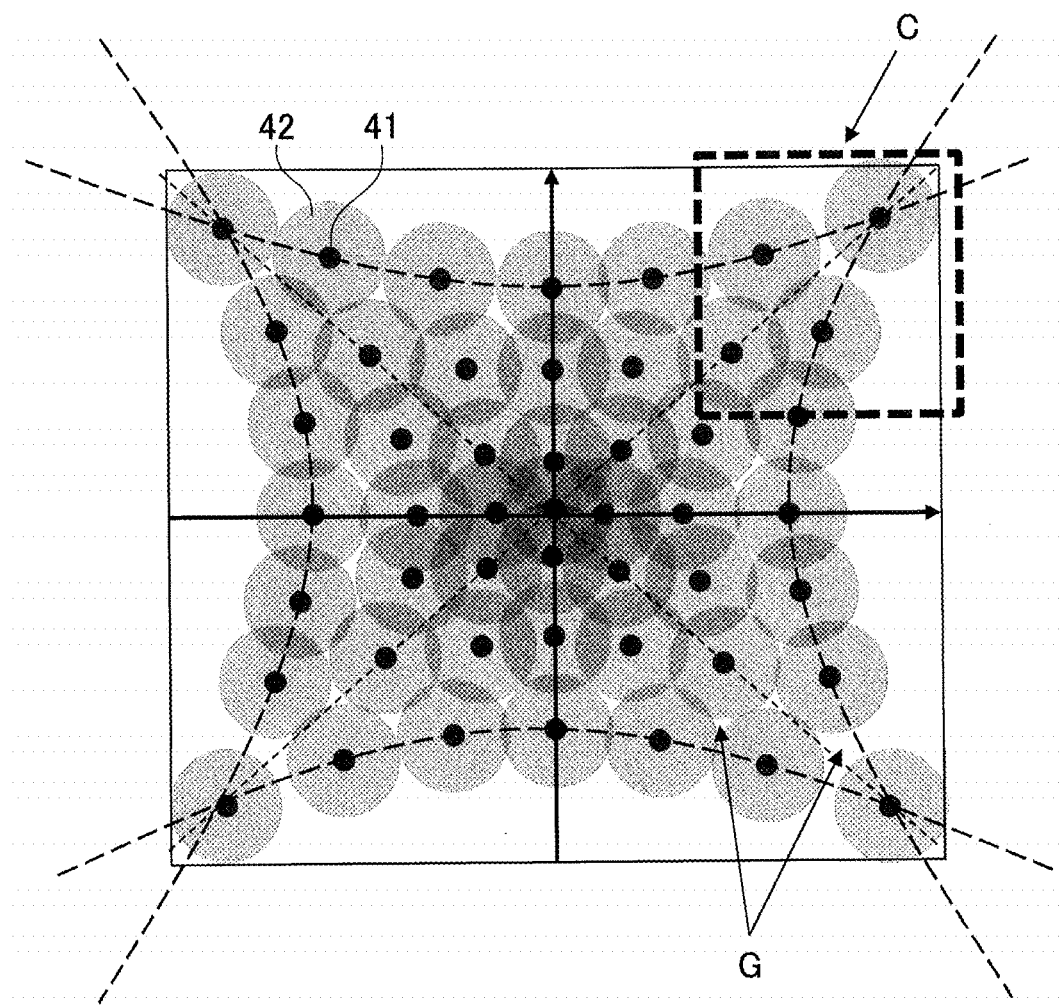
FIG. 5 shows an example of insufficient overlap of diffracted light beams on a projection plane.

FIG. 5 shows an example of insufficient overlap of diffracted light beams on a flat projection plane. When light is projected onto an equidistant surface, such as a spherical surface, the diffraction spots are produced in a grid pattern. However, the grid deforms on a flat screen. In particular, deformation becomes conspicuous at the corners of the FOV, as illustrated in the area C surrounded by the dashed line, and gaps G appear due to the insufficient overlap of the diffracted light beams. In the area C with large deformation, the coordinates of the diffraction spots 41 are complicated, and correction to the spot positions is difficult.

Accordingly, the relationship between the optimum FOV and the period length of DOE is studied below, on the premise of a wide FOV. Because the conditions are different between projection onto the equidistant surface and projection onto the screen surface, as described above, the respective cases are studied individually.

Figure 6A:
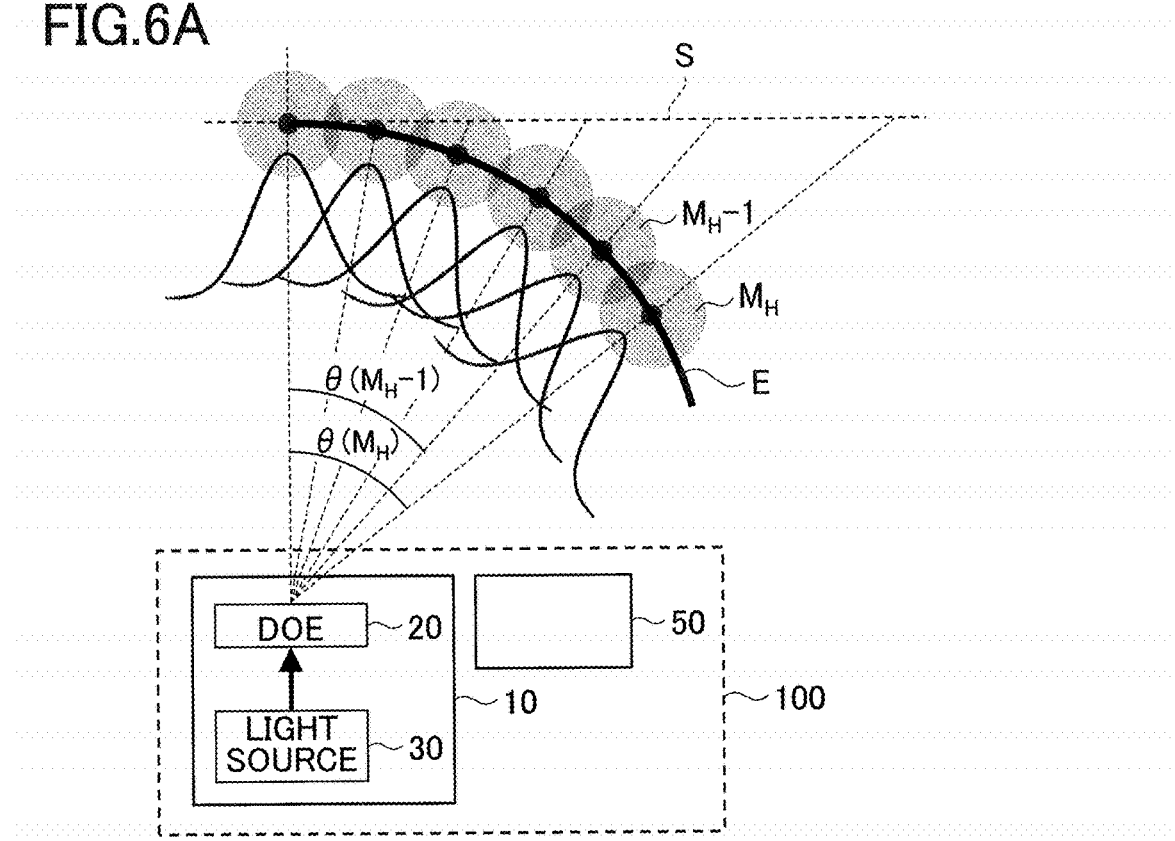
FIG. 6A shows an example of one-dimensional overlap of diffracted light beams projected onto an equidistant surface.
Figure 6B:
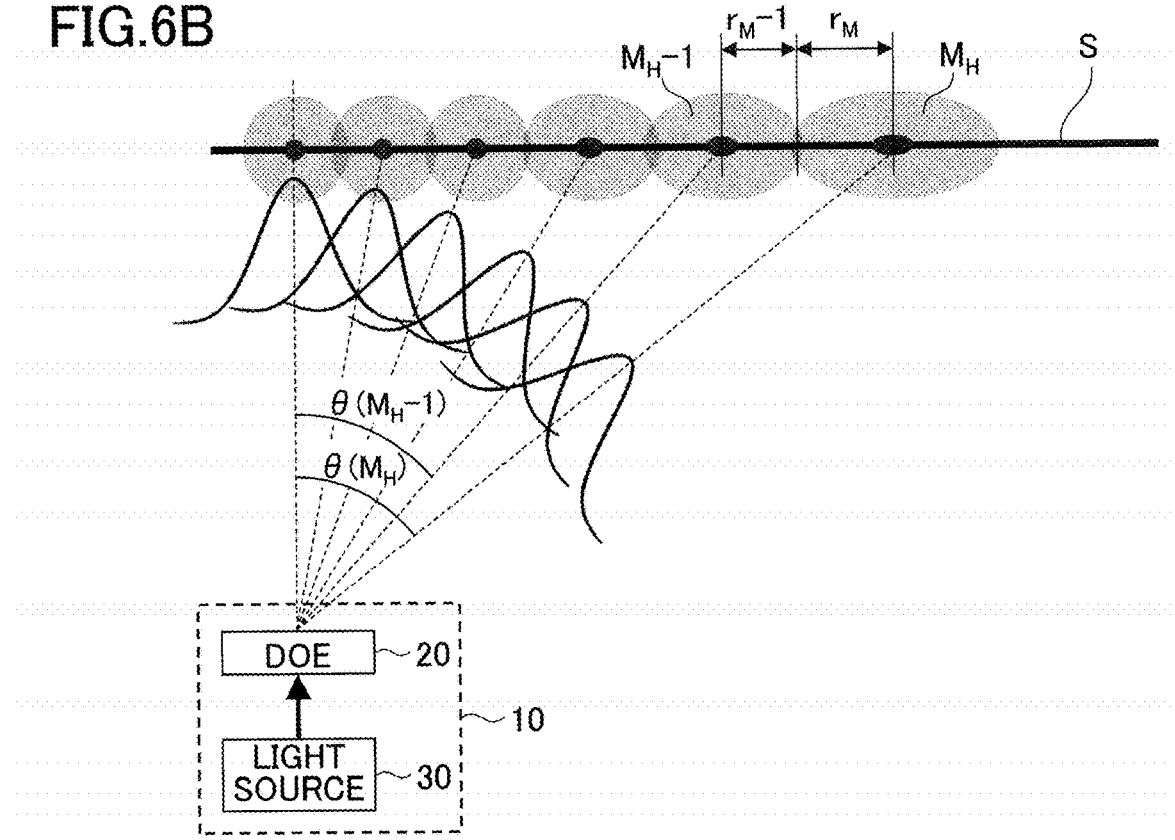
FIG. 6B shows an example of one-dimensional overlap of diffracted light beams projected onto a screen surface.

In FIG. 6A shows projection onto the equidistant surface E, and FIG. 6B shows projection onto a flat screen surface S. Projection onto the equidistant surface E assumes a relatively long range projection applied to sensing, measurement of distance or length, and so on. In this case, a divergent light source is used as a light source 30 of the projection device 10 to enable far field projection. To apply the wide-angle projection of the embodiment to the technical field of measurement of distance or length, the projection device 10 may be combined with a detector 50 to configure a measuring device 100. Because the detector 50 is configured to detect the light beam reflected from an object present within the FOV, it is desirable for the diffused light beams to be projected so as to cover the entire projection plane, including the equidistant surface, without gaps.

In FIG. 6B, light is projected onto the flat screen surface S. If the screen is curved at a constant radius of curvature, the screen surface becomes the equidistant surface shown in FIG. 6A. In the following description, projection onto the screen surface S refers to projection onto a flat surface.

On the screen surface S, relatively short-range projection using collimated light is assumed. The light source 30 is, for example, a laser source configured to output collimated light. Using collimated light, the collimated state is maintained in the respective light beams diffracted by the DOE 20 in various directions.

When the collimated light is diffracted and projected onto the screen surface S, the cross-sectional beam shape deforms as the beam moves further away from the FOV center. As a result, the radii rM and rM−1 of the diffracted light beams MH and MH−1, which are adjacent near the edge of the FOV, differ from each other.

<Projection onto Equidistant Surface; One Dimension>

Figure 7:
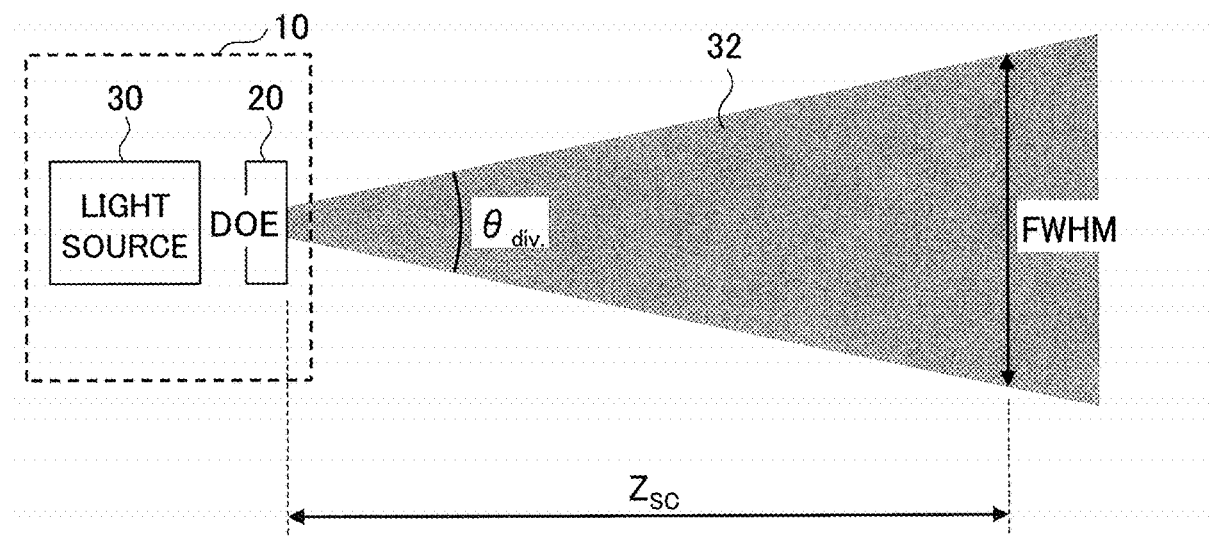
FIG. 7 shows a condition for making diffracted light beams overlap on an equidistant surface when diverging light is used.

FIG. 7 illustrates one-dimensional projection onto an equidistant surface. Here, FOV of 30° or more, preferably 60° or more, and more preferably 120° or more is assumed. Such a wide FOV is useful for the technical field of distance measurement and projection. When the FOV is 30° or more, the change in angular separation becomes conspicuous, although at a FOV less than 30°, the change in angular separation is negligibly small as shown in FIG. 3.

When the light source 30 is a divergent light source, the light beams of the respective orders of diffraction diffracted by the DOE 20 also become the divergent light beams 32. The divergence angle of the divergent light beam 32 is denoted as $\theta_{div}$. The beam diameter of the divergent light beam 32 increases along with the distance from the FOV center. It is assumed that the beam diameter of the diffracted light beam on the equidistant surface is expressed as full width at half maximum (FWHM), which represents the spread of the beam.

The angular separation of diffracted light beams projected onto the equidistant surface varies depending on the diffraction angle, but the beam deformation depending on the order of diffraction is negligibly small. Accordingly, considering only the change in the angular separation is sufficient to study the conditions for the diffracted lights beams overlapping one another.

For the purpose of simplification, diffraction in one dimensional (one direction) is considered first. In the configuration of FIG. 6A, in order for all the diffracted light beams to overlap one another on the equidistant surface E, the angular separation between the two adjacent diffracted light beams located at the outermost end of the FOV should be smaller than the divergence angle $\theta_{div}$.

Assuming that the diffraction angle of the outermost diffracted light beam (MH) in the FOV is θ(MH), and that the diffraction angle of the second outermost diffracted light beam (MH−1) is θ(MH−1), then the angular separation is θ(MH)−θ(MH−1). Therefore, the condition of $$\theta(MH) - \theta(MH-1) < \theta_{div} \qquad (2)$$

should be satisfied. Referring back to FIG. 7, the divergence angle $\theta_{div}$ can be expressed as $$2 \cdot \arctan\frac{FWHM}{2Z_{SC}}$$

using the radius of the beam diameter FWHM on the projection plane and the distance $Z_{sc}$ to the projection plane.

The condition of formula (2) can be rewritten into formula (2)'.

$$\theta(M_H) - \theta(M_H - 1) < \delta \qquad (2)'$$

$$\delta = \theta_{div.} \text{ or } 2 \cdot \arctan\frac{FWHM}{2Z_{SC}}$$

In targeting a wide FOV, all the diffracted light beams projected in one direction overlap one another on the equidistant surface within the FOV, as long as the angular separation between the two diffracted light beams of consecutive orders of diffraction adjacent at the farthest end is smaller than the beam divergence angle $\theta_{div}$. The phase pattern of the DOE 20 used in the projection device 10 having the divergent light source is designed so as to satisfy formula (2), that is, the condition that the angular separation between the diffracted light beams (MH) and (MH−1) adjacent at the outermost of the FOV is smaller than the divergence angle $\theta_{div}$ of the light source 30. Thus, uniform irradiation can be achieved at a wide FOV.

<Projection onto Screen Surface; One Dimension>

Figure 8:
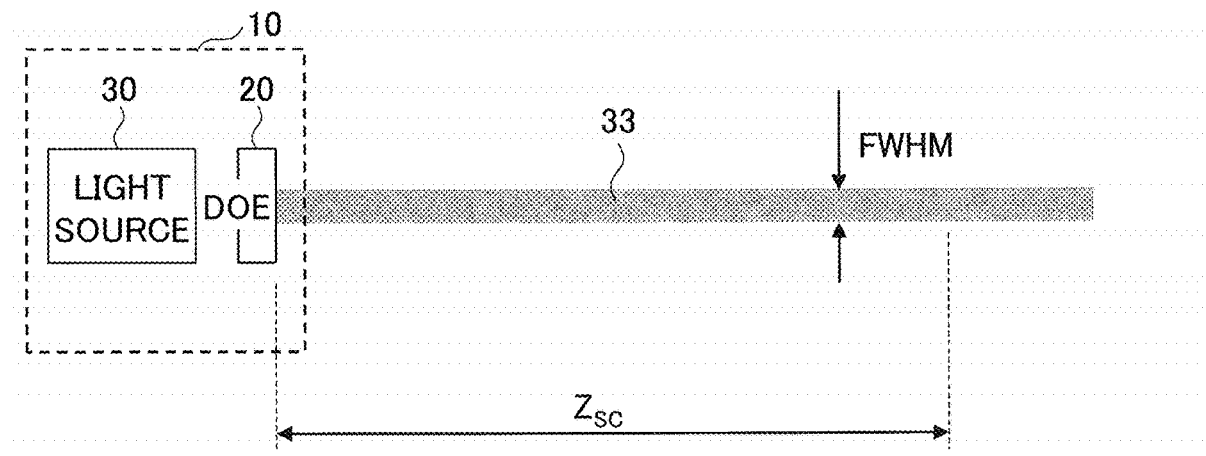
FIG. 8 shows a condition for making diffracted light beams overlap on a screen when collimated light is used.

FIG. 8 shows overlap of diffracted light beams projected onto a flat screen surface. For the projection onto the screen surface in a relatively short range, FOV of 30° or more, preferably 60° or more, and more preferably 120° or more, is again assumed for the same reason as has been described above with reference to FIG. 7.

When the light output from the light source 30 is collimated light 33, the beam diameter FWHM is constant. However, on the screen surface S, the beam diameter expands in the horizontal direction depending on the diffraction angle, as shown in FIG. 6B.

One condition for the diffracted light beams to overlap one another on the screen surface without gaps in the FOV is $$\tan\theta(M_H) - \tan\theta(M_H - 1) < \frac{FWHM}{2Z_{SC}} \left( \frac{1}{\cos\theta(M_H)} + \frac{1}{\cos\theta(M_H - 1)} \right) \quad (3)$$

where $Z_{sc}$ denotes the distance from DOE 20 to the screen surface. The condition of formula (3) is explained with reference to FIG. 9A and FIG. 9B.

In order for the outermost diffracted light beam MH and the second outermost diffracted light beam (MH−1) to overlap in one direction, the distance between the diffraction spots of these two light beams should be smaller than the sum of the radii of the two diffracted light beams.

Figure 9A:
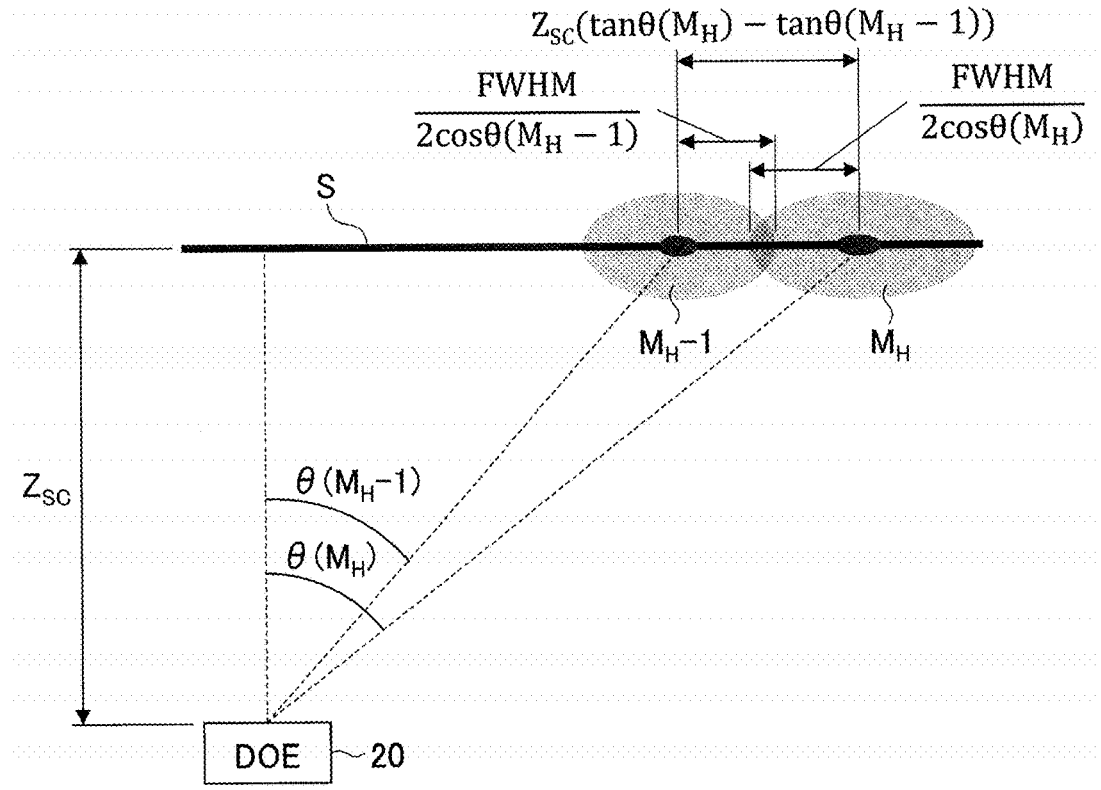
FIG. 9A is a diagram explaining the condition of FIG. 8.

As shown in FIG. 9A, the distance between the spot positions of the diffracted light beams MH and (MH−1) is $$Z_{sc} \times [\tan \theta(MH) - \tan \theta(MH-1)].$$

Figure 9B:
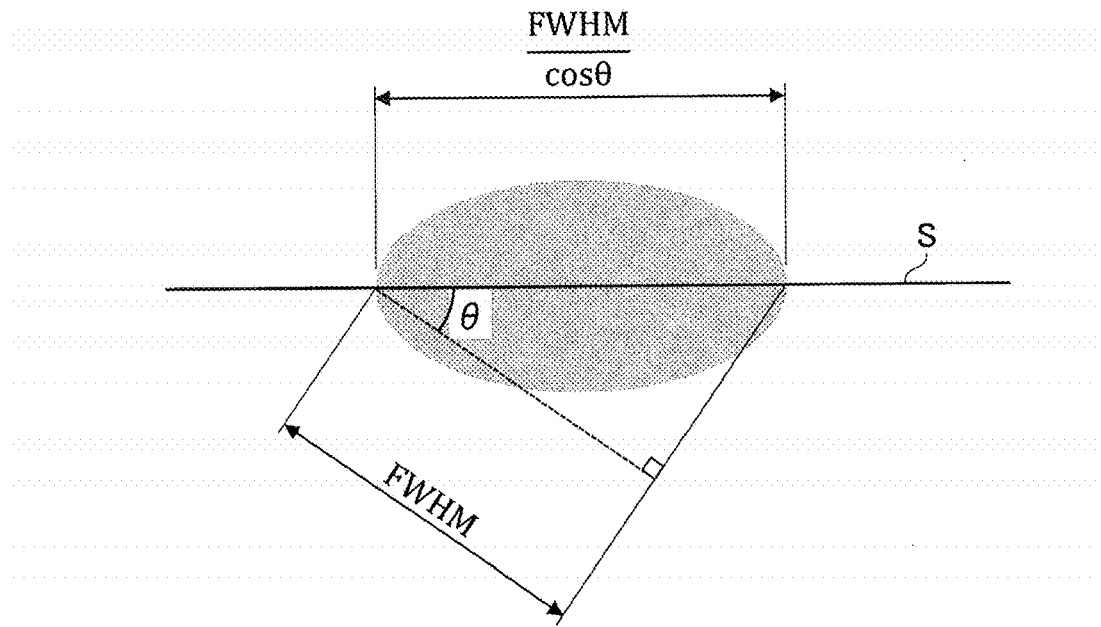
FIG. 9B is a diagram explaining the condition of FIG. 8.

In FIG. 9B, the diameter of the diffracted light beam in the horizontal direction on the screen surface S is FWHM/cos θ, assuming that the diameter of the parallel beam diffracted at angle θ is FWHM. The radius of the diffracted light beams MH is FWHM/2 cos θ(MH), and the radius of the diffracted light beam (MH−1) is FWHM/2 cos θ(MH−1).

The two diffracted light beams overlap each other if the condition $$Z_{sc} \times [\tan \theta(MH) - \tan \theta(MH-1)] < FWHM \times [(1/2 \cos \theta(MH) + 1/2 \cos \theta(MH-1)]$$

is satisfied. By modifying this condition, formula (3) is derived.

When the projection device 10 is applied to projection onto the screen surface S, using a light source 30 configured to output collimated light, then the DOE 20 is designed such that the distance between the two adjacent diffraction spots is less than the sum of the radii of the light beams formed by these two diffraction spots.

Based on the general condition $m \times \lambda = P \times \sin \theta$ of formula (1), the diffraction angle θ(m) of the m-th order diffracted light beam is expressed as $$\theta(m) = \arcsin(m\lambda/P). \quad (4)$$

When the FOV is entirely covered by diffracted light beams, the outermost diffracted light beam MH is expressed by formula (5).

$$M_H = \left[ \frac{P}{\lambda} \sin \frac{FOV}{2} \right] + 1 \quad (5)$$

The first term [(P/λ)×sin (FOV/2)] of the right-hand side represents the maximum order of diffraction $m_{max}$. The square brackets represent the Gaussian notation to truncate decimal digits to take the integer part.

By configuring the angular separation between light beams diffracted by the DOE 20 so as to satisfy the condition of formula (3), and by setting the period length P of the DOE 20 based on formula (5), then the diffracted light beams can be projected in one direction onto the screen surface S without gaps. Thus, uniform irradiation can be achieved over a wide FOV.

<Projection onto Equidistant Surface; Extended to Two Dimensions>

FIG. 10 is a diagram explaining the overlap of diffracted light beams in two dimensions on the equidistant surface. Here, long range projection using divergent light is assumed.

In the case of two-dimensional diffraction, the FOV is defined as xFOV in the x direction and yFOV in the y direction. The FOV values do not have to be the same in the x-direction and the y-direction. Depending on the shape of the light emitting aperture of the light source 30, a light beam having an elliptical cross section elongated in the y direction may be output.

For the two-dimensional diffraction, the diffraction spots 41 are designed such that the ellipses of the four diffracted light beams 42 adjacent in the x and y directions on the equidistant surface E overlap one another in the center of the area irradiated by these four diffracted light beams 42. Let's focus on the light beams diffracted at the corner 210 of the DOE 20, that is, the light beams diffracted to the farthest end of the FOV.

Accordingly, the diffraction angle of the outermost light beam in the x direction is denoted as θx(MHx), the diffraction angle of the second outermost light beam in the x direction is denoted as θx(MHx−1), the diffraction angle of the outermost light beam in the y direction is denoted as θy(MHy), and the diffraction angle of the second outermost light beam in the y direction is denoted as θy(MHy−1).

The central angular coordinates (ax, ay) of the area in which the four diffracted light beams 42 overlap one another are denoted as the midpoint of the diffracted angles of the two diffracted light beams 42 adjacent in the x direction and the midpoint of the two diffracted lights 42 adjacent in the y direction.

The coordinates "ax" and "ay" are expressed as $$ax = [\theta x(MHx) + \theta x(MHx-1)]/2$$

$$ay = [\theta y(MHy) + \theta y(MHy-1)]/2.$$

The condition for the central angular coordinates (ax, ay) of the above-described area to be covered by all of the four ellipses is expressed by $$\left( \frac{ax - \theta_x(M_{Hx})}{\delta x} \right)^2 + \left( \frac{ay - \theta_y(M_{Hy})}{\delta y} \right)^2 < 1 \quad (6)$$

where δx denotes the divergence angle $\theta x_{div}$ of the diffracted light beam in the x direction, and δy denotes the divergence angle $\theta y_{div}$ of the diffracted light beam in the y direction. When the four diffracted light beams 42 adjacent in the x and y directions at the outermost corner of the FOV satisfies the condition of formula (6), then all the diffracted light beams overlap without gaps at the equidistant surface.

If the period length P of the DOE 20, namely, the size of the unit structure 201 of the DOE 20 is increased, the distance between adjacent diffraction spots on the projection plane will decrease, and the associated light beams tend to overlap each other. However, the size of the unit structure 201 is such that it can be entirely covered by the incident light beam having a predetermined diameter. The formula (6) describes the design condition that increases the period length P as much as possible within the acceptable range in which the unit structure 201 is entirely covered by the incident light beam.

By designing the phase pattern of DOE 20 so as to satisfy the formula (6), a uniform intensity distribution can be achieved when the equidistant surface is irradiated in two dimensions with a wide FOV.

<Projection onto Screen Surface; Extended to Two Dimensions>

Figure 11A:
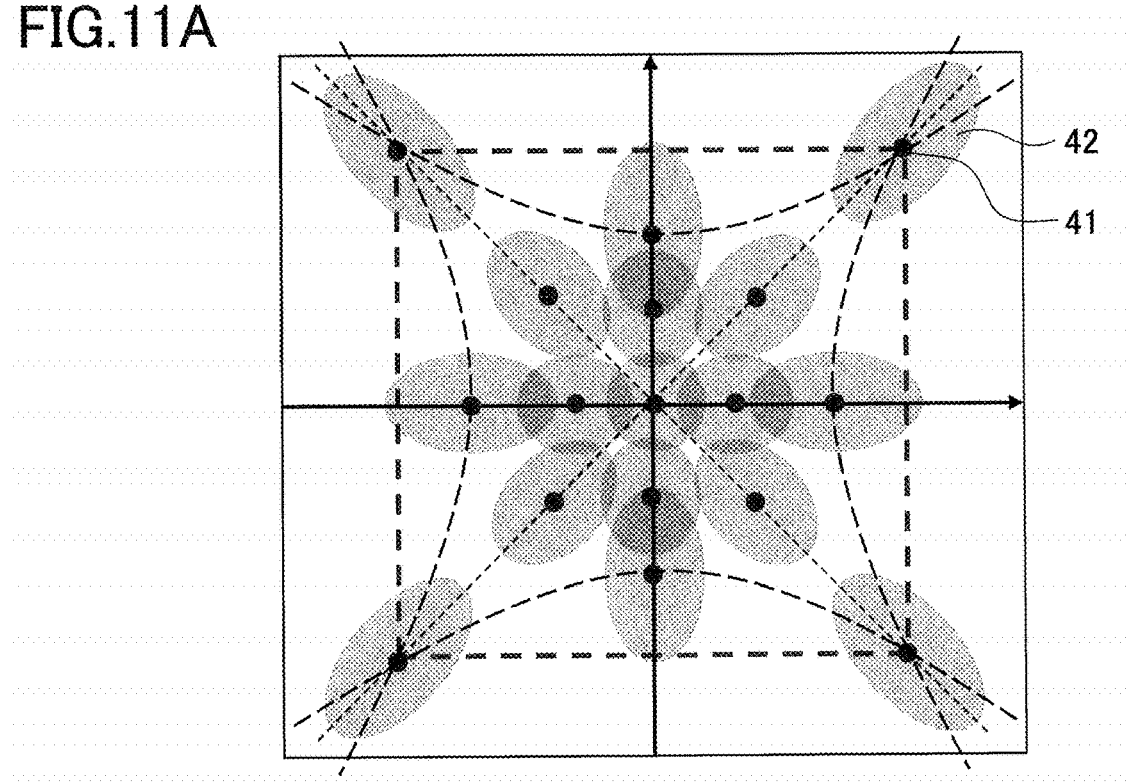
FIG. 11A is a diagram explaining two-dimensional projection of collimated light onto a screen.
Figure 11B:
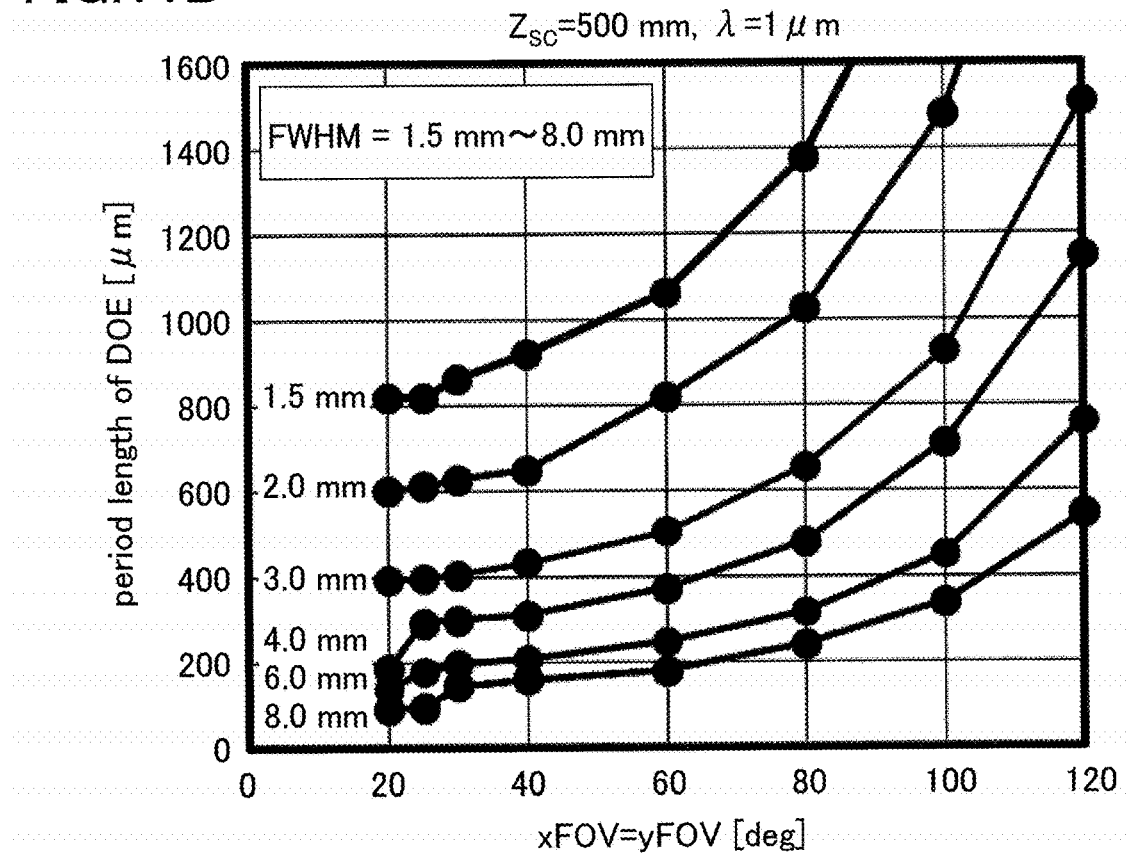
FIG. 11B is a diagram explaining two-dimensional projection, showing a simulated result of the relationship between field of view (FOV) and the period length P of the DOE.

FIG. 11A and FIG. 11B are diagrams explaining two-dimensional diffraction of a short-range projection using collimated light. In the case of two-dimensional projection onto the equidistant surface, the condition of formula (6) is derived as shown in FIG. 10

However, for the projection onto the screen surface, the closer to the periphery of the screen, the more the ellipses of the diffracted light beams 42 deform, and the positional relationship of the diffraction spots 41 becomes more complicated, as shown in FIG. 11A.

FIG. 11B shows a simulated result of the relationship between FOV and period length P of the DOE 20 in two-dimensional projection onto the screen surface. The distance $Z_{sc}$ from the DOE 20 to the screen is 500 mm, the wavelength $\lambda$ of the light source 30 is 1 µm, and the beam diameter FWHM is varied in the range of 1.5 mm to 8.0 mm to calculate the FOV dependence of the DOE period length. The FOV is defined as xFOV=yFOV, and the calculation is performed in a square FOV which provides the strictest conditions where the beams with diffraction orders toward the diagonal directions easily deform.

From FIG. 11B, it can be understood that, in order to bring the diffracted light beams to overlap one another without gaps at a wide FOV, the DOE period length (µm) needs to be increased regardless of the beam diameter (mm).

Figure 12:
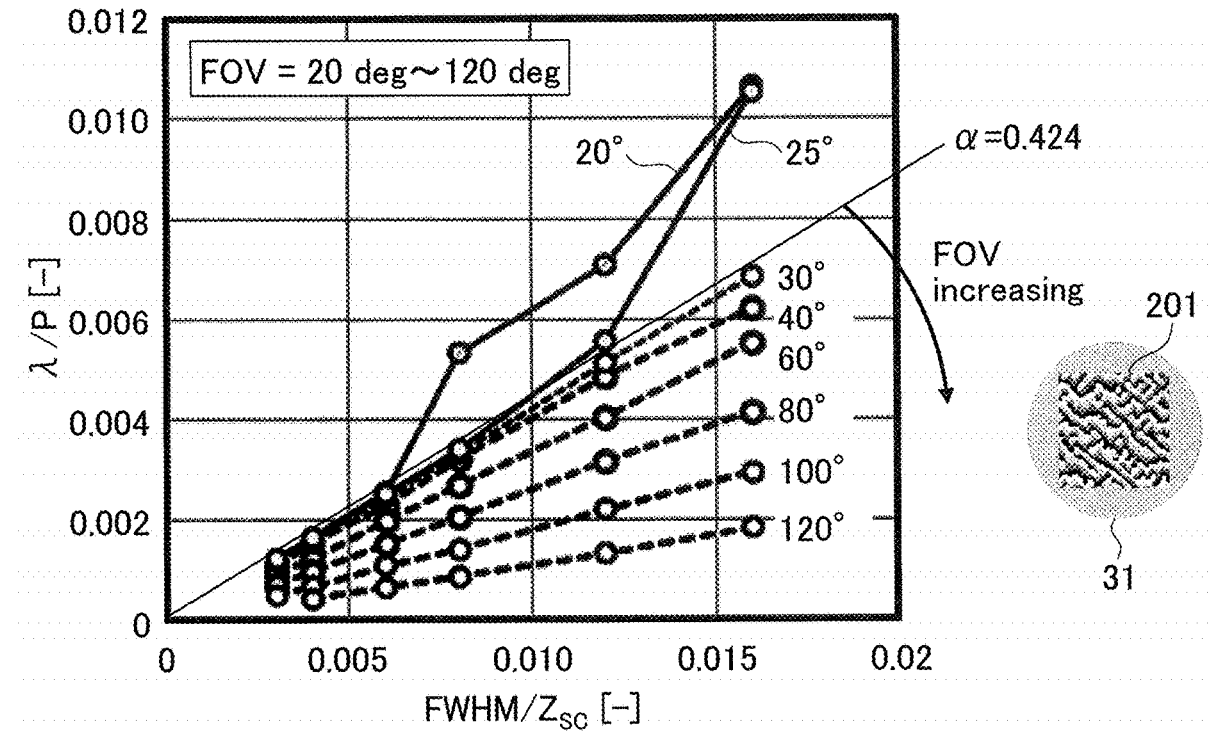
FIG. 12 is a diagram replotting the simulated result of FIG. 11B into the relationship between (FWHM/$Z_{sc}$) and (λ/P)

FIG. 12 is a diagram replotting the simulated result of FIG. 11 into the relationship between FWHM/Zsc (the ratio of beam diameter to distance) and $\lambda/P$ (the ratio of wavelength to DOE period length). In FIG. 12, the slope of each characteristic line is denoted as a. For example, when the FOV is 30°, the value of $\alpha$ is 0.424 ($\alpha$=0.424). The wider the angle, the smaller the value of a.

In order for the DOE 20 to work, the unit structure 201 of the DOE 20 must be completely covered by the incident beam 31. Accordingly the upper limit of the period length P is determined by the beam diameter FWHM. This condition is expressed by formula (7).

$$(1/FWHM_i) < (1/P_i) \qquad (7)$$

In order to achieve the desired FOV, the value of $\lambda/P$ along the vertical axis must be in the area below the slopes of the respective lines in FIG. 12. Therefore, the condition $$(\lambda/P) < \alpha \times (FWHM_i/Z_{sc}) \qquad (8)$$

is derived. The lower limit of the period length P is $\lambda \times (Z_{sc}/FWHM_i)$, which is determined by the design of the light source and the distance to the screen. From the formulas (7) and (8), the range of the period length P may be described as $$\lambda \times Z_{sc}/(\alpha \times FWHM) < P < FWHM.$$

Figure 13:
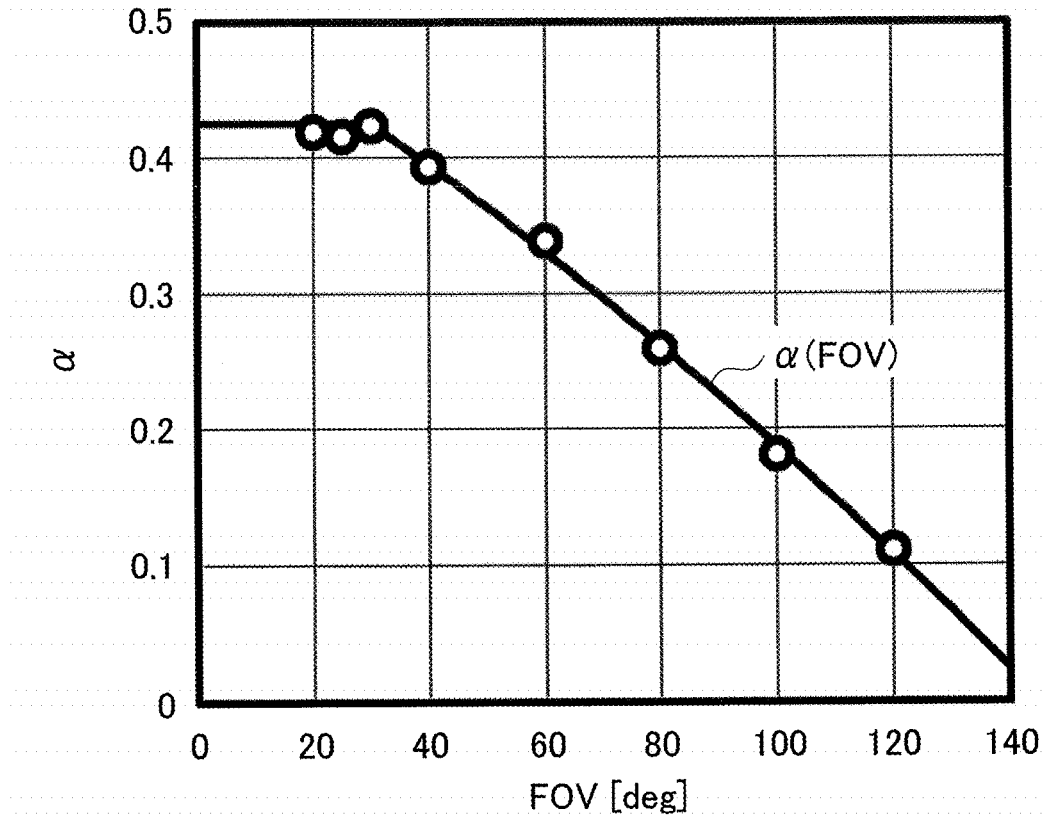
FIG. 13 shows a relationship between FOV and slope α, plotted based on FIG. 12.

FIG. 13 is a diagram plotting a as a function of FOV based on FIG. 12. When the FOV is smaller than 30°, $\alpha$ is almost constant at 0.424 ($\alpha$=0.424).

When the FOV is 30° or more, the function $\alpha$(FOV) is approximated by formula (9).

$$\alpha(FOV)=0.502-2.56\times10^{-3}(FOV)-6.34\times10^{-6}(FOV)^2. \qquad (9)$$

Here, FOV is expressed as FOV=max[xFOV, yFOV], which means that if xFOV and yFOV are different, whichever the greater one is selected.

Although, in this example, a is approximated as a function of FOV by a quadratic polynomial, the embodiments are not limited to this example. Rather, a may be approximated by other functions such that the value of a simply decreases in the FOV range of 30° or greater, more preferably, 60° or greater.

To achieve FOV of 120°, a value 120° is substituted for the variable FOV in formula (9), which leads to $\alpha$=0.12. The lower limit of the period length P is determined by inputting $\alpha$=0.12 into formula (8).

By setting a to a constant value when FOV is smaller than 30°, and by defining a as the formula (9) or other simple decreasing functions when FOV is 30° or more, uniform intensity distribution can be obtained on the screen surface over a wide FOV in two dimensions.

In this manner, by designing the DOE 20 so as to cover the projection plane with the diffracted light beams without gaps at the target FOV according to the purpose or application of the projection, the projection plane can be uniformly irradiated over a wide FOV.

<Configuration to Maintain Uniform Intensity Over Wide FOV>

With the foregoing basic design, diffracted light beams can be arranged on the projection surface without gaps. In the following, a configuration for maintaining uniform intensity distribution on the projection plane, even if the FOV is widened, will be described.

Figure 14A:
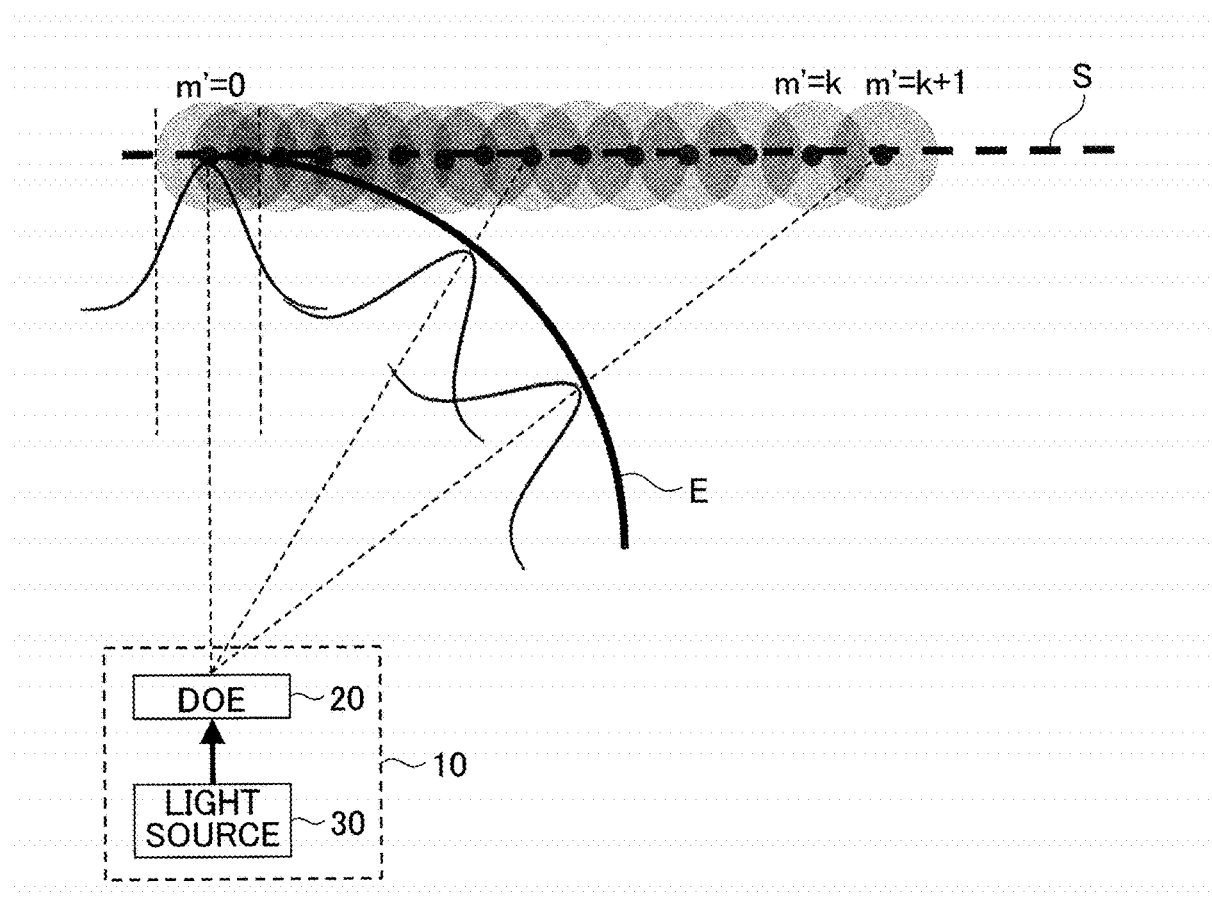
FIG. 14A shows decrease in irradiation intensity, illustrating overlap of diffracted light beams on the equidistant surface and the screen surface.
Figure 14B:
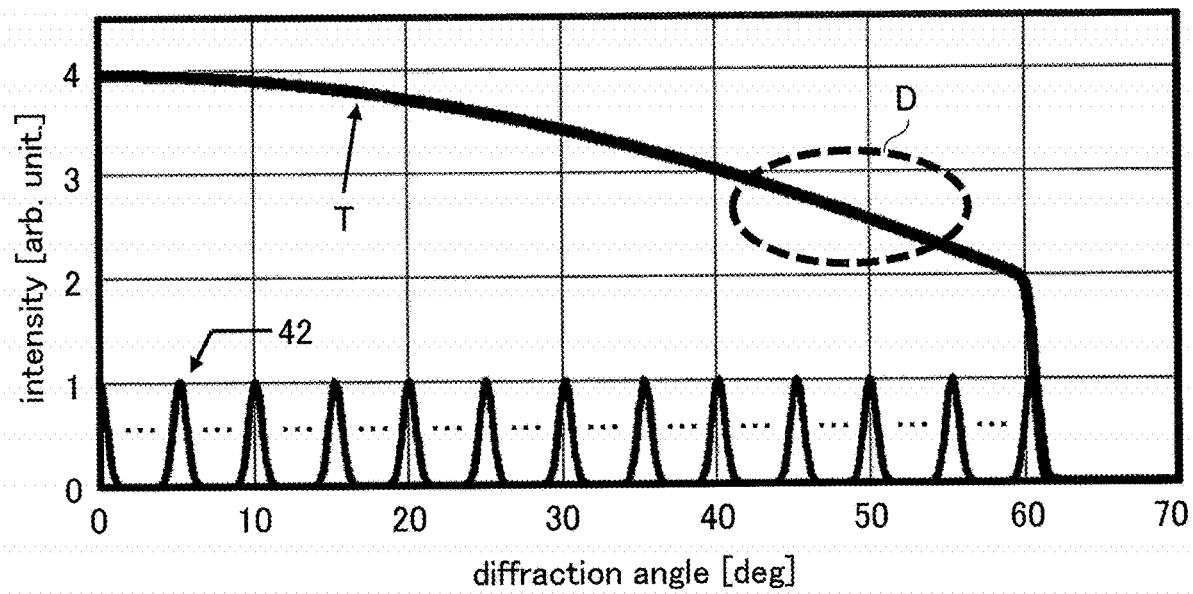
FIG. 14B shows decrease in irradiation intensity, illustrating light intensity on the projection plane as a function of diffraction angle.

FIG. 14A and FIG. 14B show the decrease in irradiation intensity, which may occur at the end portion when diffracted light beams are configured to overlap one another at a wide FOV. FIG. 14A illustrates the overlap of diffracted light beams on the equidistant surface E, as well as the screen surface S. FIG. 14B shows the intensity on the projection plane as a function of diffraction angle.

On the equidistant surface E, the intensities of the individual diffracted light beams 42 are constant regardless of the diffraction angle. However, the overall intensity T, which is determined from the sum of all the diffracted light beams, decreases as the diffraction angle increases.

When the FOV is smaller than 30°, that is, when the maximum diffraction angle is less than 15°, the change in the angular separation is small as described above, and the diffracted light beams overlap on the equidistant surface or the screen surface, achieving almost the uniform intensity.

However, when the FOV is expanded to 60° or more, the light intensity may decrease at or near the edge of the FOV, even if the DOE 20 is designed so as to satisfy the above-described conditions for bringing the diffracted light beams to overlap one another on the equidistant surface E or the screen surface S without gaps. This is because control of the angular separation becomes more difficult as the diffraction order increases.

<First Configuration>

FIG. 15A and FIG. 15B show a first configuration for maintaining the uniform intensity distribution at a wide FOV. In the first configuration, the angular separation between diffraction spots is averaged on the wide-angle projection plane by thinning out the diffraction orders.

In FIG. 15A, the line A represents the characteristic before thinning, and the group of lines in the region B represent the characteristics after the diffraction order is thinned out. Without thinning out, the diffraction orders are consecutive, and the angular separation increases as the diffraction angle increases, and as shown by the line A.

When the diffraction order is thinned out, a certain degree of angular separation is obtained at a smaller diffraction angle, while the angular separation is reduced at a greater diffraction angle. Thus, the angular separation is averaged.

Diffraction orders can be appropriately thinned out between the 0-th order to the N-th order by, for example, increasing the period length P of DOE 20. In one example, the design values without thinning out the diffraction orders are as follows.
wavelength λ=940 nm,
DOE period length P=200 μm, and
beam diameter FWHM=0.4°.
The design values with thinning out the diffraction order are as follows.
wavelength λ=940 nm,
DOE period length P=2000 μm, and
beam diameter FWHM=0.4°.
By adjusting the period length of DOE without changing the design of the light source, the diffraction order can be thinned out and the angular separation can be averaged over a wide FOV.

FIG. 15B shows the intensity (expressed by arbitrary unit) at the equidistant surface as a function of the diffraction angle. Without thinning out the diffraction orders, as indicated by line A, the intensity at the equidistant surface decreases especially in the range of the diffraction angle of 15° or more. By thinning out the diffraction order, the intensity at the equidistant surface can be maintained within a certain range over the entirety of the diffraction angles, that is, over the entire FOV, as indicated by line B. This is because the diffraction angles are averaged over the entire range of FOV.

Figure 16:
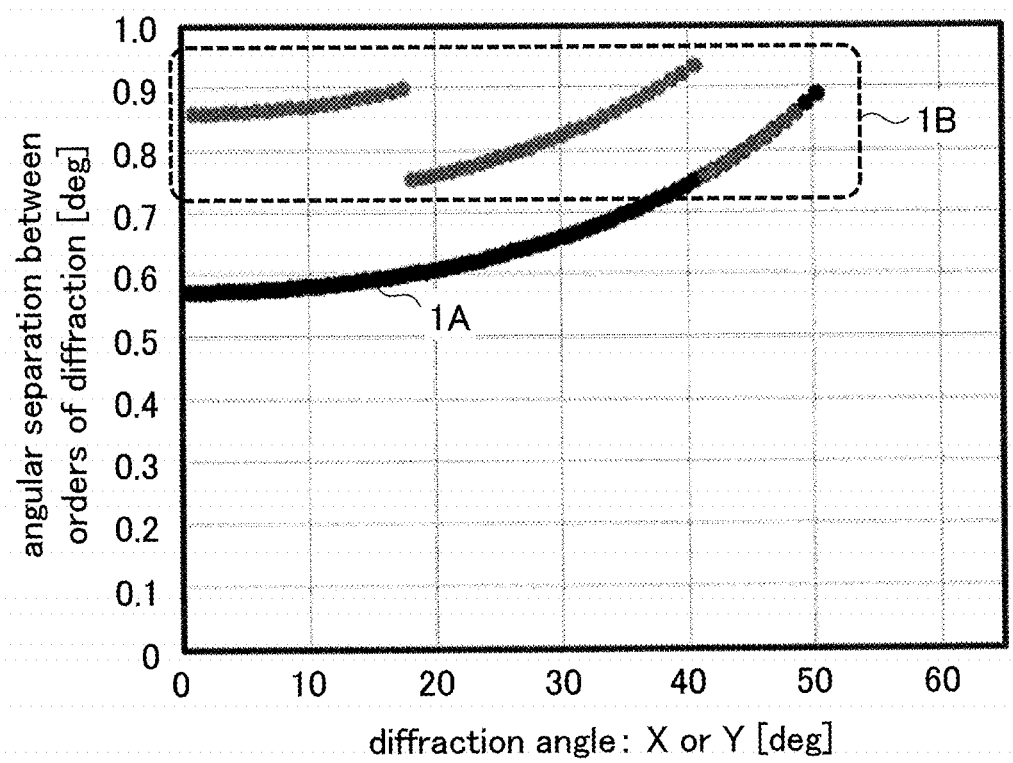
FIG. 16 shows an example of thinning out a part of diffraction orders in two-dimensional diffraction.

FIG. 16 shows a simulation example of thinning out the diffraction order in two dimensions. In this simulation, a light source having a wavelength A of 1000 nm is used, and the FOV is set to 100° in both the x-direction and the y-direction. The DOE period length before thinning out the diffraction order is set to 100 μm, and the DOE period length in the area for thinning out the diffraction order is set to 500 μm.

Line 1A in FIG. 16 represents the characteristic without thinning out the diffraction order, and the group of lines in region 1B represent the characteristics when the diffraction order is thinned out. On line 1A, the angular separation between orders of diffraction is almost constant up to the diffraction angle of about 15°. When the diffraction angle exceeds 15°, the angular separation between orders of diffraction increases. By thinning out the diffraction order in the x-direction and the y-direction, the separation angle between the orders of diffraction can be maintained within a specified range as shown in the region 1B.

Figure 17A:
FIG. 17A shows a uniformly distributed DOE pattern without thinning out diffraction orders in the example of FIG. 16.
Figure 17B:
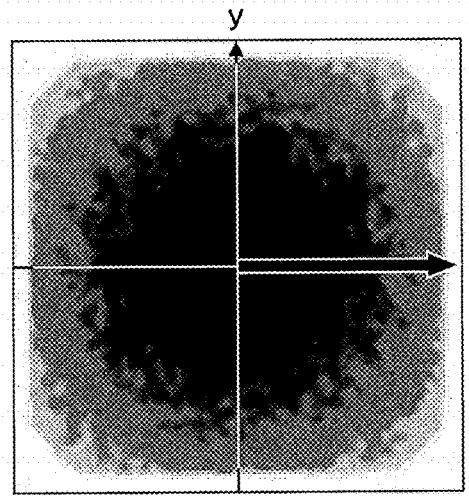
FIG. 17B shows a projected image on the equidistant surface.
Figure 17C:
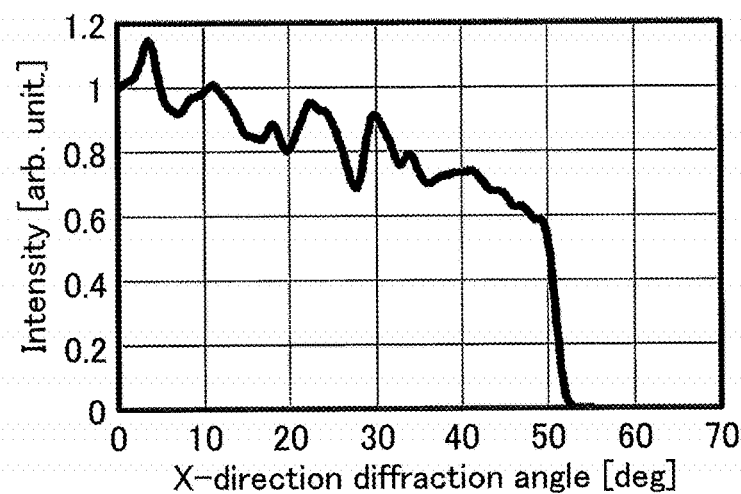
FIG. 17C shows an intensity distribution of the projected image.

FIG. 17A shows a DOE pattern with the configuration represented by line 1A of FIG. 16, without thinning out the diffraction order, and FIG. 17B shows a corresponding projection image on an equidistant surface. FIG. 17C shows the intensity distribution at the cross section along the x-axis of FIG. 17B. The wavelength λ of the light source is 1000 nm, the divergence angle is 2 degrees in the x direction and 2 degrees in the y direction, and the period length $P_x$ in the x direction and the period length $P_y$ in the y direction of DOE are both set to 100 μm. In the intensity distribution of the projected images shown in FIG. 17B and FIG. 17C, a decrease in intensity is observed in the direction from the origin toward the outer periphery.

Figure 18A:
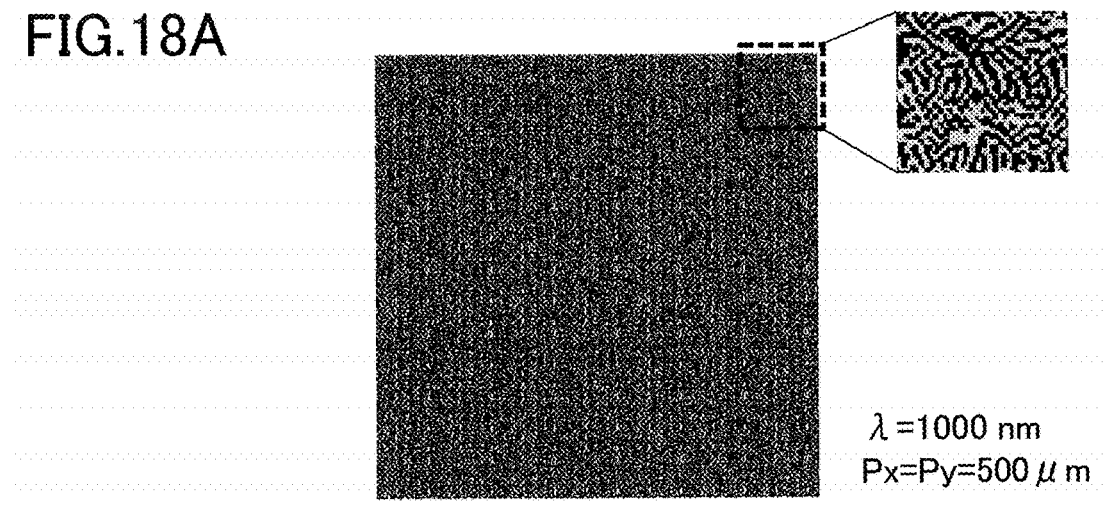
FIG. 18A shows a DOE pattern with a part of diffraction orders thinned out in the example of FIG. 16.
Figure 18B:
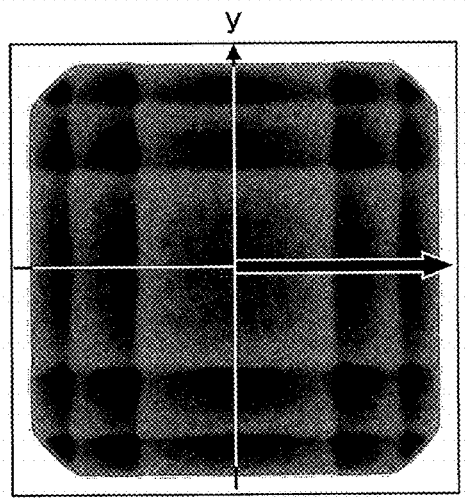
FIG. 18B shows a projected image on the equidistant surface.
Figure 18C:
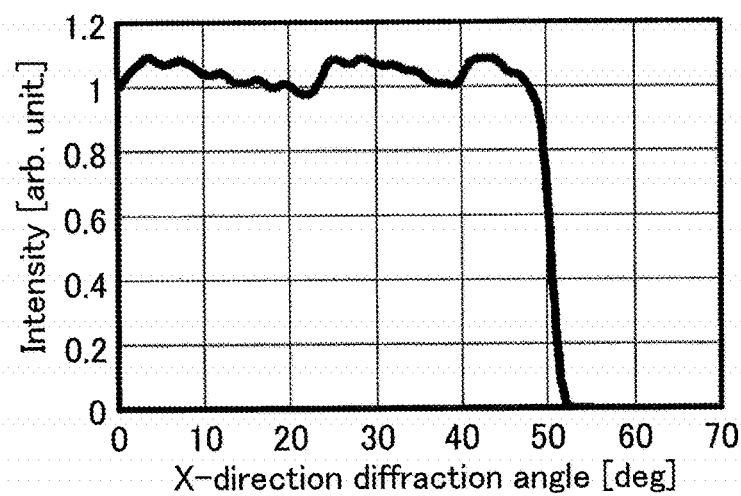
FIG. 18C shows an intensity distribution of the projected image.

FIG. 18A shows a DOE pattern with the configuration of region 1B of FIG. 16, in which the diffraction order is thinned out, and FIG. 18B shows a corresponding projected image on an equidistant surface. FIG. 18C shows the intensity distribution at the cross section along the x-axis of FIG. 18B. The wavelength λ of the light source is 1000 nm, the divergence angle is 2 degrees in the x direction and the y direction, and the period length $P_x$ in the x direction and the period length $P_y$ in the y direction of the DOE are both 500 μm. By thinning out the diffraction order, the intensity decline from the origin toward the outer periphery is suppressed, and more uniform intensity distribution can be obtained, compared with the configuration without thinning out the diffraction order.

Figure 19:
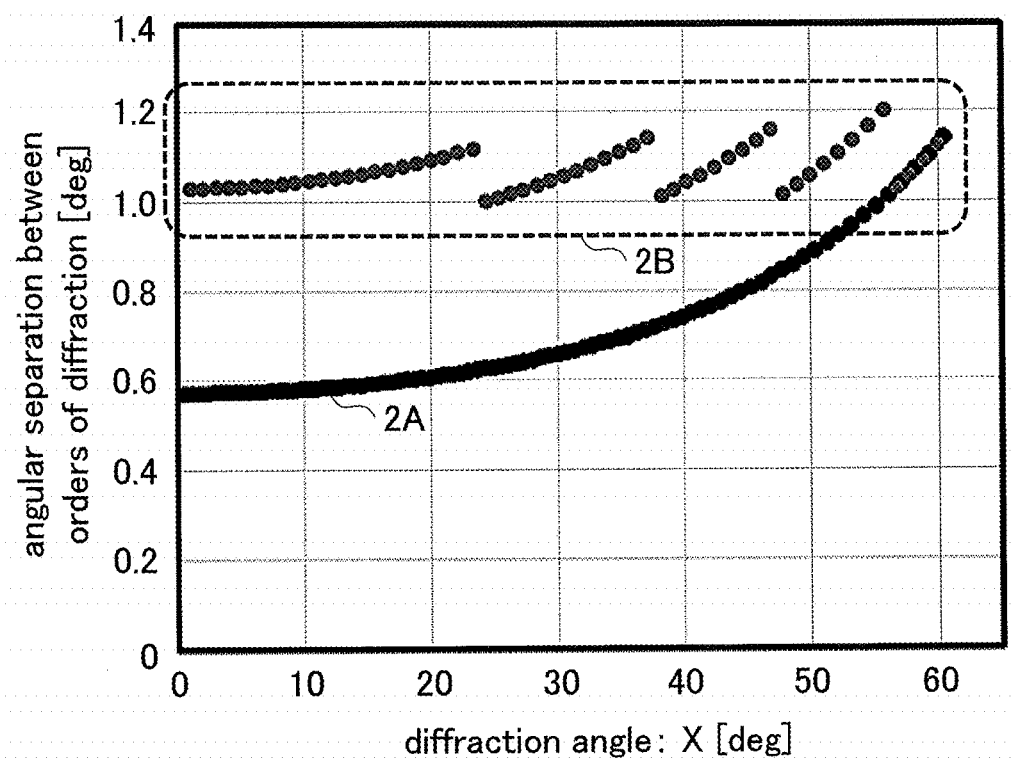
FIG. 19 shows a simulation example of thinning out diffraction orders only in the X direction.

FIG. 19 shows another simulation example in which the diffraction order is thinned out only in one direction. In this example, FOV of one of the x and y directions (e.g., in the x-direction) is as wide as 120°, while the FOV in the other direction (e.g., in the y direction) is 4°. Line 2A shows the characteristic when the orders of diffraction are consecutive, without thinning out. The group of lines in the region 2B show the characteristics when the diffraction order is thinned out only in the x direction, without any thinning out in the y direction.

Before the diffraction order is thinned, the DOE period length $P_x$ in the x direction and the DOE period length $P_y$ in the y direction are both set to 100 μm. From this state, the diffraction order is thinned out only in a predetermined direction (x direction in this example) to ensure the uniformity of the intensity over the entire range of the FOV in that predetermined direction. To be more specific, the period length $P_x$ of the OED is set to 500 μm in an area for thinning out the diffraction order, and the period length $P_y$ in the y direction is maintained at 100 μm.

Figure 20A:
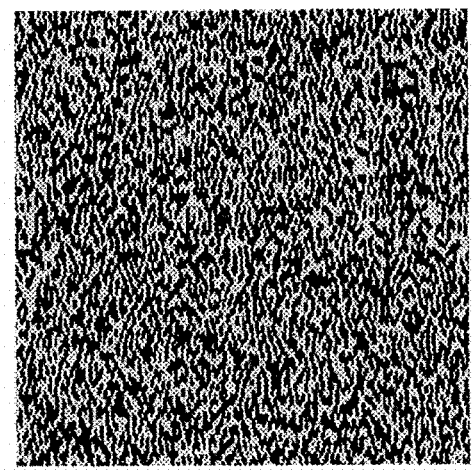
FIG. 20A shows a uniformly distributed DOE pattern without thinning out diffraction orders in the example of FIG. 19.
Figure 20B:
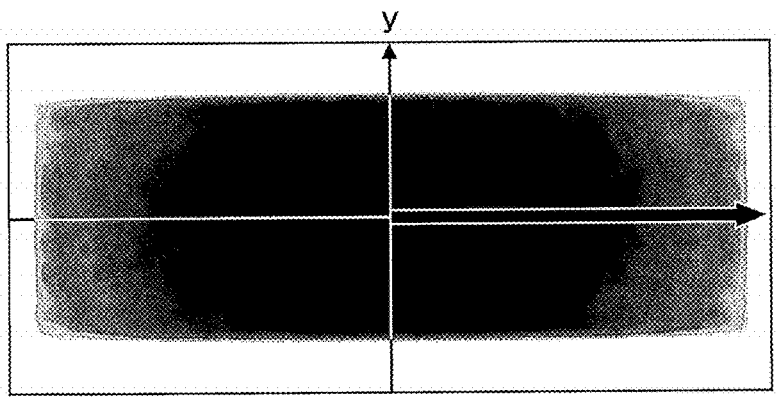
FIG. 20B shows a projected image on an equidistant surface.
Figure 20C:
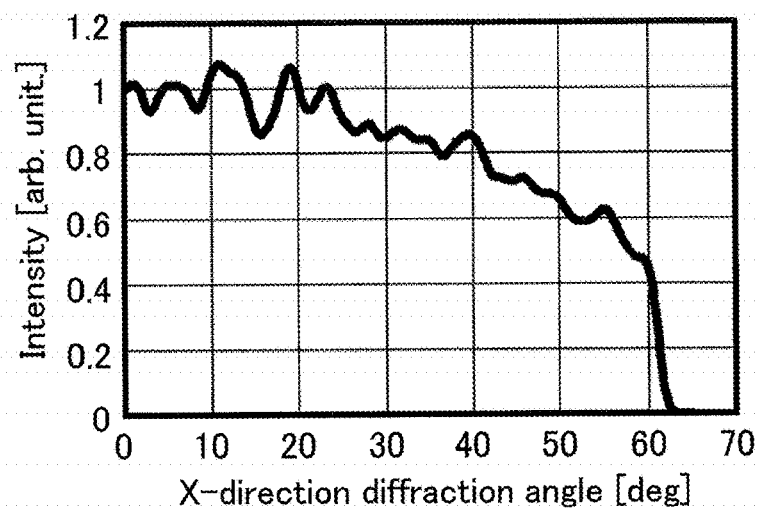
FIG. 20C shows an intensity distribution of the projected image.

FIG. 20A shows a DOE pattern with the configuration of line 2A, in which the diffraction order is not thinned out in the configuration of FIG. 19, and FIG. 20B shows a corresponding projected image on an equidistant surface. FIG. 20C shows the intensity distribution along the cross section of along the x-axis of FIG. 20B. The wavelength A of the light source is 1000 nm, and the divergence angle is 2 degree in both the x direction and y direction. In the DOE, the patterns of the respective unit structures are designed so that the FOV in the x direction is 120°, and that the FOV in the y direction is 40°. The period length P is 100 μm in both the x direction and the y direction.

Figure 21A:
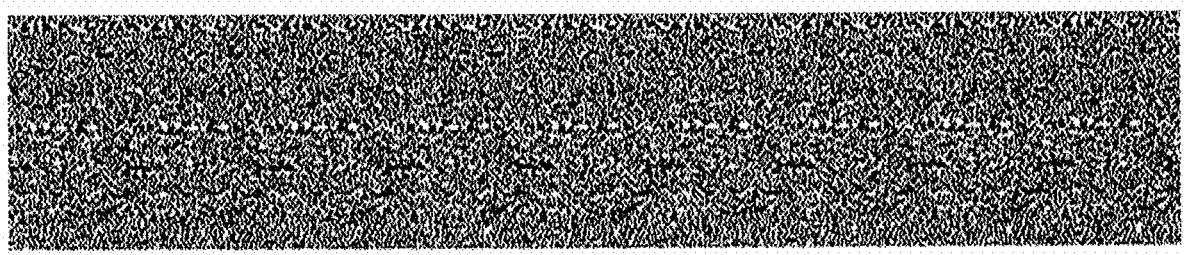
FIG. 21A shows a DOE pattern with a part of diffraction orders thinned out only in the X direction in the example of FIG. 19.
Figure 21B:
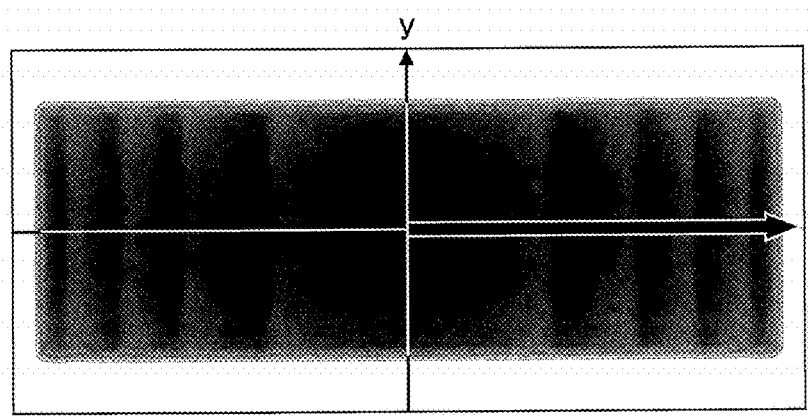
FIG. 21B shows a projected image on an equidistant surface.
Figure 21C:
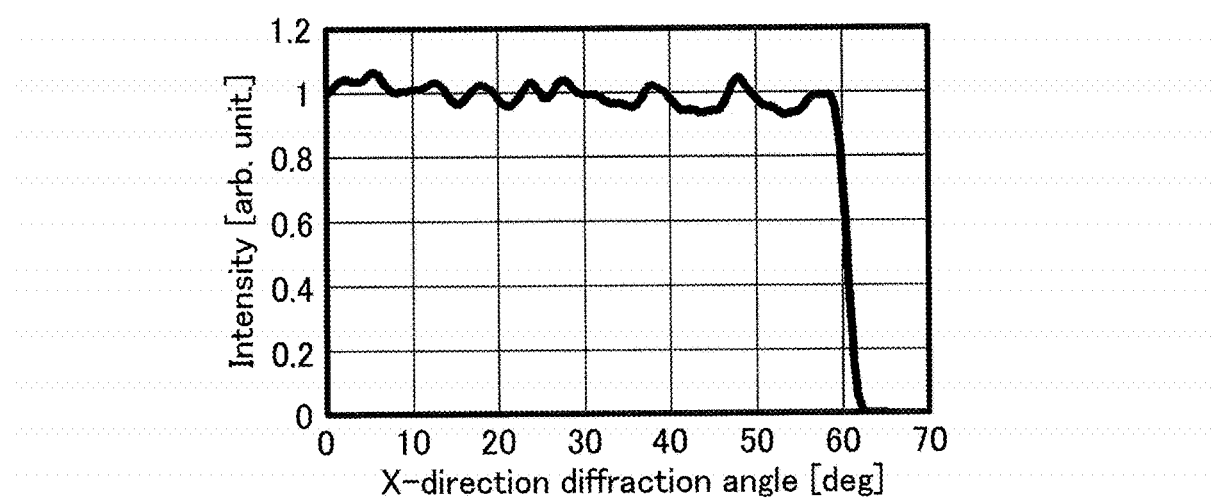
FIG. 21C shows an intensity distribution of the projected image.

FIG. 21A shows a DOE pattern of the region 2B of FIG. 19, in which the diffraction order is thinned out only in the x direction, and FIG. 21B shows a corresponding projected image on an equidistant surface. FIG. 21C shows the intensity distribution at the cross section along the x-axis of FIG. 21B. In FIG. 21A, a unit structure having a period length $P_x$ in the x direction of 500 μm and a period length $P_y$ in the y direction of 100 μm is used in an area for thinning out the diffraction order. By designing the DOE in this fashion, the characteristics of lines 2B realized in FIG. 21B and FIG. 21C can make the intensity uniform in the entire FOV, compared with the characteristic of the line 2A realized in FIG. 20B and FIG. 20C.

<Second Configuration>

Figure 22A:
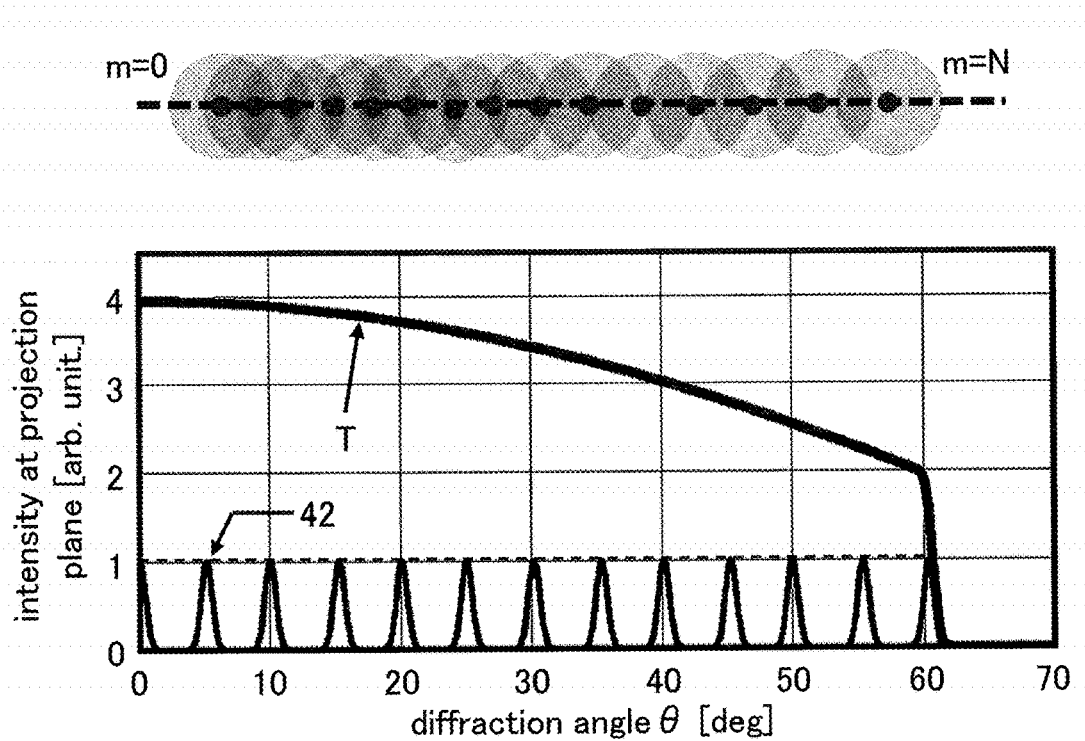
FIG. 22A shows a second configuration for maintaining a uniform intensity distribution at a wide FOV, without intensity correction.
Figure 22B:
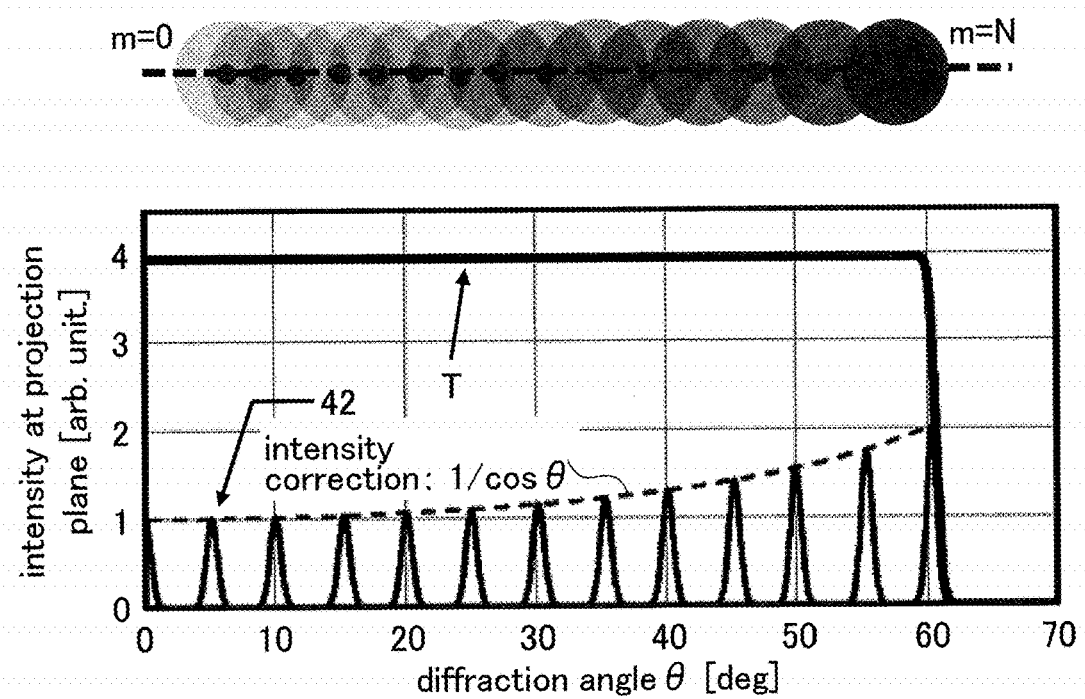
FIG. 22B shows a second configuration for maintaining a uniform intensity distribution at a wide FOV, with intensity correction.

FIG. 22A and FIG. 22B are diagram explaining a second configuration for maintaining a uniform intensity distribution when the FOV is widened. In the second configuration, the pattern of the unit structure is corrected in one direction at the design stage, taking the overlap of the diffracted light beams into consideration, for the purpose of intensity correction. In other words, the intensity of the diffraction spot on the projection plane is adjusted in advance.

In FIG. 22A, without intensity correction, the intensities of the individual diffracted light beams 42 are the same on the equidistant surface; however, the overall intensity T determined from the sum of the diffracted light beams decreases toward the FOV edge due to the influence of the increased angular separation. The design values in this example are as follows.

Light source wavelength λ=940 nm,
DOE period length P=200 μm, and
beam diameter FWHM=1°.

To suppress the decline of the overall intensity T, the intensity is corrected for each of the diffraction orders such that the intensity of the diffracted light beam 42 increases toward the end of the projection area, as shown in FIG. 22B. The basic design values are the same as those in FIG. 22A, namely, the light source wavelength λ of 940 nm, the DOE period length P of 200 μm, and the beam diameter FWHM of 1°.

For example, in the case of projecting onto an equidistant surface, the unit structure 201 of the DOE 20 is adjusted so that the intensity of the diffracted light beam increases at a rate of $1/\cos\theta$ as the diffraction angle increases in one direction. With this configuration, the overall intensity T of the diffracted light beams becomes uniform on the equidistant surface over the entire FOV range. This correction may be unnecessary if the FOV is less than 30°, but is effective when the FOV is 30° or more, especially 60° or more. In addition, because the period length P cannot be increased, as in the first configuration, when the beam diameter incident onto the DOE is small, the second configuration of FIG. 22 is effective.

Figure 23A:
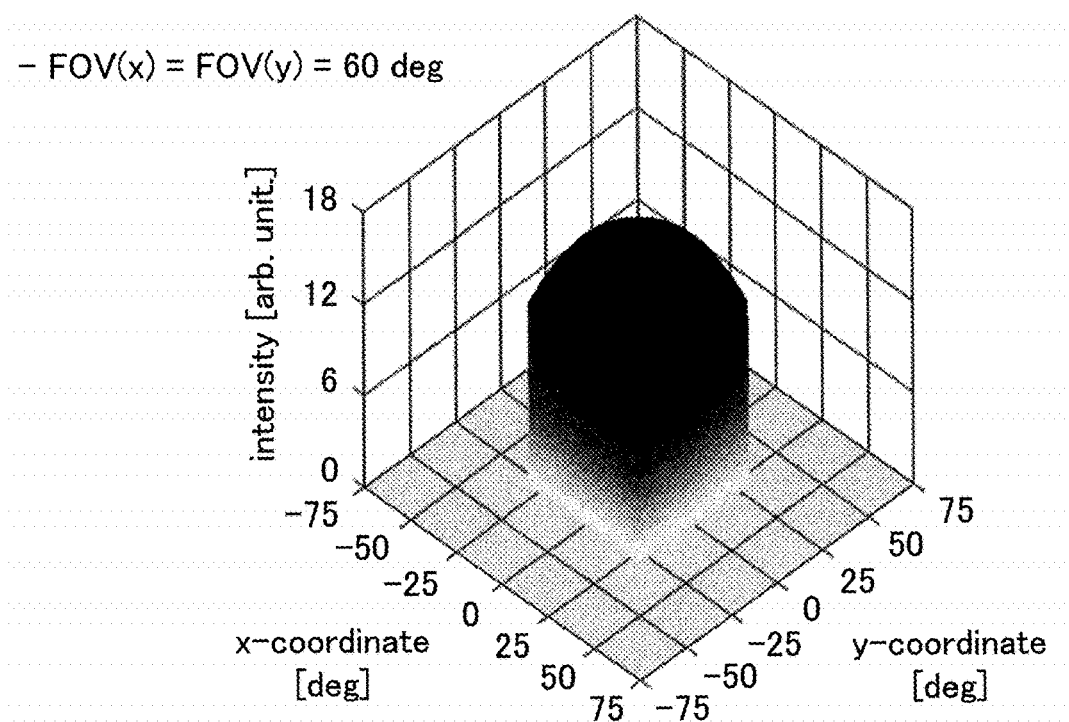
FIG. 23A shows a three-dimensional intensity distribution without intensity correction.
Figure 23B:
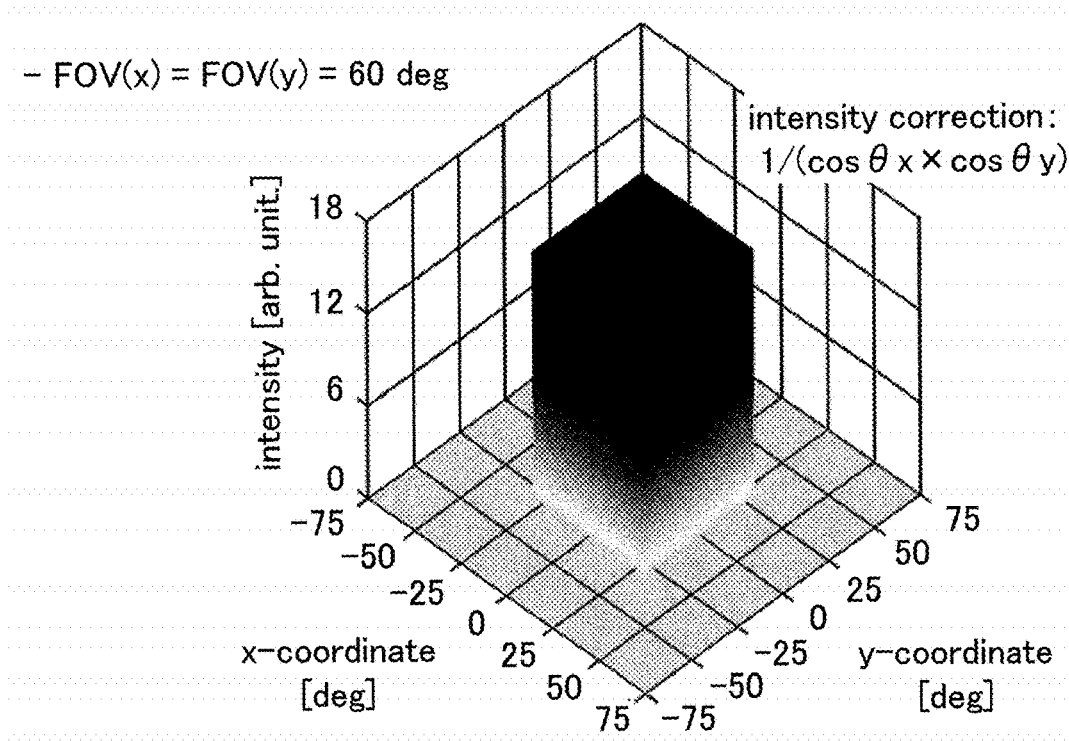
FIG. 23B shows a three-dimensional intensity distribution with intensity correction.

FIG. 23A and FIG. 23B are diagram showing three-dimensional intensity distributions, without and with intensity correction. FIG. 23A shows the intensity distribution when no intensity correction is made to the two-dimensional DOE, and FIG. 23B shows the intensity distribution when intensity correction is made to the DOE in x and y directions. The FOV is 60° in both the x-direction and the y-direction.

When intensity correction is not performed, as in FIG. 23A, the intensity decreases along the edge of the FOV, and particularly at the corner of the FOV, on the equidistant surface.

By performing intensity correction in two dimensions, a uniform intensity distribution can be obtained over the entire FOV on the equidistant surface. To make intensity correction in x and y directions, the intensity is corrected so that the intensity becomes higher at a rate of $1/\cos\theta_x \cdot \cos\theta_y$ toward the corner of the FOV.

Figure 24:
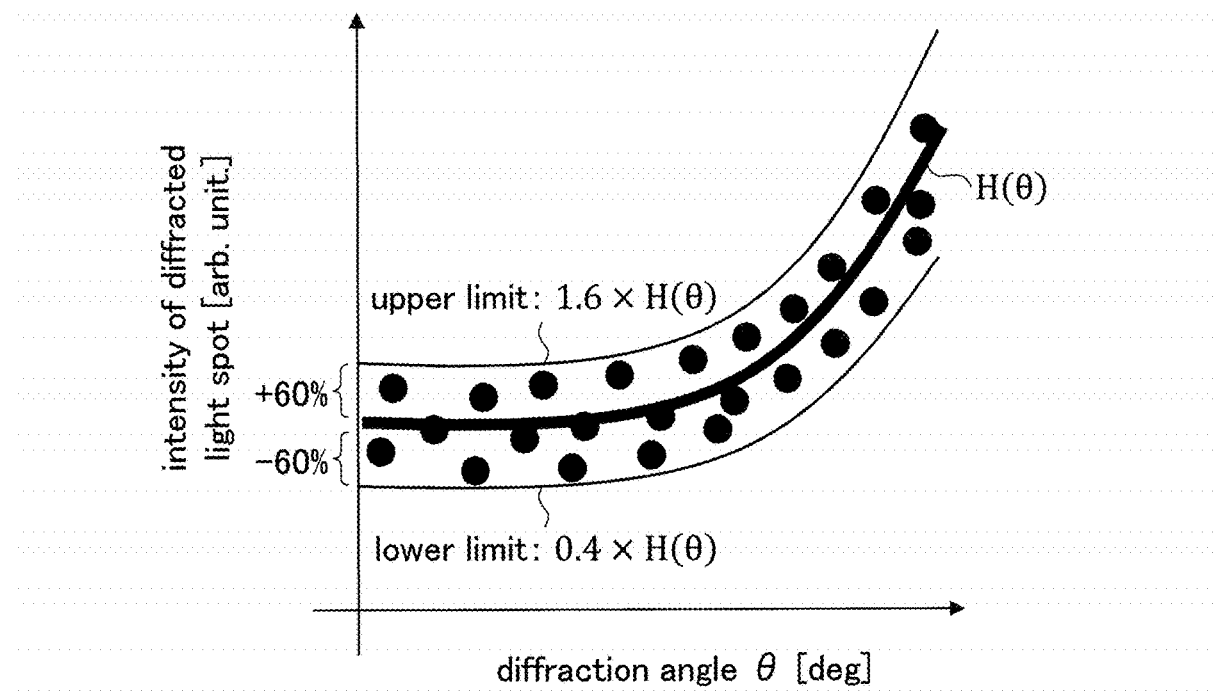
FIG. 24 shows correction function H(θ) in consideration of overlap of diffracted light beams at a wide FOV.

FIG. 24 shows correction function $H(\theta)$ for the respective cases, in consideration of overlap of diffracted light beams at a wide FOV. When intensity is corrected in one direction for projection onto an equidistant surface, a correction function is, for example, $$H(\theta)=1/\cos\theta \tag{10}$$

as has been described above.

When intensity is corrected in two dimensions for projection onto an equidistant surface, the correction function is, for example, $$H(\theta)=1/\cos\theta_x \cdot \cos\theta_y \tag{11}$$

as has been described above.

When intensity is corrected in one direction for projection onto a flat screen, a correction function of, for example, $$H(\theta)=(1/\cos\theta)^2 \tag{12}$$

can be used. For the projection onto the screen surface, the correction rate as a function of the diffraction angle is increased, compared with the projection onto the equidistant surface. This is because the angular separation increases toward the edge of the FOV, and because the distance from the diffraction point to the spot position also increases, causing the beam profile to deform.

When intensity is corrected in two directions for projection onto a flat screen, a correction function of, for example, $$H(\theta)=(1/\cos\theta)^3 \tag{13}$$

can be used. This is because the dimension of correction is expanded into the two orthogonal directions.

The intensity correction does not have to strictly conform to the above-described correction functions. In reality, the normalized spot intensity $I(\theta)$ may empirically satisfy $$0.4 \times H(\theta) < I(\theta) < 1.6 \times H(\theta) \tag{14}$$

because a large number of diffracted light beams are overlapped on the projection plane. In this condition, the value near zero degrees of θ is normalized to 1.

The range of formula (14) indicates that the spot intensity of the diffracted light beam is acceptable up to ±60% of the intensity determined by the correction function $H(\theta)$.

Figure 25A:
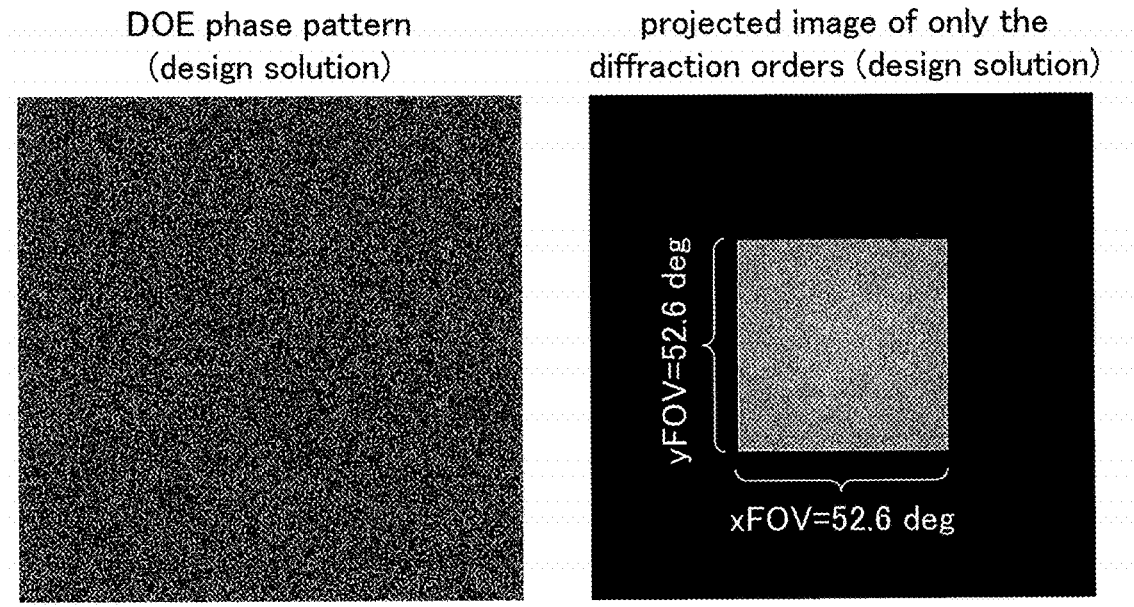
FIG. 25A shows design examples where the intensity correction is performed according to the scheme of FIG. 24.
Figure 25B:
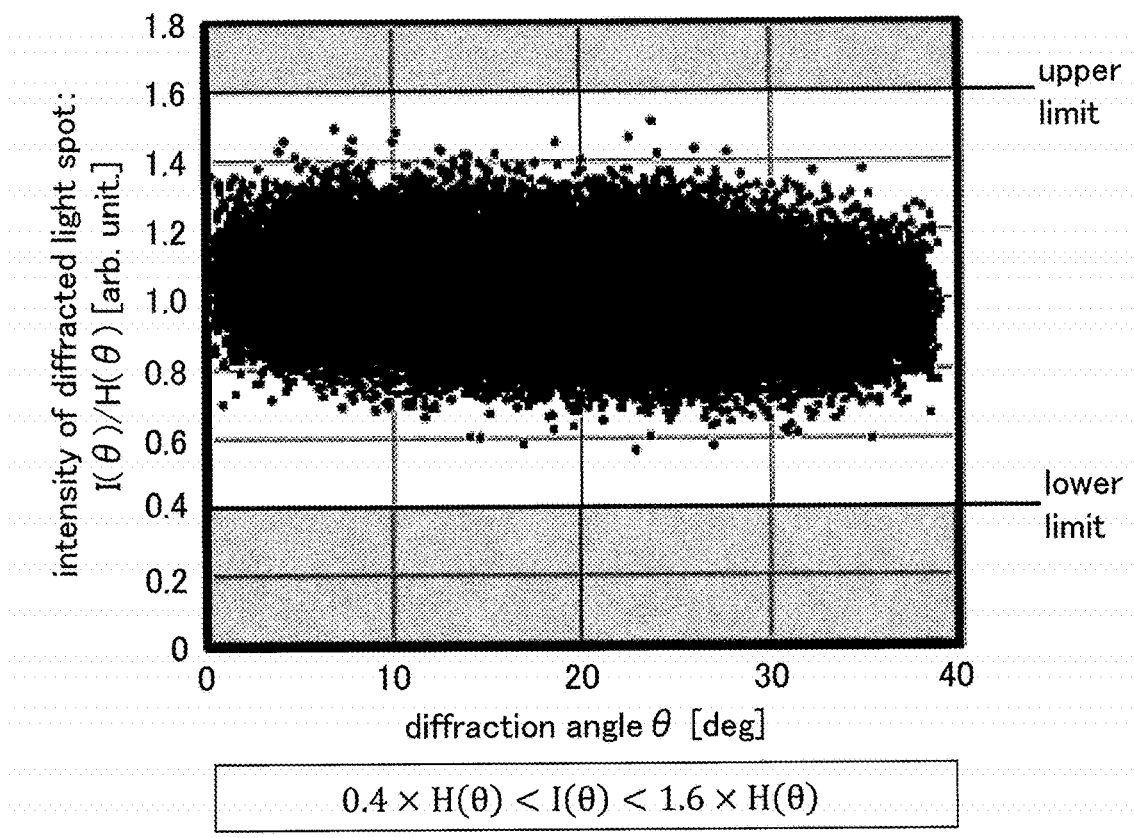
FIG. 25B shows intensity distribution of diffracted light spot as a function of diffraction angle.

FIG. 25A and FIG. 25B show design examples when intensity correction is performed according to the scheme of FIG. 24. FIG. 25A shows a DOE phase pattern and a projected image of only the diffraction orders. Simulation is performed using FOV values in the x and y directions of 52.6°, a light source wavelength A of 32 nm, and the DOE period length P of 250 μm.

Even if the correction function $H(\theta)$ is used, satisfactory optimization may not be achieved at the design stage, due to manufacturing variations in the DOE or the unit structure 201, or due to a large number of diffraction spots. For these reasons, the spot intensity of the diffracted light beams varies, as shown in FIG. 25B. The intensity distribution of FIG. 25B is a design result within the range of formula (14). The horizontal axis represents diffraction angle θ (degrees), and the vertical axis represents $I(\theta)/H(\theta)$, which is the ratio of the spot intensity at the projection plane to the designed intensity in consideration of the correction function $H(\theta)$. The ratio value of 1 represents the ideal intensity distribution obtained on the projection plane at the design stage. Because the number of spots on the projection plane is enormous, it may be necessary to allow a certain degree of variation in the intensity distribution in order to optimize all the spots. The range of formula (14) provides the acceptable range in which the lower limit is set to 0.4 and the upper limit is set to 1.6 as the margin.

Although strictly satisfying the correction function $H(\theta)$ is preferable, it is practically difficult to accurately satisfy the correction function due to variations such as manufacturing errors. In practical use, a large number of diffracted light beams overlap one another due to the influence of the spread of the diffracted light beams. Therefore, by correcting the intensity within the range of formula (14), the patterns may be projected onto the practical equidistant surface with a uniform distribution of intensity.

Figure 26A:
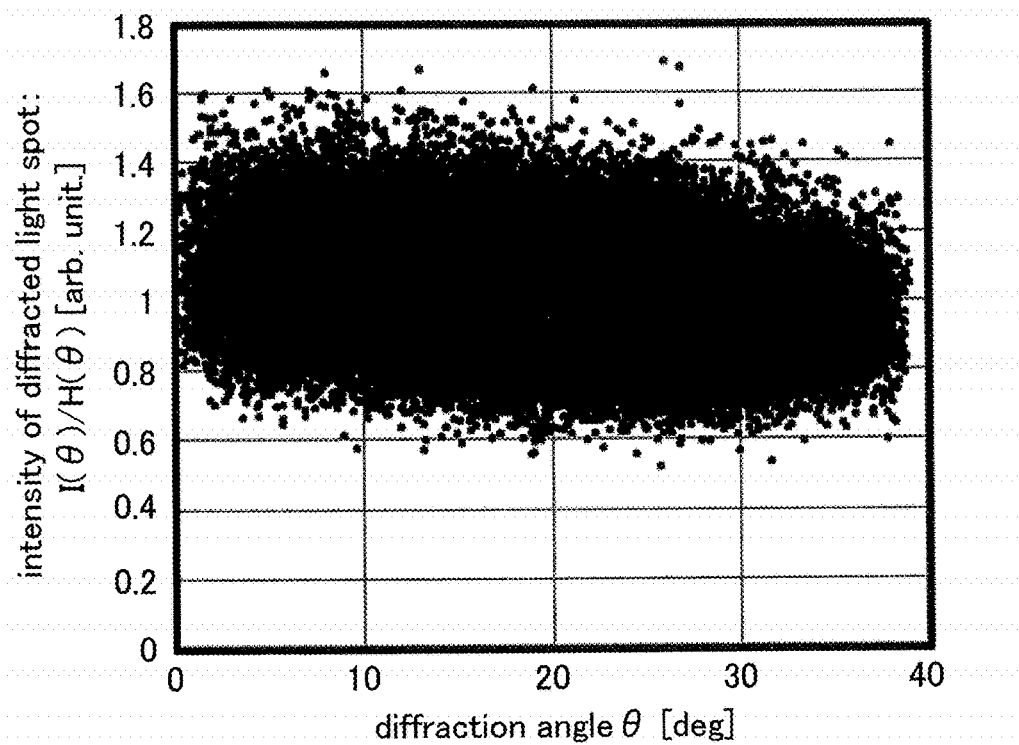
FIG. 26A shows an example of narrowing the design range of FIG. 25B.
Figure 26B:
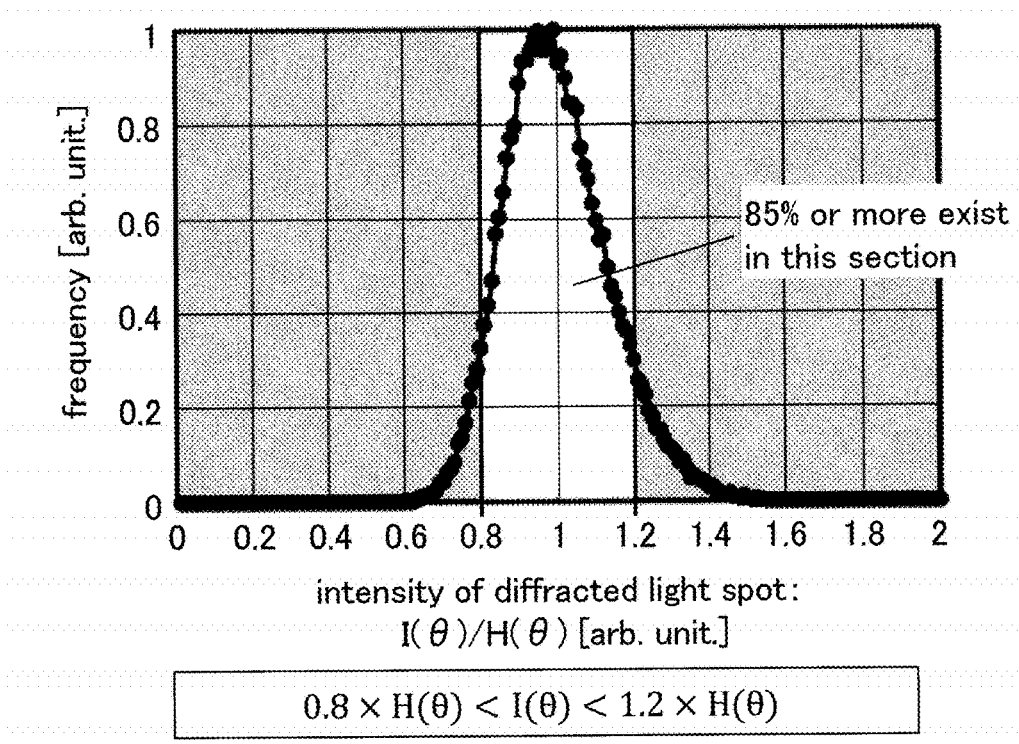
FIG. 26B shows spot intensity distribution.

FIG. 26A and FIG. 26B show examples of narrowing the margin of the intensity ratio obtained in FIG. 25B to a feasible and useful range. FIG. 26A shows the intensity ratio $I(\theta)/H(\theta)$ of the diffraction spot as a function of diffraction angle θ. The designed values of the diffraction spot are the same as those in FIG. 25B, namely, xFOV=yFOV=52.6°, the light source wavelength λ is 532 nm, and the DOE period length P is 250 μm. Similar to FIG. 25B, many data values are distributed in the range of 1±0.4.

In order to ensure the intensity pattern within a practical range, formula (14) may be narrowed to $$0.8 \times H(\theta) < I(\theta) < 1.2 \times H(\theta) \tag{15}.$$

In FIG. 26B, the distribution of spot intensity represented by $I(\theta)/H(\theta)$ is plotted into a histogram, in which 85% of the intensity ratio $I(\theta)/H(\theta)$ is within 0.8 to 1.2. Even if the distribution changes outside this range, the influence is negligibly small. Therefore, a practical range of intensity correction is that 85% or more of the total spots are included in the range of formula (15).

<Reduction of Zero-Order Diffraction Light>

Next, reduction of zero-order diffraction light will be described.

Figure 27:
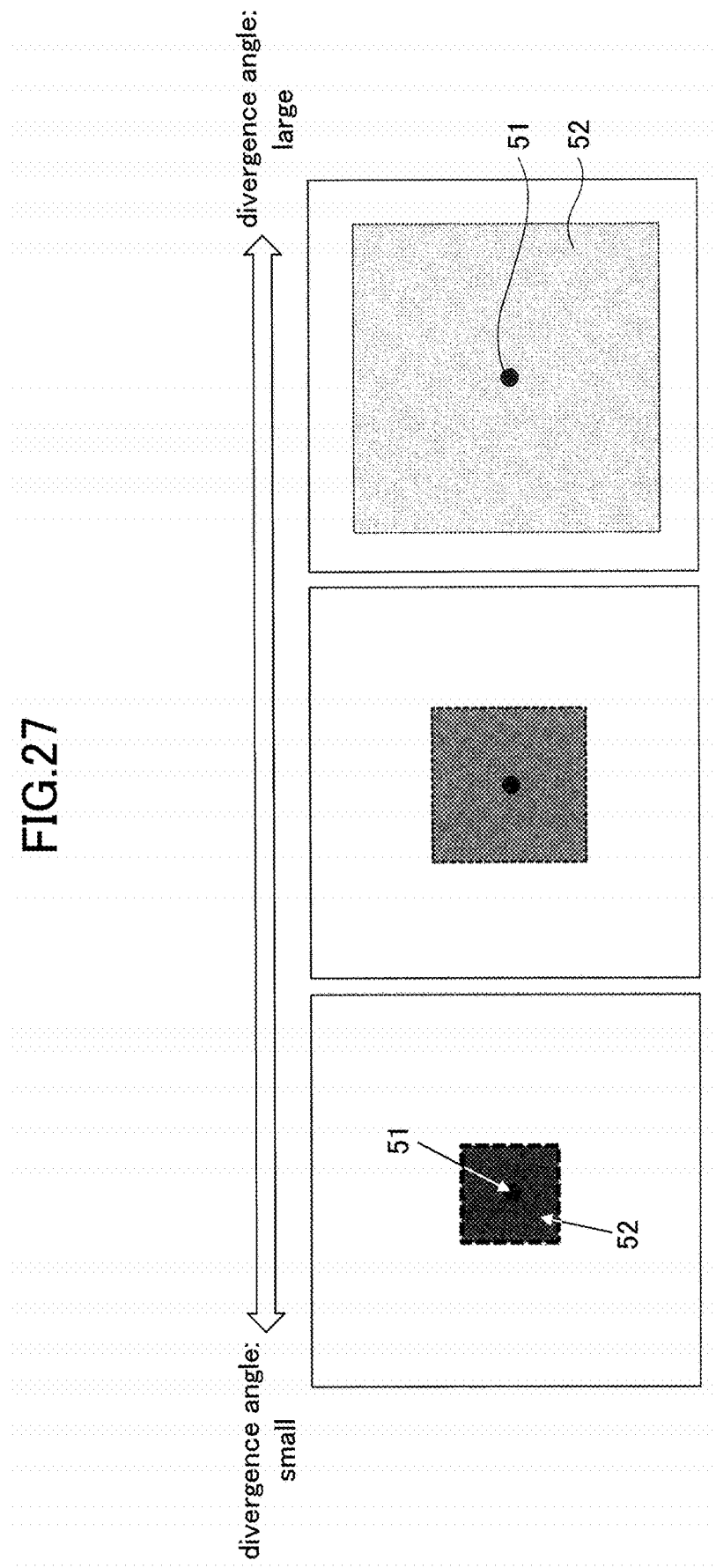
FIG. 27 shows influence of zero-order light due to a wide FOV.

FIG. 27 is a diagram showing the effect of the zero-order diffraction light due to a wide FOV. The diffusion angle (or the FOV) becomes smaller toward the left-hand side of the figure, and the diffusion angle (or the FOV) becomes greater toward the right-hand side of the figure.

At a smaller diffusion angle, the intensity of the zero-order diffraction light 51 and the intensity of the other diffracted light beams 52 are almost the same, and the influence of the zero-order diffraction light 51 is small. On the other hand, as the diffusion angle of the DOE increases, the illuminance per unit area decreases, and the zero-order diffraction light 51 is relatively emphasized. The intensity of the zero-order diffraction light 51 becomes stronger than the intensity of the other diffracted light beams, and the central luminous point becomes conspicuous.

Although the diffraction spots are designed so that the diffracted light beams overlap without gaps on the projection plane as in the embodiments, it is still desirable to reduce the influence of the zero-order diffraction light 51.

Figure 28A:
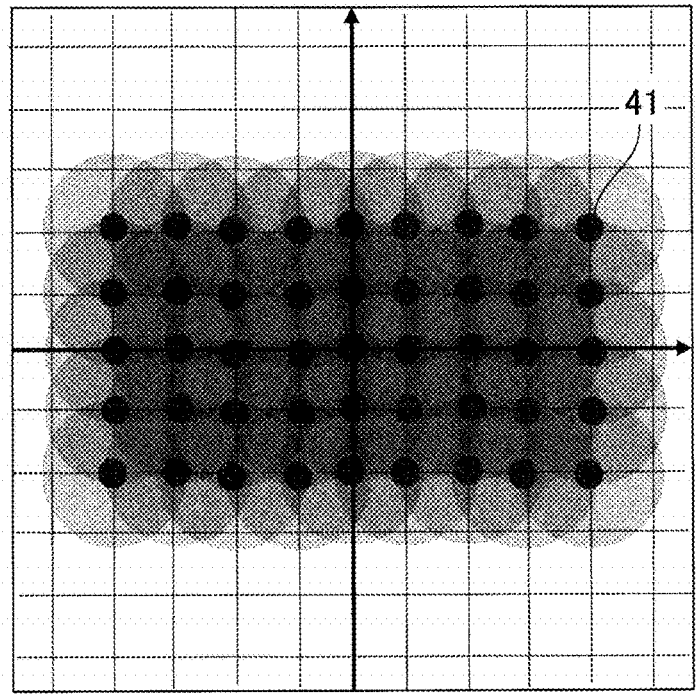
FIG. 28A shows reduction of zero-order light on the premise of overlapping diffracted light beams.
Figure 28B:
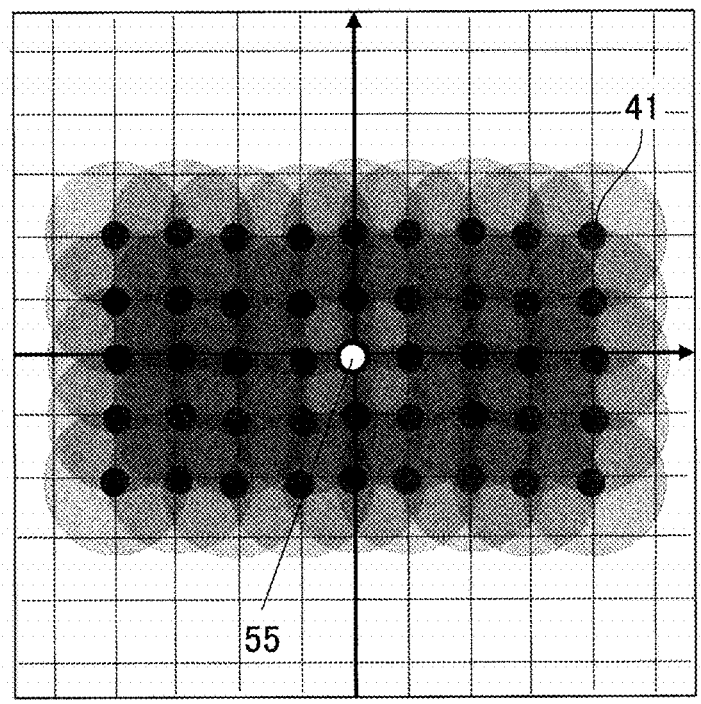
FIG. 28B shows a comparative example.

FIG. 28A shows reduction of the zero-order diffraction light under the condition of overlapped diffracted light beams. FIG. 28B shows a comparative example, where the zero-order projection spot 55 exists at the center of the FOV. In contrast, in the embodiment of FIG. 28A, the DOE is designed to remove the influence of the zero-order diffraction light, which occurs at the center in FIG. 28B, thereby avoiding the zero-order diffraction light being emphasized at a wide FOV. The remaining component of the zero-order diffraction light which may be left without being completely removed by the design can be used as the intrinsic zero-order light.

Figure 29:
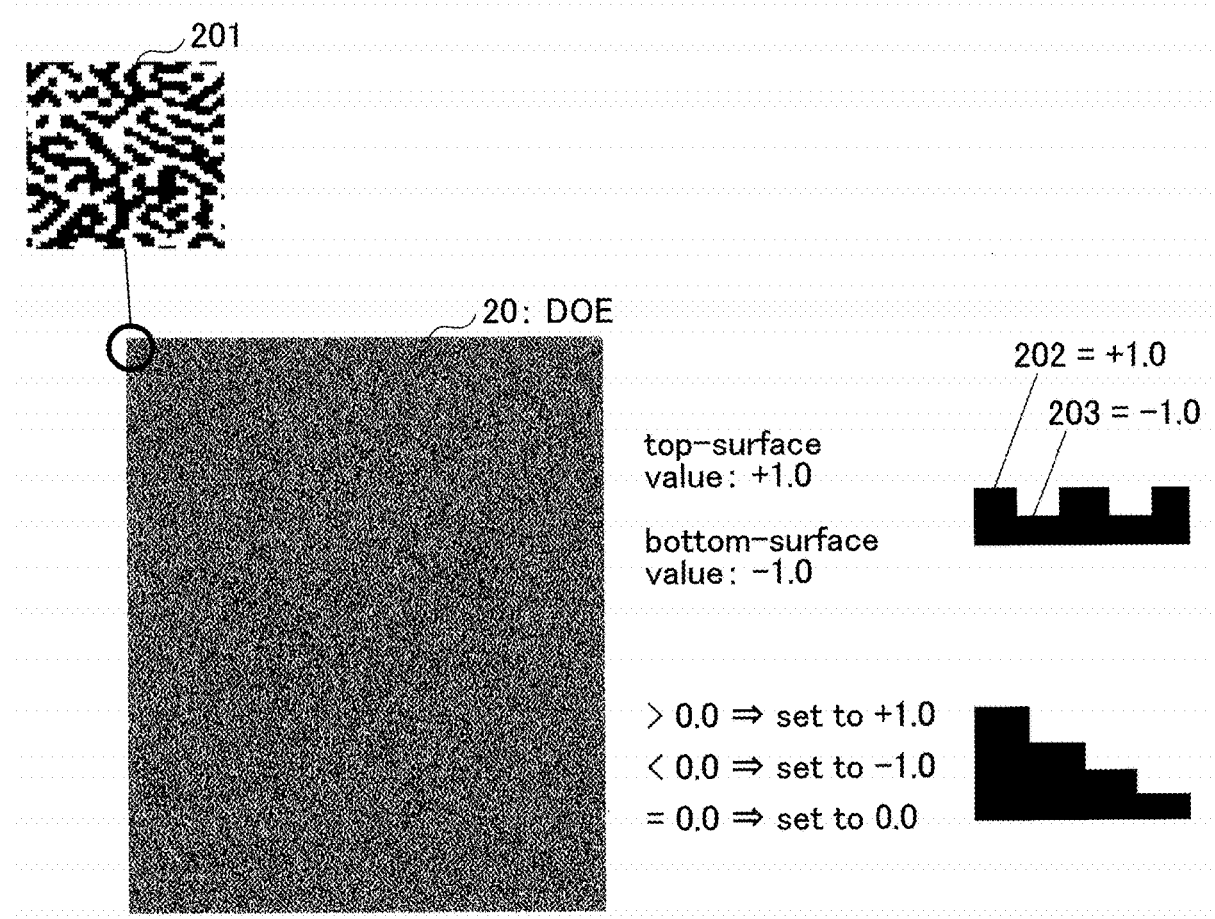
FIG. 29 shows an example of design for removing the zero-order diffraction light.

FIG. 29 shows a design example for removing the zero-order diffraction light component. The uneven pattern of the DOE 20 is digitized (e.g., binarized) for each unit structure 201. For example, when a unit structure 201 is a binary grid structure having an top surface 202 and a bottom surface 203, the value of the top surface may be +1.0, and the value of the bottom surface (i.e., the bottom of the groove) may be −1.0. If the unit structure 201 is a stepwise multi-level structure, the value of the intermediate surface may be set to 0.0, the value of the upper surface located at a higher level than the intermediate surface in the direction perpendicular to the ODE surface may be set to +1.0, and the value of the lower surface located below the position of the intermediate surface may be set to −1.0.

DOE 20 is designed such that, in each unit structure, the square of the ratio of the difference between the area with the value +1.0 and the area with the value −1.0 to the unit area $A_{DOE}$ is smaller than the inverse (i.e., the reciprocal) of the total number $N_{ALL}$ of the spots to be projected, thereby reducing the zero-order diffraction light component. In other words, the DOE 20 is designed so as to satisfy formula (16).

$$\left(\frac{A_{+1} - A_{-1}}{A_{DOE}}\right)^2 < \frac{1}{N_{ALL}} \tag{16}$$

In formula (16), $A_{+1}$ denotes the area with a value +1.0 in the unit structure 201, $A_{-1}$ denotes the area with a value −1.0 in the unit structure 201, and $A_{DOE}$ denotes the area of the unit structure 201 of the DOE 20. The total number $N_{All}$ of the spots may be, for example, $M_x \cdot M_y$ ($N_{All} = M_x \cdot M_y$), where $M_x$ is the total number of diffracted light beams in the x direction, and $M_y$ is the total number of diffracted light beams in the y direction.

For example, in arranging the diffraction spots with a uniform distribution without thinning out the diffraction orders, the i-th diffracted light beam $M_i$ is represented by $M_i = 2m_i + 1$ using the diffraction order m, where mi is expressed as $m_i = (P_i/\lambda)\sin(FOV_i/2)$ from formula (1).

Making the proportion of the difference between the protrusion area and the grooved area smaller than the inverse of the total number of the spots for each of the unit structure 201 is equivalent to giving almost no intensity to the zero-order diffraction light. This will be described in more detail below.

The projected image is a discrete Fourier transform of the phase pattern of the DOE 20. Therefore, the electric field E ($m_x$, $m_y$) of the projected image is expressed by formula (17).

$$E(m_x, m_y) = \frac{1}{N_x N_y} \sum U(x_j, y_j) \exp\left[-i2\pi\left(\frac{x_j m_x}{N_x} + \frac{y_j m_y}{N_y}\right)\right], \text{ where } U(x_j, y_j) = \exp[i\varphi(x_j, y_j)] \tag{17}$$

In formula (17), $1/N_x N_y$ is a normalizing factor in which the sum of the diffracted light energies to 1, $U(X_j, Y_j)$ is a DOE field, and $\varphi(X_j, Y_j)$ is a phase pattern of the DOE 20. It is assumed that the DOE field is equal to the phase pattern of the DOE 20.

The intensity $I(0,0)$ of the projected image with ($m_x = 0$, $m_y = 0$) represents the zero-order light is expressed by formula (18).

$$I(0, 0) = |E(0, 0)|^2 \tag{18}$$
$$= \left|\frac{1}{N_x N_y} \sum U(x_j, y_j)\right|^2$$

The zero-order intensity can be read as formula (19), considering the binary structure in which the DOE phase is represented by two values of 0 radians and $\pi$ radians.

$$I(0, 0) = \left(\frac{N_{+1} - N_{-1}}{N_x N_y}\right)^2 \tag{19}$$

In formula (19), $N_{+1}$ represents the number of pixels in which the DOE field $U(X_j, Y_j)$ has a value +1, and $N_{-1}$ represents the number of pixels in which the DOE field $U(X_j, Y_j)$ has a value −1.

Meanwhile, with the uniform spot intensity distribution in the projected image, the intensity allocated to one spot is given by value $\delta I$ which is obtained by averaging the normalized intensity 1 by the total number $N_{All}$ of spots. Therefore, formula (20) is provided.

$$\delta I = \frac{1}{N_{All}} \quad (20)$$

For example, the total number $N_{All}$ of the spots may be equal to $M_x M_y$ ($N_{All}=M_x M_y$), where $M_x$ is the sum of the diffraction orders in the x direction, and $M_y$ is the sum of the diffraction orders in the y direction.

In the design to suppress the zero-order diffraction light, a criteria for designing the zero-order diffraction light weaker than the other spots is to make the value of formula (19) representing the intensity of the zero-order diffraction light smaller than the average intensity of formula (20). This condition is expressed by formula (21).

$$I(0,0) < \delta I \rightarrow \left(\frac{N_{+1}-N_{-1}}{N_x N_y}\right)^2 < \frac{1}{N_{ALL}} \quad (21)$$

Let' consider the left-hand side of formula (21). In the phase pattern of the DOE 20, the ratio expressed by $N_{+1}$, $N_{-1}$, and $N_x N_y$ is equivalent to the ratio expressed by $A_{+1}$, $A_{-1}$, and $A_{DOE}$ presented below.

$N_{+1} \rightarrow A_{+1}$: total area with a value $U = +1$ in the DOE unit structure $N_{-1} \rightarrow A_{-1}$: total area with a value $U = -1$ in the DOE unit structure $N_x N_y \rightarrow A_{DOE}$: total area of the DOE unit structure Thus, formula (16) for suppressing the zero-order diffraction light is derived.

Figure 30A:
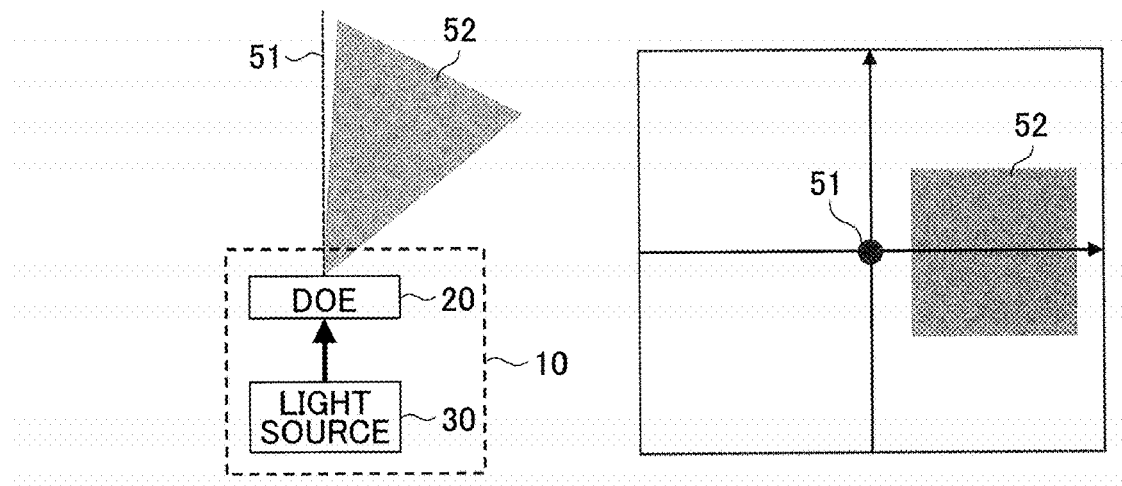
FIG. 30A shows another example of removing the zero-order diffraction light.
Figure 30B:
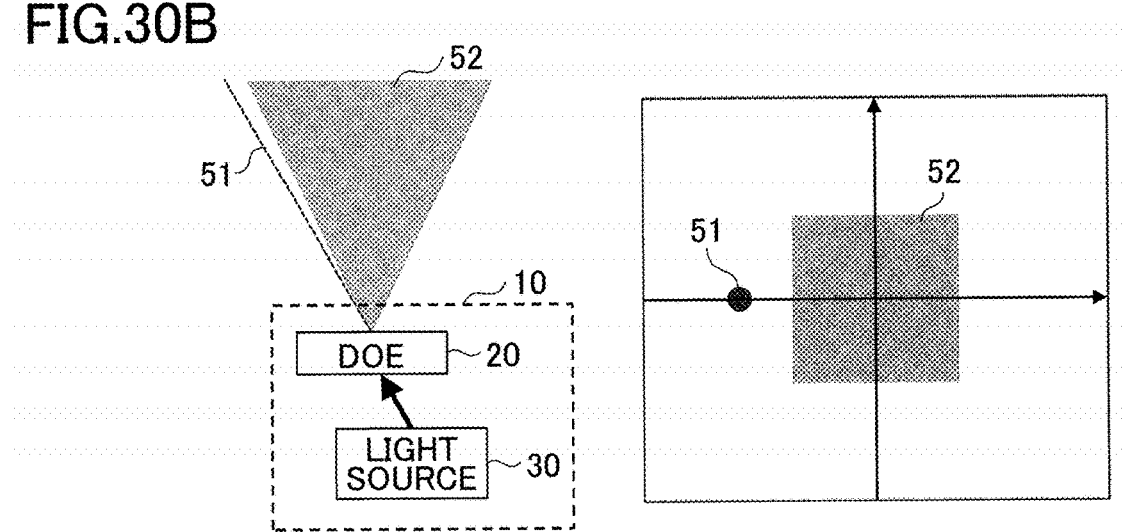
FIG. 30B shows still another example of removing the zero-order diffraction light.
Figure 30C:
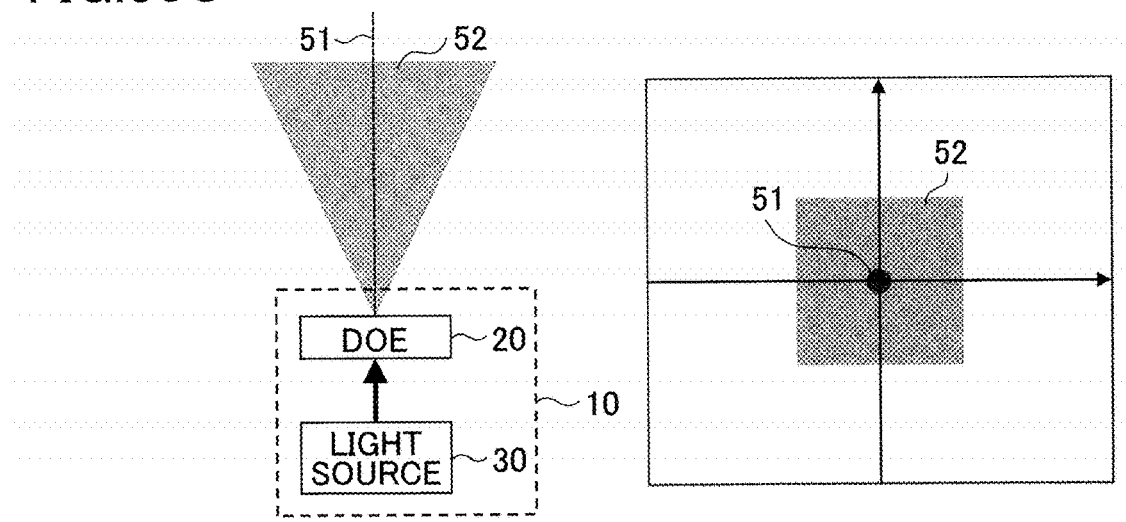
FIG. 30C shows a comparative example.

FIG. 30A and FIG. 30B show other configurations for removing the zero-order light component. FIG. 30C shows a comparative example, in which the light from the light source 30 is perpendicularly incident onto the DOE 20, and zero-order diffraction light 51 appears on the optical axis of the light source 30, which is consistent with the optical axis of the DOE 20, within the FOV of the diffracted light 52.

In contrast, in the embodiment of FIG. 30A, the light perpendicularly incident on the DOE 20 is diffracted in a direction deviating from the optical axis of the light source 30. Only the zero-order diffraction light 51 is transmitted along the optical axis of the light source 30. This configuration can remove the zero-order diffraction light 51 from the other components of diffracted light 52 toward the projection plane. This configuration is achieved by forming a pattern of the unit structure 201 of the DOE 20 so as to provide an asymmetric diffraction direction. For example, light can be diffracted in the x direction by forming a blaze having an asymmetric cross section in the unit structure 201, forming a groove extending in the y direction in the unit structure 201, etc.

In the embodiment of FIG. 30B, light is obliquely incident on the DOE 20. Assuming that the angle of the incident light with respect to the normal to the DOE 20 is $\theta_{in}$, then formula (1) is written as $$M \times \lambda = P \times (\sin\theta - \sin\theta_{in}). \quad (1)'$$

The zero-order diffraction light 51 travels straight through the DOE 20, without being diffracted in other directions. By diverting the diffracted light 52 from the optical path of the zero-order diffraction light, the zero-order diffraction light 51 can be removed from the diffracted image projected onto the projection plane.

Assuming a wide-angle diffraction, the designs for removing the zero-order diffraction light shown in FIG. 29, FIG. 30A, and FIG. 30B are particularly useful.

<Multistage Configuration of Optical Elements>

Figure 31:
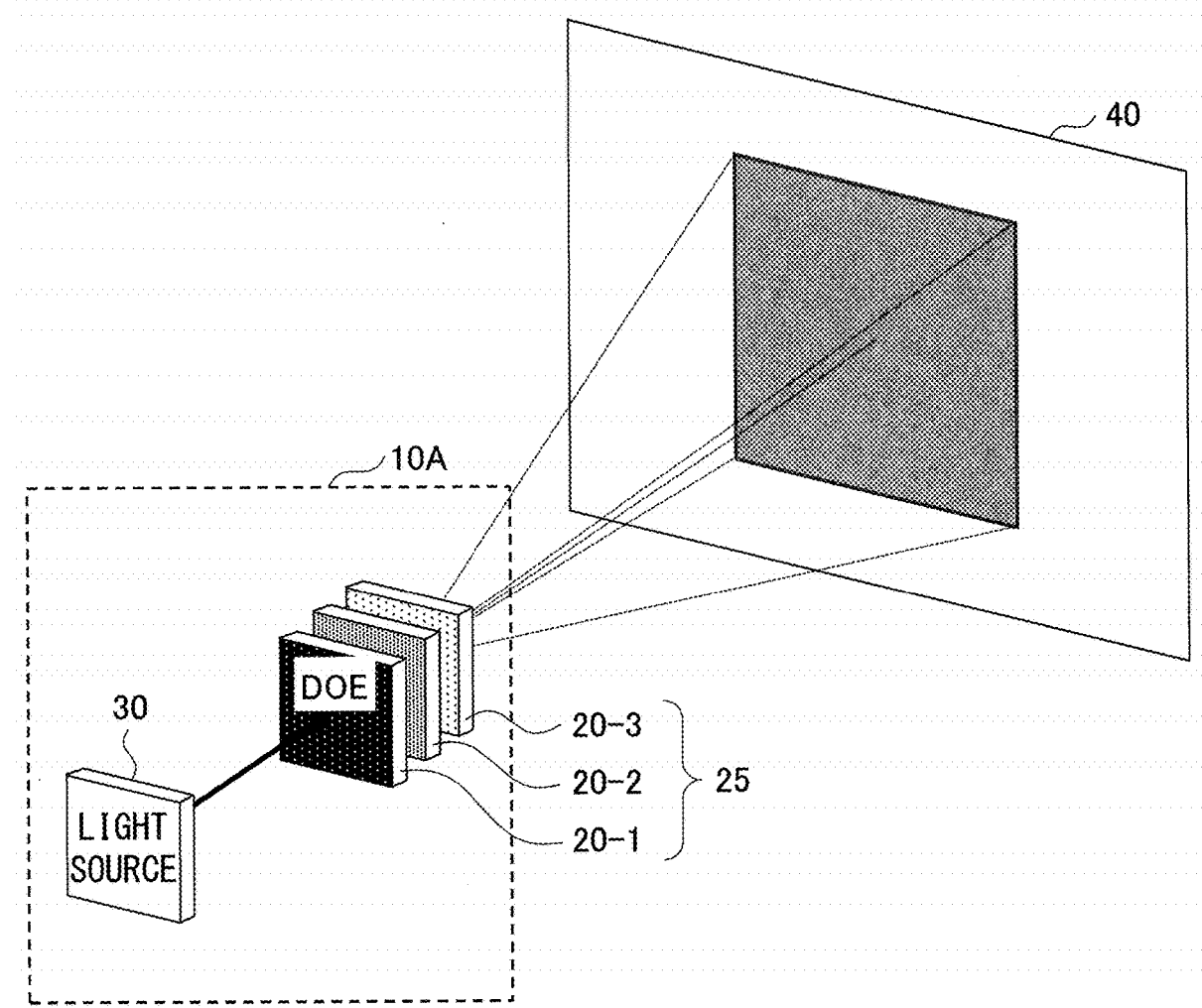
FIG. 31 shows a multistage configuration of optical elements in a projection device.

FIG. 31 shows a multistage configuration of optical elements in a projection device. The projection device 10A includes a light source 30 and an optical system 25 in which a plurality of optical elements 20-1 to 20-3 are arranged along the optical axis. In the multistage optical system 25, at least one of the optical elements 20-1 to 20-3 is the DOE according to the embodiment. This multistage configuration is effective for achieving at least one of a wide-angle FOV and reduction of zero-order diffraction light.

Figure 32:
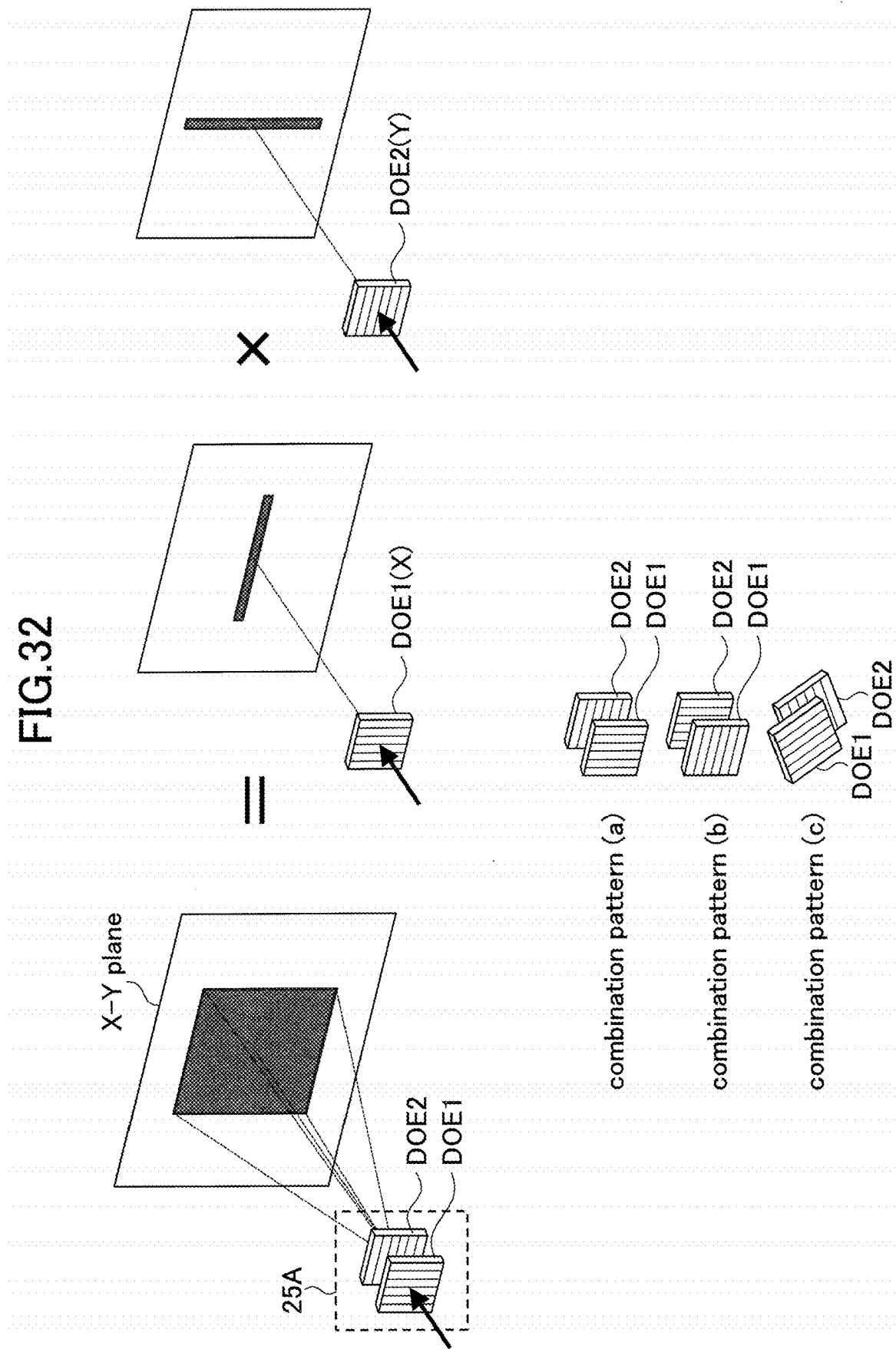
FIG. 32 shows an example configuration of the multistage optical system.

FIG. 32 shows an optical system 25A having a multistage configuration. The optical system 25A includes DOE1 and DOE2 arranged along the same optical axis. In DOE1 and DOE2, the phase pattern of each unit structure 201 is designed so as to achieve overlap of the diffracted light beams over a wide FOV.

The DOE1 and DOE2 diffract light in directions orthogonal to each other to produce a two-dimensional projection area as a whole at a wide FOV. Any one of the combination patterns (a) to (c) of DOE1 and DOE2 may be used.

In the combination pattern (a), the DOE1 having a one-dimensional diffraction grating extending in the y direction diffracts the incident light in the x direction, and the DOE2 having a one-dimensional diffraction grating extending in the x direction diffracts the incident light in the y direction. As a result, light can be projected into a two-dimensional area extending in the x direction and the y-direction.

In the combination pattern (b), the DOE1 having a one-dimensional diffraction grating extending in the x direction diffracts the incident light in the y direction, and the DOE2 having a one-dimensional diffraction grating extending in the y direction diffracts the incident light in the x direction. As a result, light can be projected into a two-dimensional area extending in the x-direction and the y-direction.

In the combination pattern (c), two orthogonal diffraction gratings, each grating obliquely extending, are used. By combining the DOE1 having a one-dimensional diffraction grating extending at an angle of 45° and the DOE2 having a one-dimensional diffraction grating extending at an angle of 135°, light can be projected into a two-dimensional area. The configuration of FIG. 32 is effective for both a wide-angle FOV and reduction of the zero-order diffraction light.

Figure 33:
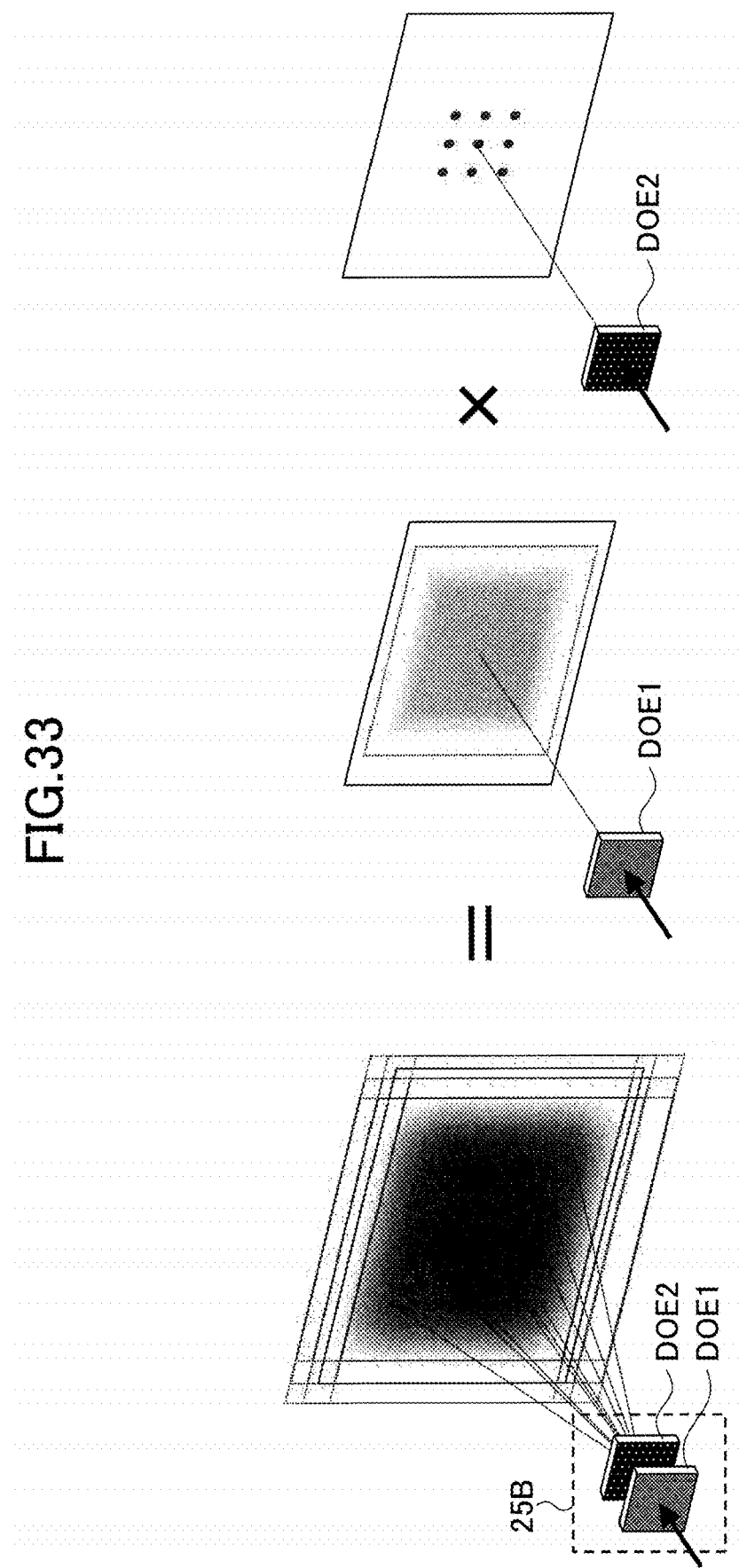
FIG. 33 shows an example configuration of the multistage optical system.

FIG. 33 shows an optical system 25B having a multistage configuration. The optical system 25B has a hybrid configuration with a combination of a wide-angle DOE1 and a narrow-angle DOE2, which may be arranged along the same optical axis. For example, a diffuser with a high FOV value is used for DOE1, and a dot matrix or a diffuser with a low FOV value is used for DOE2. The light diffused by the DOE1 is incident on the dot matrix or the narrow-FOV DOE2. The zero-order diffraction light is diffused, and accordingly, the influence of the zero-order diffraction light can be reduced.

The arrangement of the DOE1 and the DOE2 are not limited to the example of FIG. 33, and the positions of the DOE1 and the DOE2 may be reversed. The configuration of FIG. 33 is particularly effective at reducing the zero-order diffraction light.

Figure 34:
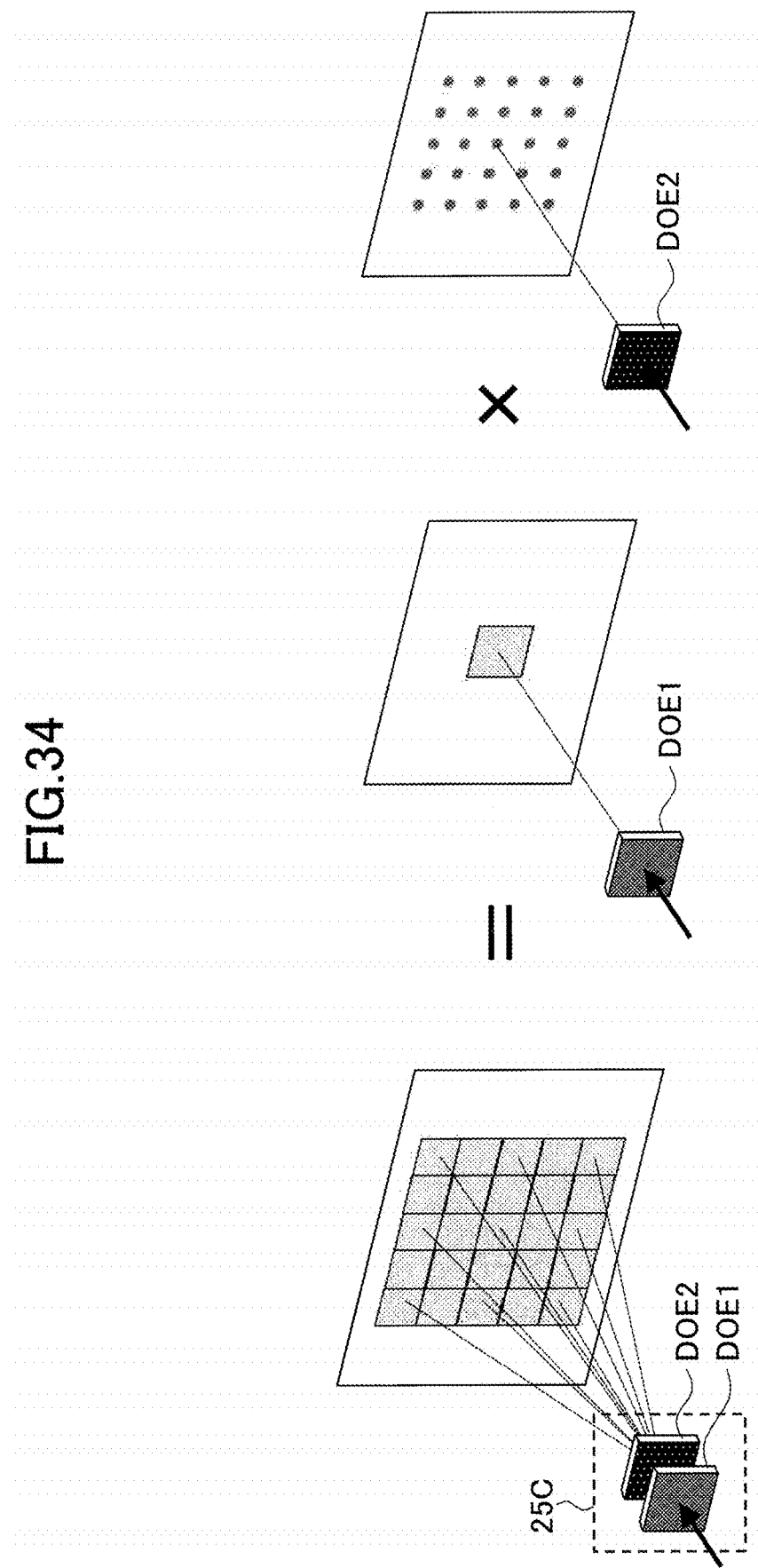
FIG. 34 shows an example configuration of the multistage optical system.

FIG. 34 shows an optical system 25C having a multistage configuration. The optical system 25C has a hybrid configuration with a combination of a narrow-angle DOE1 and a wide-angle DOE2, which may be arranged along the same optical axis. For example, a diffuser having a low FOV value is used for DOE1, and a dot matrix having a high FOV value is used for DOE2. A projection pattern with less diffusion is incident on the DOE2, and tiling is performed on the diffracted light beams by the DOE2, whereby a projection pattern in which the diffracted light beams overlap at a wide FOV is achieved. In addition, by allowing the incident light to pass through the DOE1 and the DOE2, the influence of the zero-order diffraction light can be reduced.

The arrangement of the DOE1 and the DOE2 is not limited to the example shown in FIG. 34, and the positions of the DOE1 and the DOE2 may be reversed. The configuration of FIG. 34 is effective for both reduction of the zero-order diffraction light and a wide FOV.

Figure 35:
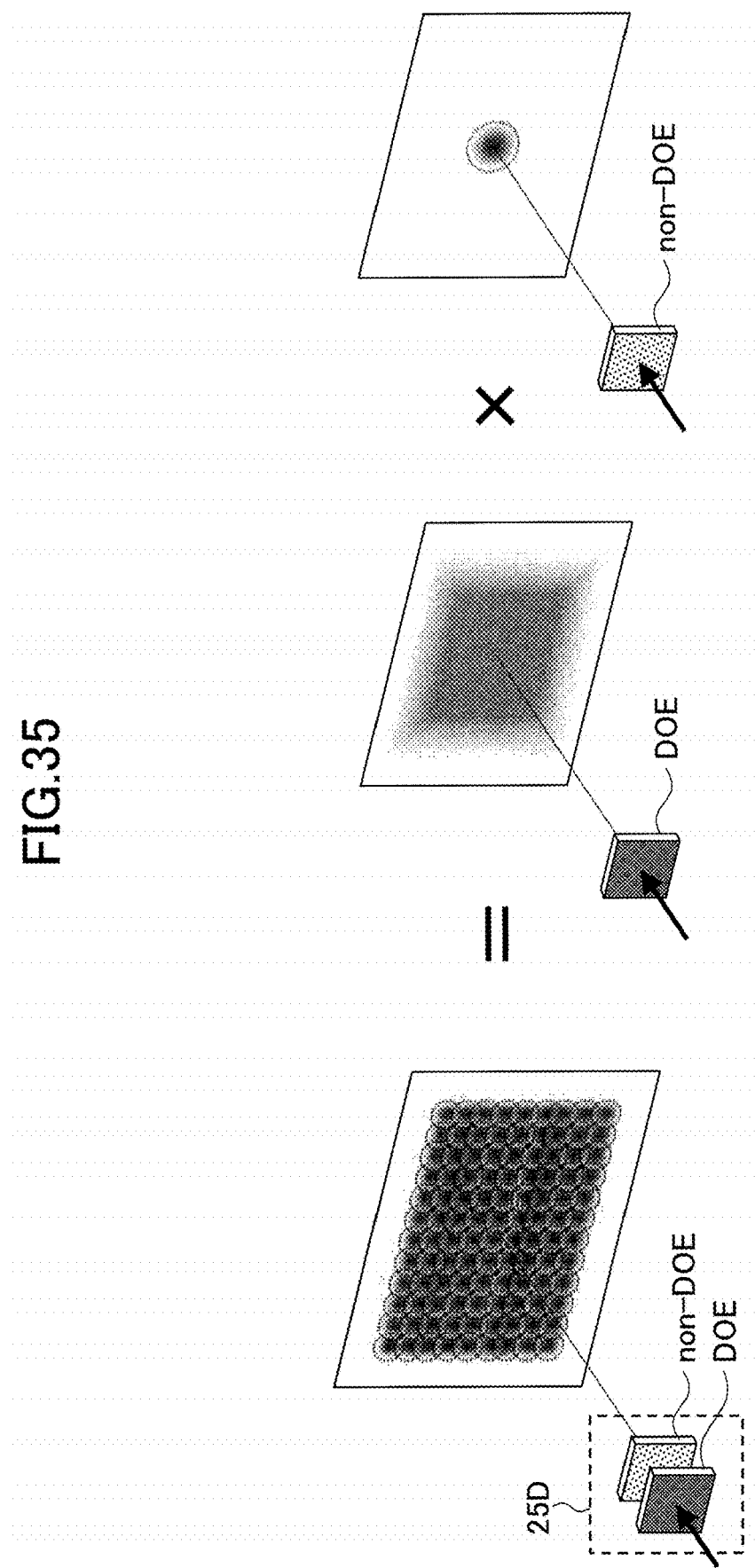
FIG. 35 shows an example configuration of the multistage optical system.

FIG. 35 shows an optical system 25D having a multistage configuration. The optical system 25D has a hybrid configuration with a combination of a wide-angle DOE and a narrow-angle non-DOE, which may be arranged along the same optical axis. For example, a diffuser having a high FOV value is used for the DOE, and a diffuser having a low FOV value and no diffraction function is used for the non-DOE. The pattern diffused by the high-FOV DOE is incident on the non-DOE diffuser. The zero-order diffraction light is diffused, and the influence of the zero-order diffraction light can be reduced.

The arrangement of the DOE and the non-DOE is not limited to the example of FIG. 35, and the positions of the DOE and the non-DOE may be reversed. The configuration of FIG. 35 is particularly effective at reducing the zero-order diffusion light.

Figure 36:
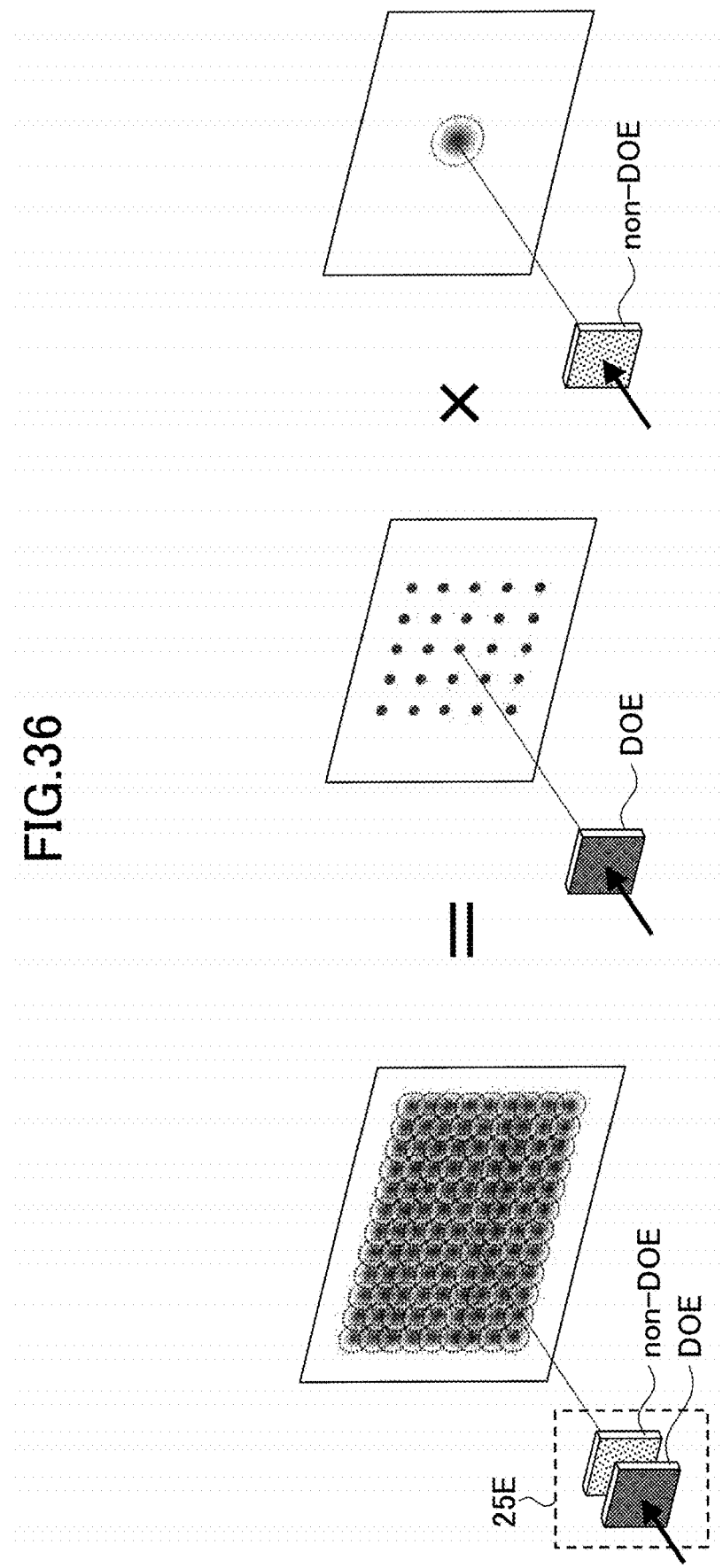
FIG. 36 shows an example configuration of the multistage optical system.

FIG. 36 shows an optical system 25E having a multistage configuration. The optical system 25E has a hybrid configuration with a combination of a wide-angle DOE and a narrow-angle non-DOE, which may be arranged along the same optical axis. For example, a dot matrix having a high FOV value is used for the wide-angle DOE, and a diffuser having a low FOV value and no diffraction function is used for the non-DOE. The projection pattern diffracted by the high-FOV dot matrix of the DOE is incident on the non-DOE diffuser. The diffracted light beams can overlap over a wide FOV, and the zero-order diffraction light can be diffused, and the influence of the zero-order diffraction light can be reduced.

The arrangement of the DOE and the non-DOE is not limited to the example of FIG. 36, and the positions of the DOE and the non-DOE may be reversed. The configuration of FIG. 36 is effective for both widening the FOV and reducing the zero-order diffraction light.

<Fourier Transform of Doe Phase Pattern>

Figure 37:
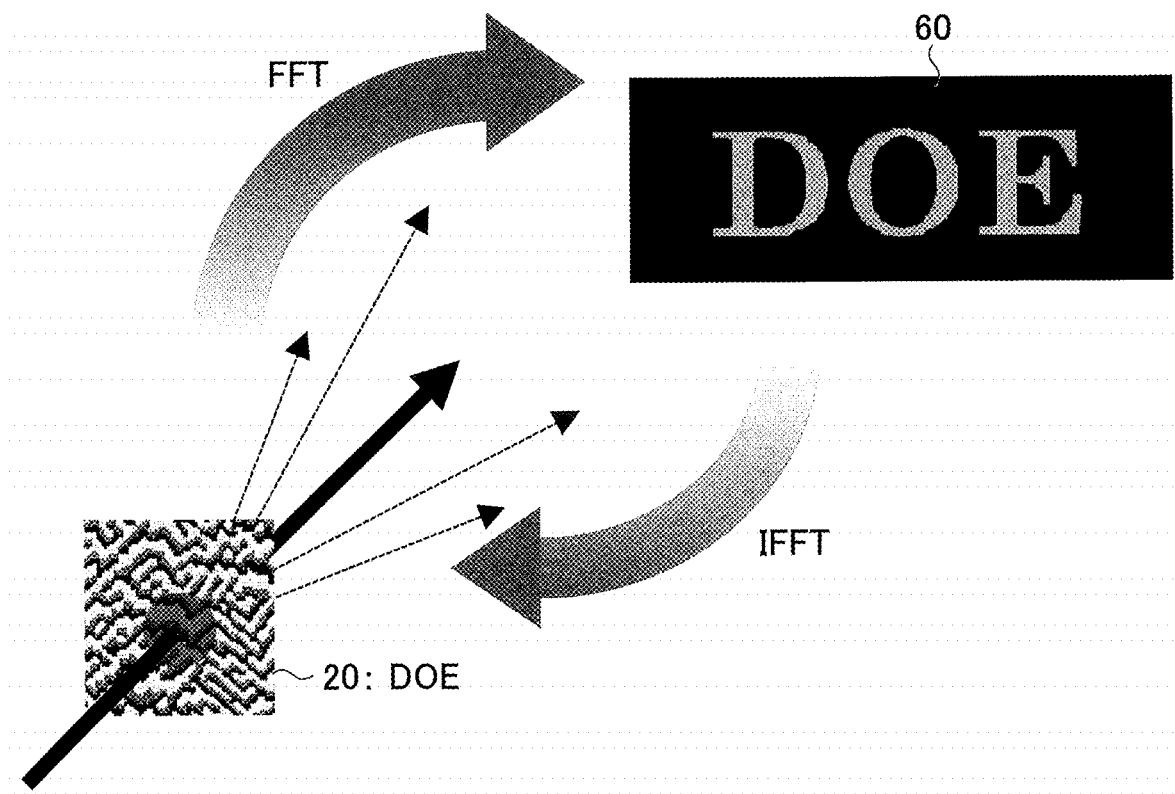
FIG. 37 shows a concept of DOE design for obtaining a target projection image.

FIG. 37 shows a concept of DOE design for obtaining a target projection image. Because the projected image is a fast Fourier transformed (FFT) image of the DOE phase information, inverse fast Fourier transform (IFFT) of the projected image ideally results in the desired DOE phase information. By performing IFFT on the projected image, the phase pattern of the DOE 20 can be known.

The electric field g(x', y') of the projected image is expressed by formula (22).

$$g(x', y') = \int U(x) \cdot \exp\left[-ik\frac{x \cdot x' + y \cdot y'}{r}\right] dx \quad (22)$$

$$U(x) = \exp[i\varphi(x', y')]$$

In formula (22), U(x) represents the DOE field, and φ(x', y') represents the phase distribution of the DOE.

The absolute value of U(x) representing the phase information of the DOE is always 1. Because of the constraint of the binarized value being +1 or −1, the phase distribution of the DOE is not immediately determined by a single IFFT. For the design of the DOE, an iterative Fourier transform algorithm (IFTA) that repeats FFT and IFFT as shown in FIG. 37 can be used.

By repeating FFT and IFFT, phase information of the DOE that approaches the target projected image can be designed.

FIG. 38A to FIG. 38C show a design example using IFTA. FIG. 38A is a target image, FIG. 38B is a DOE phase pattern designed by the IFTA scheme, and FIG. 38C is a projected image as to the diffraction order. The target image of FIG. 38A is a pattern formed by five spots. The coordinates of the five spots are, for example, (−1, −1), (−1, 1), (0, 0), (1, −1), (1, 1).

The DOE phase pattern designed by the IFTA scheme to produce the target image is formed by a black area and gray areas. The phase value of the black are is 0 radians, and the phase value of the gray areas is π radians.

The projected image produced by the DOE phase pattern of FIG. 38B is an image obtained as a result of FFT of the DOE field represented by U(x). By designing the phase pattern of the DOE by means of the IFTA scheme, a desired projected image can be obtained.

Although the present disclosure has been described above based on the example embodiments, the present disclosure is not limited to particulars of the example embodiments. For instance, the projection device 10 having the light source 30 and the DOE 20 may be a projection module in which the light source 30 and the DOE 20 are housed in a package. When the projection device 10 is applied to a measuring device 100, the measuring device may be configured in a measuring module in which the projection device 10 and the detector 50, such as a photodiode (PD), are housed in a package. Using a laser array as the light source 30, a projection module in which multiple DOEs 20 corresponding to the respective lasers are provided may be used. The measuring device 100 may be configured using a PD array.

In either case, the phase pattern of the DOE 20 is designed so as to satisfy a predetermined condition, and the diffracted light beams can overlap on the projection plane over a wide FOV to achieve a uniform intensity distribution. Moreover, the influence of the zero-order diffraction light can be reduced.

What is claimed is:

1. A diffractive optical element, comprising:
   a unit structure periodically formed in a first direction and configured to diffract an incident light in the first direction,
   wherein the diffractive optical element has a phase pattern formed such that an angular separation between an outermost diffracted light beam and a second-outermost diffracted light beam along the first direction is smaller than a divergence angle of the incident light, and the phase pattern is corrected within a range of 0.4×H(θ)<I(θ)<1.6×H(θ), where H(θ) denotes a correction function for the phase pattern, and I(θ) denotes a normalized intensity of a diffraction spot.

2. The diffractive optical element as claimed in claim 1, wherein the phase pattern is corrected so that an intensity of the diffracted light beam increases at a rate of 1/cos θ, where θ denotes a diffraction angle of the diffracted light beam that is diffracted in the first direction.

3. A projection device, comprising:
   a light source configured to emit divergent light; and
   the diffractive optical element of claim 1,
   wherein the diffractive optical element is positioned at a light emission side of the light source.

4. The projection device as claimed in claim 3, further comprising:
a second optical element positioned on a same optical axis as the diffractive optical element,
wherein the second optical element is a second diffractive optical element or a non-diffractive optical element.

5. A measuring device, comprising:
the projection device of claim 3; and
a detector configured to detect light reflected from an object present within a field of view of the projection device.

6. A diffractive optical element, comprising:
a unit structure periodically formed in two dimensions and configured to diffract an incident light in two dimensions,
wherein the diffractive optical element has a phase pattern that satisfies a condition, $[(ax-\theta x(MHx))/\delta x]^2+[(ay-\theta y(MHy))/\delta y]^2<1$, where (ax, ay) denotes angular coordinates of a center of four diffracted light beams adjacent to one another at a corner farthest from a center area of the light beams diffracted and projected in two dimensions, $\theta x(MHx)$ denotes a diffraction angle of a first direction outermost diffracted light beam, $\theta y(MHy)$ denotes a diffraction angle of a second direction outermost diffracted light beam, the first direction and the second direction being orthogonal to each other, $\delta x$ denotes a first direction divergence angle of the light beams diffracted in two dimensions, and $\delta y$ denotes a second direction divergence angle of the light beams diffracted in two dimensions.

7. The diffractive optical element as claimed in claim 6, wherein the phase pattern is corrected so that an intensity of the diffracted light beam increases at a rate of $1/(\cos \theta x \cdot \cos \theta y)$, where $\theta x$ denotes a diffraction angle of a light beam diffracted in the first direction, and $\theta y$ denotes a diffraction angle of a light beam diffracted in the second direction.

8. The diffractive optical element as claimed in claim 7, wherein the phase pattern is corrected within a range of $0.4 \times H(\theta)<I(\theta)<1.6 \times H(\theta)$, where $H(\theta)$ denotes a correction function for the phase pattern, and $I(\theta)$ denotes a normalized intensity of a diffraction spot.

9. A projection device, comprising:
a light source configured to emit divergent light; and
the diffractive optical element of claim 6,
wherein the diffractive optical element is positioned at a light emission side of the light source.

10. The projection device as claimed in claim 9, further comprising:
a second optical element positioned on a same optical axis as the diffractive optical element,
wherein the second optical element is a second diffractive optical element or a non-diffractive optical element.

11. A measuring device, comprising:
the projection device of claim 9; and
a detector configured to detect light reflected from an object present within a field of view of the projection device.

12. A diffractive optical element, comprising:
a unit structure periodically formed in a first direction and configured to diffract an incident light in a first direction,
wherein the diffractive optical element has a phase pattern that satisfies a condition, $\tan \theta(MH)-\tan \theta(MH-1)<(FWHM/2Z)[1/\cos \theta(MH)+1/\cos \theta(MH-1)]$, where FWHM denotes a beam diameter of the incident light, Z denotes a distance from the diffractive optical element to a projection plane, $\theta(MH)$ denotes a diffraction angle of an outermost light beam among light beams diffracted in the first direction, and $\theta(MH-1)$ denotes a second-outermost light beam diffracted in the first direction.

13. The diffractive optical element as claimed in claim 12, wherein the phase pattern is corrected so that an intensity of the diffracted light beam increases at a rate of $1/(\cos \theta)^2$, where $\theta$ denotes a diffraction angle of a light beam diffracted in the first direction.

14. The diffractive optical element as claimed in claim 13, wherein the phase pattern is corrected within a range of $0.4 \times H(\theta)<I(\theta)<1.6 \times H(\theta)$, where $H(\theta)$ denotes a correction function for the phase pattern, and $I(\theta)$ denotes a normalized intensity of a diffraction spot.

15. A projection device comprising:
a light source configured to emit collimated light; and
the diffractive optical element of claim 12,
wherein the diffractive optical element is positioned at a light emission side of the light source.

16. The projection device as claimed in claim 15, further comprising:
a second optical element positioned on a same optical axis as the diffractive optical element,
wherein the second optical element is a second diffractive optical element or a non-diffractive optical element.

17. A measuring device, comprising:
the projection device of claim 15; and
a detector configured to detect light reflected from an object present within a field of view of the projection device.

18. A diffractive optical element, comprising:
a unit structure periodically formed in two dimensions and configured to diffract incident light in two dimensions,
wherein the diffractive optical element has a period P with a length that satisfies a condition, $\lambda \times Z/(\alpha \times FWHM) < P < FWHM$, where $\lambda$ denotes a wavelength of the incident light, FWHM denotes a beam diameter of the incident light, and Z denotes a distance from the diffractive optical element to a projection plane, and the diffractive optical element has a phase pattern designed such that a value of $\alpha$ is constant in a case where a field of view produced by the diffractive optical element is smaller than 30°, and that the value of a monotonically decrease as a function the field of view in a case where the field of view is 30° or greater.

19. The diffractive optical element as claimed in claim 18, wherein the phase pattern is corrected so that an intensity of the diffracted light beam increases at a rate of $1/(\cos \theta)^3$, where $\theta$ denotes a diffraction angle of a light beam diffracted in the first direction.

20. The diffractive optical element as claimed in claim 19, wherein the phase pattern is corrected within a range of $0.4 \times H(\theta)<I(\theta)<1.6 \times H(\theta)$, where $H(\theta)$ denotes a correction function for the phase pattern, and $I(\theta)$ denotes a normalized intensity of a diffraction spot.

21. A projection device, comprising:
a light source configured to emit collimated light; and
the diffractive optical element of claim 18,
wherein the diffractive optical element is positioned at a light emission side of the light source.

22. The projection device as claimed in claim 21, further comprising:
a second optical element positioned on a same optical axis as the diffractive optical element,
wherein the second optical element is a second diffractive optical element or a non-diffractive optical element.

23. A measuring device, comprising:
the projection device of claim 21; and
a detector configured to detect light reflected from an object present within a field of view of the projection device.

* * * * *